(12) United States Patent
Lee et al.

(10) Patent No.: US 7,721,325 B2
(45) Date of Patent: May 18, 2010

(54) METHOD AND APPARATUS FOR MANAGING COMMUNICATION SECURITY IN WIRELESS NETWORK

(75) Inventors: Sung-min Lee, Seoul (KR); Seung-jae Oh, Seoul (KR); Se-hee Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1055 days.

(21) Appl. No.: 11/231,978

(22) Filed: Sep. 22, 2005

(65) Prior Publication Data

US 2006/0062391 A1  Mar. 23, 2006

(30) Foreign Application Priority Data

| Sep. 22, 2004 | (KR) | 10-2004-0075904 |
| Apr. 13, 2005 | (KR) | 10-2005-0030732 |
| Jun. 4, 2005 | (KR) | 10-2005-0048099 |
| Sep. 10, 2005 | (KR) | 10-2005-0084434 |

(51) Int. Cl.
*G06F 13/00* (2006.01)
*H04L 9/00* (2006.01)

(52) U.S. Cl. .................... 726/4; 380/270; 380/277; 380/278

(58) Field of Classification Search ............... 380/270, 380/277–278; 726/3–5
See application file for complete search history.

(56) References Cited

U.S. PATENT DOCUMENTS

| 6,324,650 | B1 * | 11/2001 | Ogilvie ........................ 726/2 |
| 2003/0119452 | A1 * | 6/2003 | Kim et al. .................... 455/69 |
| 2003/0221098 | A1 | 11/2003 | Chen et al. |
| 2004/0153718 | A1 * | 8/2004 | Shen et al. .................... 714/5 |
| 2008/0267404 | A1 * | 10/2008 | Budde et al. ................ 380/270 |

FOREIGN PATENT DOCUMENTS

| JP | 2004-23736 A | 1/2004 |
| WO | WO 2004014040 A1 * | 2/2004 |

OTHER PUBLICATIONS

IEEE. "IEEE Std 802.11i™-2004, IEEE Standard for Information Technology—Telecommunications and Information Exchange Between Systems—Local and Metropolitan Area Networks—Specific Requirements—Part 11: . . . —Amendment 6: . . . " Jul. 23, 2004. Available at http://standards.ieee.org/getieee802/download/802.11i-2004.pdf. Downloaded Nov. 19, 2008.*

(Continued)

*Primary Examiner*—Nasser Moazzami
*Assistant Examiner*—Travis Pogmore
(74) *Attorney, Agent, or Firm*—Sughrue Mion, PLLC

(57) ABSTRACT

A method and apparatus for managing communication security in a wireless network are provided. The method includes receiving from a station that intends to associate in the wireless network including an access point, first key generation information provided by the access point and second key generation information provided by the station, providing third key generation information, generating a security key using the first key generation information, the second key generation information, the third key generation information, and an initial key, and sending the third key generation information and the security key to the station.

84 Claims, 33 Drawing Sheets

OTHER PUBLICATIONS

Calhoun, P., et al. "Light Weight Access Point Protocol (LWAPP)." Apr. 15, 2003. Available at http://tools.ietf.org/html/draft-ohara-capwap-lwapp-00. Downloaded Jul. 9, 2009.*

Teuwen, P. "Patch submission: multi-PSK support for hostapd." Sep. 16, 2004. Available at http://lists.shmoo.com/pipermail/hostap/2004-September/008184.html. Downloaded Jul. 10, 2009.*

* cited by examiner

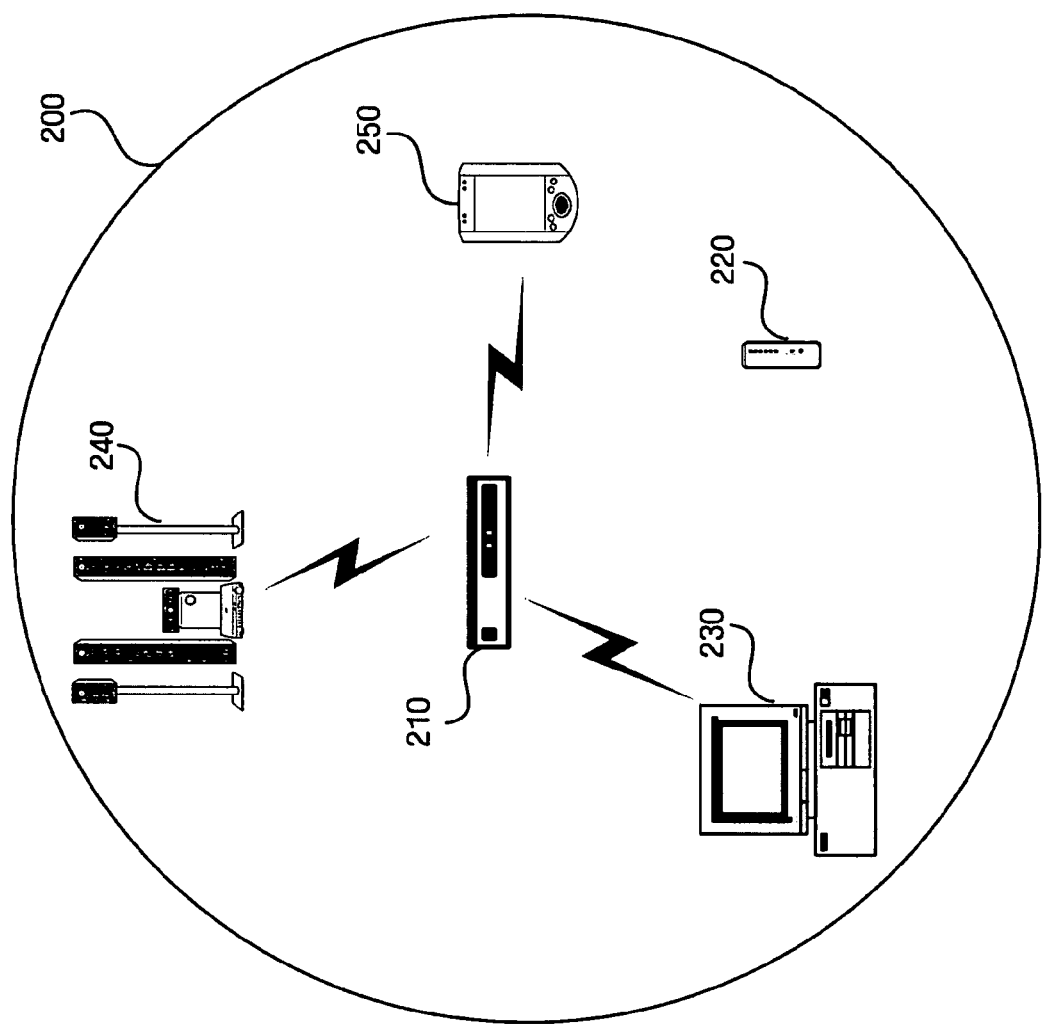

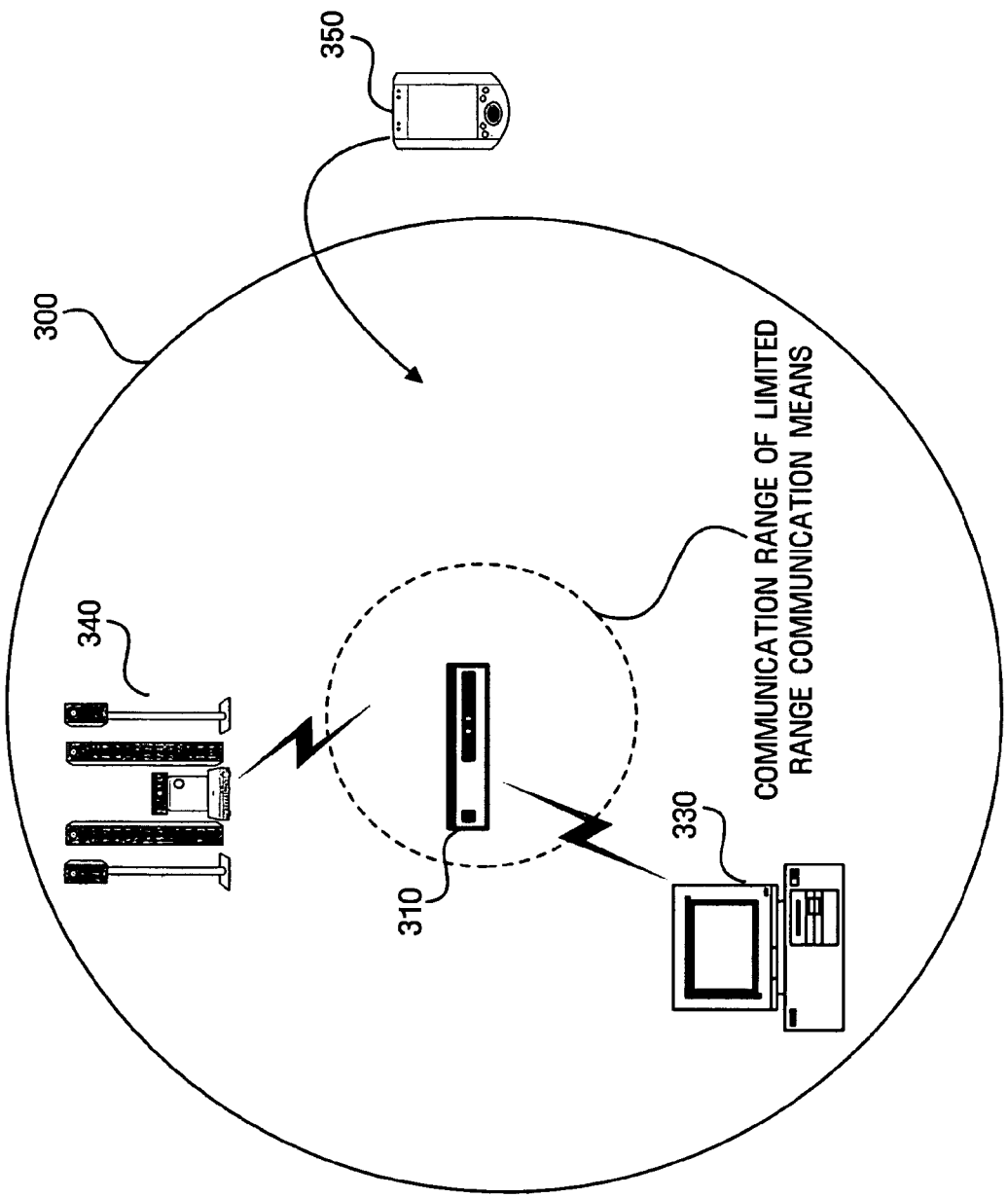

METHOD AND APPARATUS FOR MANAGING COMMUNICATION SECURITY IN WIRELESS NETWORK

CROSS-REFERENCE TO RELATED APPLICATIONS

This application claims priority from Korean Patent Application Nos. 10-2004-0075904, 10-2005-0030732, 10-2005-0048099 and 10-2005-0084434 filed on Sep. 22, 2004, Apr. 13, 2005, Jun. 4, 2005 and Sep. 10, 2005, respectively, in the Korean Intellectual Property Office, the disclosures of which are incorporated herein by reference in their entirety.

BACKGROUND OF THE INVENTION

1. Field of the Invention

Methods and apparatuses consistent with the present invention relate to managing communication security in a wireless network, and more particularly, to allowing an external station to temporarily associate in a wireless network while maintaining communication security in the wireless network.

2. Description of the Related Art

With the development of communication and network technologies, the home network environment has recently been evolving from a wired network environment using a wired medium such as a coaxial cable or an optical fiber into a wireless network environment using radio signals in various frequency bands.

Unlike a wired network, a data transmission path is not physically fixed. Therefore, communication security is more vulnerable to security breaches in the wireless network than the wired network. Accordingly, to accomplish secure wireless communication, most wireless communication protocols support encryption of transmitted data packets. To support the encryption, Wi-Fi Protected Access (WPA) for a wireless local area network (LAN) or Wired Equivalent Privacy (WEP) is used.

WPA relates to wireless local area network (LAN) authentication and encryption, which was proposed by the Wi-Fi Alliance while the Institute of Electrical and Electronics Engineers (IEEE) 802.11i standard was being prepared. WPA also supports authentication in an ad-hoc network using an authentication scheme based on a pre-shared key (PSK: hereinafter, referred to as an initial key). In WPA, the Temporal Key Integrity Protocol (TKIP) is used as an encryption technique to provide data confidentiality. To enhance integrity and security in WPA, a message integrity check field is included in a transmission frame.

A process for setting a pairwise transient key (PTK: hereinafter, referred to as a security key) in a WPA-PSK mode using an initial key will be described with reference to FIG. 1.

FIG. 1 is a schematic flow diagram illustrating a conventional process of establishing a security key in a WPA-PSK mode.

In the WPA-PSK mode, an access point and a station which create a wireless network share the initial key. The initial key is used to generate a security key for secure communication between the access point and the station. In the WPA-PSK mode, a PSK key generation process is implemented by a four-way handshake process between an access point and a station.

In operation S110, the access point and the station are subjected to predetermined authentication and connection. For such authentication and connection, an open authentication procedure defined in the IEEE 802.11 standard may be used. Through the authentication and connection, the access point and the station acquire each other's medium access control (MAC) addresses, which are used to generate the security key. In the conventional process in the WPA-PSK mode, a PSK key is generated by a four-way handshake process between an access point and a station.

Upon completion of the authentication and connection, the access point generates a first random number in operation S115 and the station generates a second random number in operation S120. A random number is a sequence of digits or characters with randomness.

The access point sends a first message including the first random number to the station in operation S125.

Upon receiving the first message from the access point, the station generates a security key using the first random number, the second random number, the access point's MAC address, the station's MAC address, and the initial key and computes a message integrity check (MIC) using the security key in operation S130.

Thereafter, the station sends a second message including the second random number and the MIC to the access point in operation S135.

Upon receiving the second message from the station, the access point generates a security key using the first random number, the second random number, the access point's MAC address, the station's MAC address, and the initial key and computes an MIC using the security key in operation S140.

Here, the access point can determine whether the station has the same security key as it has by comparing its MIC with the MIC received through the second message. When it is determined that the MIC computed by the access point is not the same as that received from the station, an MIC error occurs.

In this case, the access point interrupts communication with the station. However, when an MIC error does not occur, the access point sends a third message including its MIC and a receive sequence counter to the station in operation S145.

Upon receiving the third message from the access point, the station computes an MIC using its security key. When it is determined that the MIC received from the access point is the same as that computed by the station, the station sets the security key generated in operation S130 to secure the communication with the access point in operation S150.

Thereafter, the station sends a fourth message requesting the access point to set the security key in operation S155.

Upon receiving the fourth message from the station, the access point sets the security key that it has generated to secure the communication with the station in operation S160.

In such a way, each station in a wireless network can generate a security key shared with an access point. Since each station generates a security key using different parameters (for example, a random number and each station's MAC address), each station sets a security key that is known only to itself and the access point.

Once the security key is set, the access point and the station can encrypt data to be transmitted therebetween using the security key and can decrypt the encrypted data received from each other using the security key.

As described above, to generate a security key in the WPA-PSK mode, an initial key is needed and an external station that does not have the same initial key as the access point cannot generate the same security key as the access point. Accordingly, in the WPA-PSK mode, an external station is prevented from accessing to a wireless network without permission.

In this situation, the initial key should be protected so as not to be revealed outside the wireless network. In other words, when the initial key is revealed to an external station, a wireless network manager needs to set a new initial key in all network apparatus (i.e., the access point and the stations) in the wireless network.

Such conventional technology is inconvenient for a wireless network manager managing a wireless network when it is necessary to permit an external station to temporarily associate in the wireless network.

For example, in the conventional technology, to permit an external station possessed by a visitor to temporarily associate in a home network, the network manager allows the external station to share an initial key used in the home network.

In other words, the external station stores the initial key used in the home network. Accordingly, even after stopping associating in communication with the home network (for example, when the visitor having the external station stops visit), the external station can share a security key with an access point of the home network through the process illustrated in FIG. 1. In this case, the external station can freely associate in the home network without the network manager's permission. To prevent ungranted association, the network manager must change the initial key in the access point and all stations in the home network once the initial key is revealed to the external station. 27

However, it is inconvenient for the network manager to change the initial key in the access point and all stations in the home network. In particular, such inconvenience becomes more serious in a wireless network under an environment in which temporal association of an external station frequently occurs or in a wireless network in which a large number of access points and stations associate in communication.

SUMMARY OF THE INVENTION

The present invention provides a method and apparatus for allowing an external station to temporarily associate in a wireless network while maintaining communication security in the wireless network by protecting an initial key from being revealed outside the wireless network.

The present invention also provides convenient communication security management in a wireless network by protecting an initial key from being revealed to a station temporarily associating in the wireless network.

According to an aspect of the present invention, there is provided a method of managing communication security in a wireless network, the method including receiving from a station that intends to associate in the wireless network including an access point, first key generation information provided by the access point and second key generation information provided by the station, providing third key generation information, generating a security key using the first key generation information, the second key generation information, the third key generation information, and an initial key, and sending the third key generation information and the security key to the station.

According to another aspect of the present invention, there is provided a method of managing communication security in a wireless network, the method including receiving from a station that intends to associate in the wireless network including an access point, first key generation information provided by the access point and second key generation information provided by the station, generating a security key using the first key generation information, the second key generation information, and an initial key, and sending the security key to the station.

According to still another aspect of the present invention, there is provided a method of managing communication security in a wireless network, which is performed by a station that intends to associate in the wireless network, the method including receiving first key generation information from an access point included in the wireless network, providing second key generation information, transmitting the first key generation information and the second key generation information to a key generation apparatus, receiving from the key generation apparatus third key generation information provided by the key generation apparatus and a security key which is generated by the key generation apparatus using the first key generation information, the second key generation information, the third key generation information, and an initial key, transmitting the second key generation information and the third key generation information to the access point, and performing communication with the access point using the security key.

According to a further aspect of the present invention, there is provided a method of managing communication security in a wireless network, which is performed by a station that intends to associate in the wireless network, the method including receiving first key generation information from an access point included in the wireless network, providing second key generation information, transmitting the first key generation information and the second key generation information to a key generation apparatus, receiving from the key generation apparatus a security key, which is generated by the key generation apparatus using the first key generation information, the second key generation information, and an initial key, transmitting the second key generation information to the access point, and performing communication with the access point using the security key.

According to yet still another aspect of the present invention, there is provided a method of managing communication security in a wireless network, which is performed by an access point included in the wireless network, the method including providing first key generation information, transmitting the first key generation information to a station that intends to associate in the wireless network, receiving from the station second key generation information provided by the station and third key generation information provided by a key generation apparatus, which generates a security key to be used by the station in the wireless network, generating a security key using the first key generation information, the second key generation information, the third key generation information, and an initial key that the access point stores, and performing communication with the station using the generated security key.

According to yet a further aspect of the present invention, there is provided a key generation apparatus including a communication apparatus interface module receiving from a station that intends to associate in a wireless network including an access point, first key generation information provided by the access point and second key generation information provided by the station, a key generation information providing module providing third key generation information, a storage module storing an initial key, a security key generation module generating a security key using the first key generation information and the second key generation information, which are received through the communication apparatus interface module, the third key generation information provided by the key generation information providing module, and the initial key stored in the storage module, and a control module sending the third key generation information provided by the key generation information providing module and the security key generated by the security key generation module to the station through the communication apparatus interface module.

According to an alternative aspect of the present invention, there is provided a key generation apparatus including a communication apparatus interface module receiving from a station that intends to associate in a wireless network including an access point, first key generation information provided by the access point and second key generation information provided by the station, a storage module storing an initial key, a security key generation module generating a security key using the first key generation information and the second key generation information, which are received through the communication apparatus interface module, and the initial key stored in the storage module, and a control module sending the security key generated by the security key generation module to the station through the communication apparatus interface module.

According to yet another aspect of the present invention, there is provided a station that intends to associate in a wireless network, the station including a network communication module receiving first key generation information from an access point included in the wireless network, a key generation information providing module providing second key generation information, a key generation apparatus interface module transmitting the first key generation information and the second key generation information to a key generation apparatus and receiving from the key generation apparatus third key generation information provided by the key generation apparatus and a security key generated by the key generation apparatus using the first key generation information, the second key generation information, the third key generation information, and an initial key, and a control module transmitting the second key generation information and the third key generation information to the access point via the network communication module when receiving the security key and the third key generation information through the key generation apparatus interface module and setting the security key for communication between the access point and the station.

According to still yet another aspect of the present invention, there is a provided a station that intends to associate in a wireless network, the station including a network communication module receiving first key generation information from an access point included in the wireless network, a key generation information providing module providing second key generation information, a key generation apparatus interface module transmitting the first key generation information and the second key generation information to a key generation apparatus and receiving from the key generation apparatus a security key generated by the key generation apparatus using the first key generation information, the second key generation information, and an initial key, and a control module transmitting the second key generation information to the access point via the network communication module when receiving the security key through the key generation apparatus interface module and setting the security key for communication between the access point and the station.

According to another aspect of the present invention, there is a provided an access point for managing communication security in a wireless network to communicate with a station that intends to associate in the wireless network, the access point including a key generation information providing module providing first key generation information, a network communication module transmitting the first key generation information provided by the key generation information providing module to the station and receiving from the station second key generation information provided by the station and third key generation information provided by a key generation apparatus, which generates a security key to be used by the station in the wireless network, a storage module storing an initial key, a security key generation module generating a security key using the first key generation information, the second key generation information, the third key generation information, and the initial key stored in the storage module, and an encryption/decryption module encrypting data, which will be transmitted to the station via the network communication module, using the security key generated by the security key generation module and decrypting encrypted data received from the station via the network communication module using the security key.

According to still another aspect of the present invention, there is provided an initial key providing apparatus including a communication apparatus interface module performing communication with an access point and a station, and a control module performing authentication with the access point and receiving an initial key from the access point through the communication apparatus interface module and performing authentication with the station and transmitting the initial key to the station through the communication apparatus interface module, and a storage module storing the received initial key.

According to yet another aspect of the present invention, there is provided a method of managing communication security in a wireless network, which is performed by a station that intends to associate in the wireless network, the method comprising providing first key generation information, storing the first key generation information in a key transmitter connected to the station, acquiring from the key transmitter a security key, which is generated by an access point included in the wireless network using the first key generation information, second key generation information provided by the access point, and an initial key, when the key transmitter is newly connected to the station and setting the security key acquired from the key transmitter as a security key used for communication with the access point.

According to a further aspect of the present invention, there is provided a method of managing communication security in a wireless network, which is performed by an access point included in the wireless network, the method including acquiring first key generation information provided by a station that intends to associate in the wireless network from a key transmitter connected to the access point, providing second key generation information, generating a security key using the first key generation information, the second key generation information, and an initial key, storing the security key in the key transmitter, and setting the security key as a security key used for communication with the station.

According to yet a further aspect of the present invention, there is provided a station that intends to associate in a wireless network, the station including a key transmitter interface module connected to a key transmitter, a key generation information providing module providing first key generation information, and a control module storing the first key generation information in the key transmitter through the key transmitter interface module, acquiring a security key from the key transmitter when the key transmitter is newly connected through the key transmitter interface module, and setting the acquired security key as a security key used for communication with an access point included in the wireless network.

According to still yet another aspect of the present invention, there is provided an access point for managing communication security in a wireless network to communicate with a station that intends to associate in the wireless network, the access point comprising a key transmitter interface module connected to a key transmitter, a key generation information providing module providing second key generation information, a security key generation module generating a security key using first key generation information, which is provided by the station and stored in the key transmitter, the second key generation information, and an initial key, and a control module storing the generated security key in the key transmitter through the key transmitter interface module and setting the generated security key as a security key used for communication with the station.

According to still yet a further aspect of the present invention, there is provided a method of managing communication security in a wireless network, which is performed by a station that intends to associate in the wireless network, the method including providing first key generation information, transmitting the first key generation information to an access point included in the wireless network using limited range communication means, receiving from the access point a security key, which is generated by the access point using the first key generation information, second key generation information provided by the access point, and an initial key, using the limited range communication means, and setting the received security key to perform communication in accordance with the wireless network.

According to an alternative aspect of the present invention, there is provided a method of managing communication security in a wireless network, which is performed by an access point included in the wireless network, the method including receiving first key generation information from a station that intends to associate in the wireless network using limited range communication means, providing second key generation information, generating a security key using the first key generation information, the second key generation information, and an initial key, transmitting the generated security key to the station using the limited range communication means, and setting the generated security key as a security key used to perform communication in accordance with the wireless network.

According to another aspect of the present invention, there is provided a station that intends to associate in a wireless network, including a key generation information providing module providing first key generation information, a limited range communication module transmitting the first key generation information to an access point included in the wireless network and receiving from the access point a security key, which is generated by the access point using the first key generation information, second key generation information provided by the access point, and an initial key, a network communication module performing network communication in accordance with the wireless network, and a control module setting the received security key for the network communication performed by the network communication module.

According to yet another aspect of the present invention, there is provided an access point included in a wireless network, including a limited range communication module receiving first key generation information from a station that intends to associate in the wireless network, a key generation information providing module providing second key generation information, a security key generation module generating a security key using the first key generation information, the second key generation information, and an initial key, a network communication module performing network communication in accordance with the wireless network, and a control module transmitting the generated security key to the station using the limited range communication module and setting the generated security key to use for the network communication performed by the network communication module.

BRIEF DESCRIPTION OF THE DRAWINGS

The above and other aspects of the present invention will become more apparent by describing in detail exemplary embodiments thereof with reference to the attached drawings in which:

FIG. 15A through 15D illustrate a process of allowing an external station to associate in a home network according to another exemplary embodiment of the present invention;

FIG. 21 is a schematic diagram illustrating a home network according to still another exemplary embodiment of the present invention;

DETAILED DESCRIPTION OF EXEMPLARY EMBODIMENTS OF THE INVENTION

Figure 1:
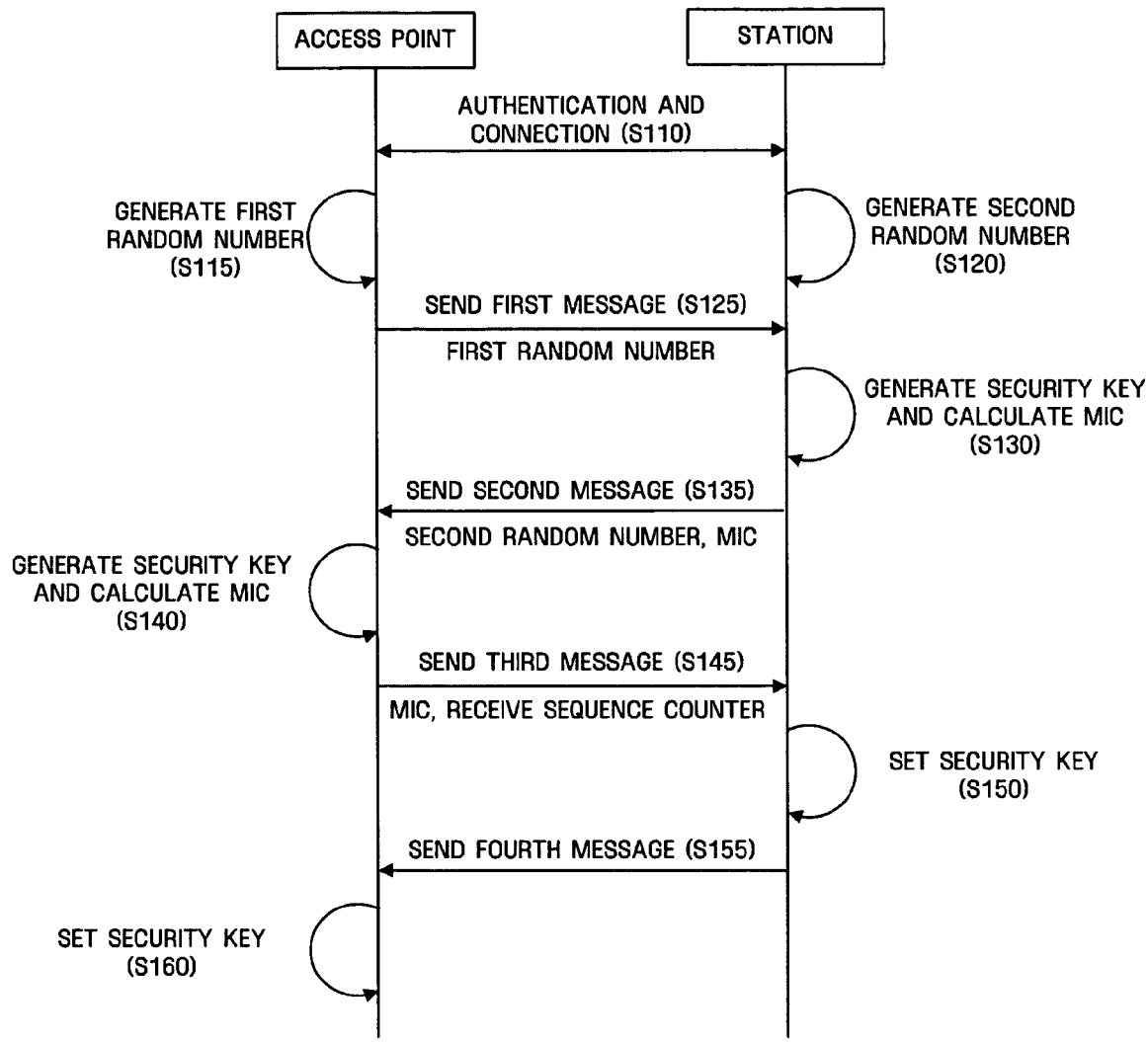
FIG. 1 is a flowchart schematically illustrating a conventional process of establishing a security key in a WPA-PSK mode.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention will now be described more fully with reference to the accompanying drawings, in which exemplary embodiments of the invention are shown. First, terms used herein will be described in brief. However, it is noted that the use of any and all examples, or exemplary terms provided herein is intended merely to better illuminate the invention and is not a limitation on the scope of the invention unless otherwise claimed.

Station

A station is a network apparatus that can communicate using a wireless medium such as a notebook, a cellular phone, a personal digital assistant (PDA), a digital television (TV), and a set-top box. Preferably, but not necessarily, the station may be a station over a wireless LAN defined in the IEEE 802.11 standard.

Access Point

An access point is a network access control apparatus capable of controlling an access of a station to a wireless network. Preferably, but not necessarily, the access point may be described as the concept of an access point according to a wireless LAN protocol defined in the IEEE 802.11 standard.

Key Generation Apparatus

A key generating apparatus is a portable apparatus having a predetermined computing capability with respect to data, including a nonvolatile memory such as a flash memory which data can be read from, written in, or erased from. For example, the key generating apparatus is a portable storage apparatus such as a smartcard or a multimedia card or a portable terminal such as a cellular phone or a PDA.

Key Transmitter

A key transmitter is a portable apparatus including a nonvolatile memory such as a flash memory which data can be read from, written in, or erased from. The key transmitter does not require a predetermined computing capability with respect to stored data in addition to a data storage function, but the present invention is not limited thereto. A universal serial bus (USB) storage such as a USB flash drive (UFD) used in Windows Connect Now (WCN) from Microsoft Corp. may be used as a exemplary embodiment of the key transmitter.

Random Number

A random number is a sequence of digits, characters, or combinations thereof with randomness.

Security Key

A security key is a kind of session key used to maintain security in communication between a station and an access point. The station and the access point can encrypt data to be transmitted therebetween using the security key and can decrypt the encrypted data received from each other using the security key. Preferably, but not necessarily, the security key is a pairwise transient key (PTK) in the WPA-PSK mode.

Key Generation Information

Key generation information is used to generate a security key, together with an initial key to be described below. The key generation information may include at least one parameter. For example, the key generation information may include at least one of random number and an MAC address. When the key generation information includes the MAC address, the MAC address may be included in the payload of an MAC frame as a kind of data. However, since the MAC address of the MAC frame transmitted between the access point and the station is basically set in a source address field of the MAC header of the MAC frame, when the access point or the station transmits the key generation information including its MAC address to the other part, it is preferable that the MAC address be transmitted as the source address field included in the MAC header of the MAC frame. For example, the expression "a station transmits key generation information including its MAC address and a random number to an access point" as used in the present invention may be understood to mean that "a station transmits an MAC frame in which the random number is included in the payload and the MAC address is set in the source address field of the MAC header".

Initial Key

An initial key is used to generate a security key, together with key generation information. To generate a security key, key generation information and an initial key are required. Members (access points and stations) of a wireless network share an initial key and the initial key should be protected not to be revealed outside the wireless network. Thus, the access points and the stations may store the initial key in a storage area that is physically or logically protected from being accessed by other apparatuses. A pre-shared key (PSK) used in a WPA-PSK mode may be used as an example of the initial key.

Module

The term "module", as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Other terms used for description of the present invention will be explained with reference to exemplary embodiments of the present invention.

Among several approaches to allow an external station to temporarily associate in a wireless network while maintaining communication security in the wireless network, the invention will now be described referring particularly to three cases of using a key generation apparatus, a key transmitter, and direct communication between an access point and a station.

1. Using Key Generation Apparatus

Figure 2:
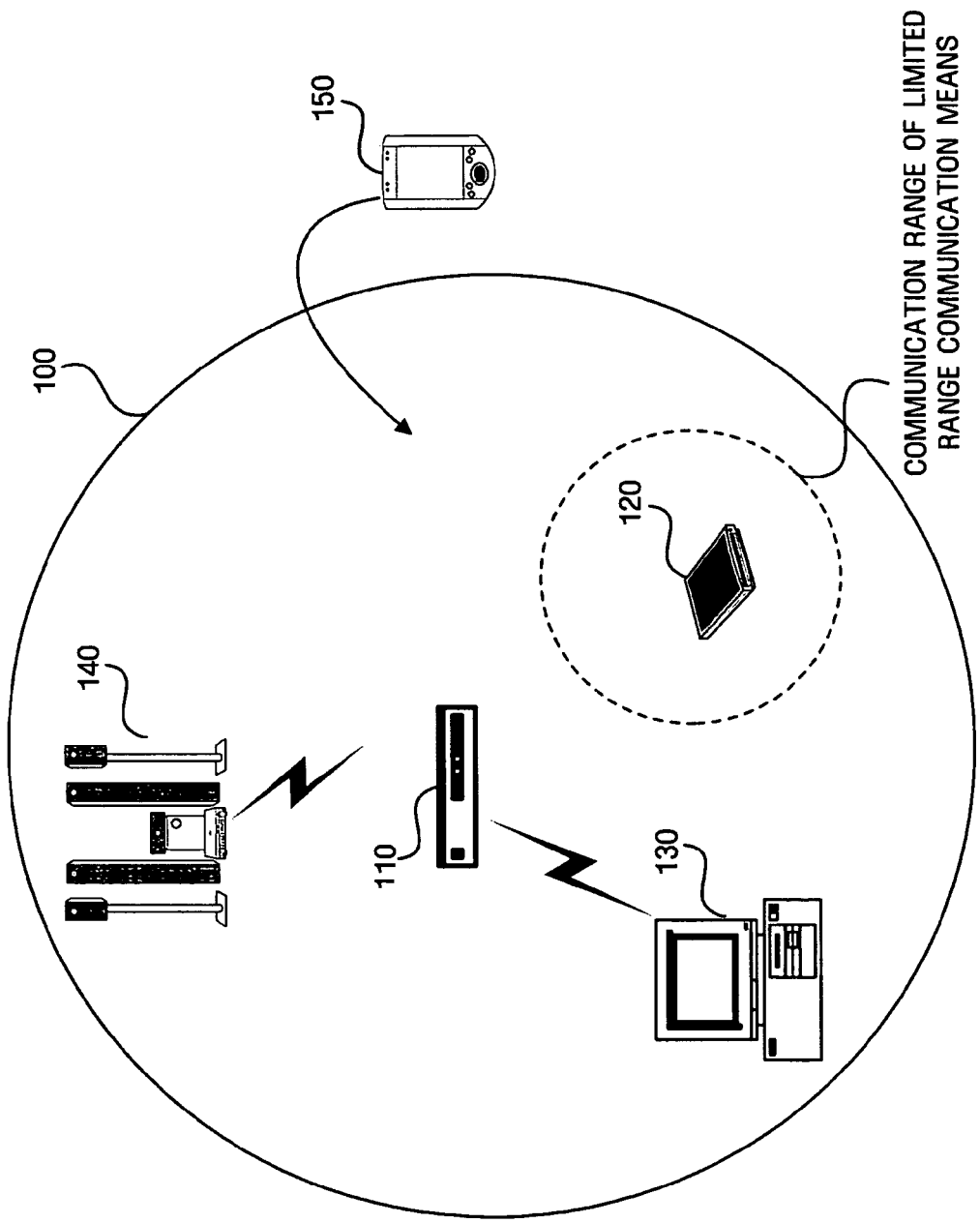
FIG. 2 illustrates a home network according to an exemplary embodiment of the present invention.

FIG. 2 illustrates a home network according to an exemplary embodiment of the present invention.

Referring to FIG. 2, a home network 100 includes an access point 110, a key generation apparatus 120, and at least one of the stations 130 and 140.

The access point 110 and the stations 130 and 140 previously store the same initial key. The initial key may be manually input by a network manager. To this end, the access point 110 and the stations 130 and 140 may provide user interfaces into which the network manager can input the initial key.

The stations 130 and 140 that store the same initial key as that of the access point 110 can generate a security key to be shared with the access point 110 while maintaining communication security in the home network 100 using the security key. For example, to generate the security key, the access point 110 and the stations 130 and 140 may use the WPA-PSK mode described with reference to FIG. 1.

The key generation apparatus 120 generates a security key to be shared between the access point 110 and an external station 150 when the external station 150 is allowed to temporarily associate in the home network 100 (e.g., the external station 150 of a visitor is allowed to access the home network 100). Thus, the key generation apparatus 120 stores the same initial key as in the access point 110. The security key generated by the key generation apparatus 120 is used for secure communication between the external station 150 and the access point 110.

To generate the security key, the key generation apparatus 120 receives key generation information required for security key generation from the external station 150. The key generation information transmitted from the external station 150 to the key generation apparatus 120 includes first key generation information provided by the access point 110 and second key generation information provided by the external station 150.

The key generation apparatus 120 generates the security key using the first key generation information provided by the access point 110, the second key generation information provided by the external station 150, third key generation information provided by the key generation apparatus 120 itself, and the initial key. A security key generation algorithm used for the key generation apparatus 120 to generate the security key is the same as a security key generation algorithm used by the access point 110.

Once the security key is generated, the key generation apparatus 120 transmits the generated third key generation information and the security key to the external station 150.

The security key transmitted between the external station 150 and the key generation apparatus 120 is important for the security of the home network 100. Thus, it is preferable that the security key be not revealed to another external station (not shown) adjacent to the home network 100. To this end, a communication apparatus used for communication between the external station 150 and the key generation apparatus 120 may be communication means (hereinafter, referred to as limited range communication means) having a narrower communication range than communication means (e.g., a wireless LAN) used for communication between the access point 110 and each of the stations 130 through 150 in the home network 100. For example, the limited range communication means may be designed to communicate when a distance between the external station 150 and the key generation apparatus 120 is within 1 meter. Preferably, but not necessarily, limited range communication means is implemented in either a non-contact type communication means such as Infrared Data Association (IrDA), near field communication (NFC) or Bluetooth, or a contact-type communication means such as a Universal Serial Bus (USB) or International Organization for Standardization (ISO)-7816 standard.

For the generating and providing of the security key for the external station 150, the network manager allows the key generation apparatus 120 to have close access to the external station 150 within a communication range, in which communication is enabled, using the limited range communication means.

Figure 3A:
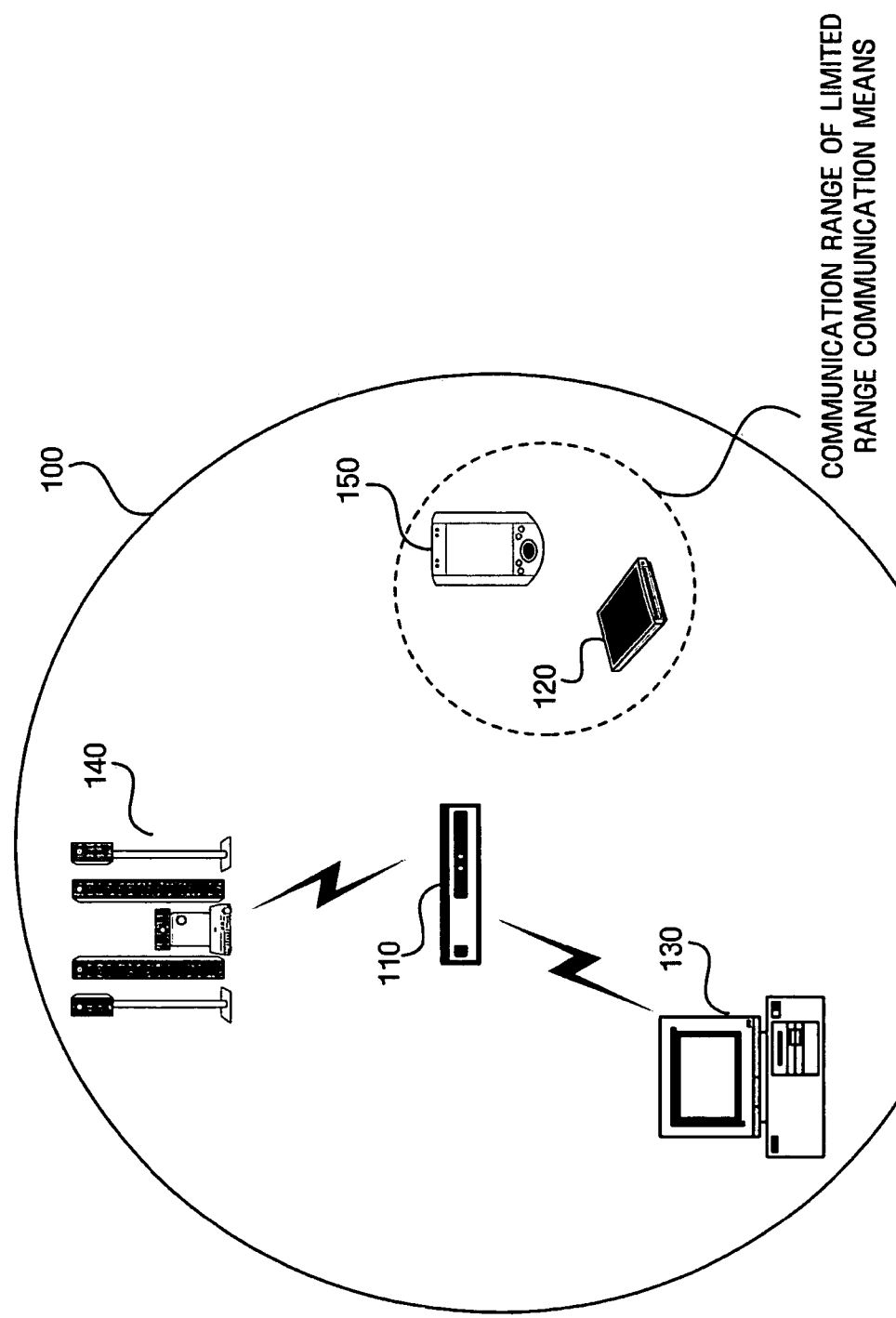
FIGS. 3A and 3B illustrate a process of allowing an external station to associate in a home network according to an exemplary embodiment of the present invention.

In other words, when the external station 150 is allowed to associate in the home network 100, the network manager allows the key generation apparatus 120 to have access to the external station 150 as shown in FIG. 3A to allow the key generation apparatus 120 and the external station 150 to communicate with each other using the limited range communication means. At this time, the external station 150 transmits the first key generation information and the second key generation information to the key generation apparatus 120 using the limited range communication means. The key generation apparatus 120 transmits the security key generated using the key generation information (the first key generation information, the second key generation information, and the third key generation information) and the initial key and the third key generation information to the external station 150 using the limited range communication means.

The external station 150 receiving the third key generation information and the security key from the key generation apparatus 120 transmits the second key generation information and the third key generation information to the access point 110. The access point 110 receiving the second key generation information and the third key generation information can generate a security key using the same key generation information, the same initial key, and the same security key generation algorithm as those used for the key generation apparatus 200 to generate the security key.

Figure 3B:
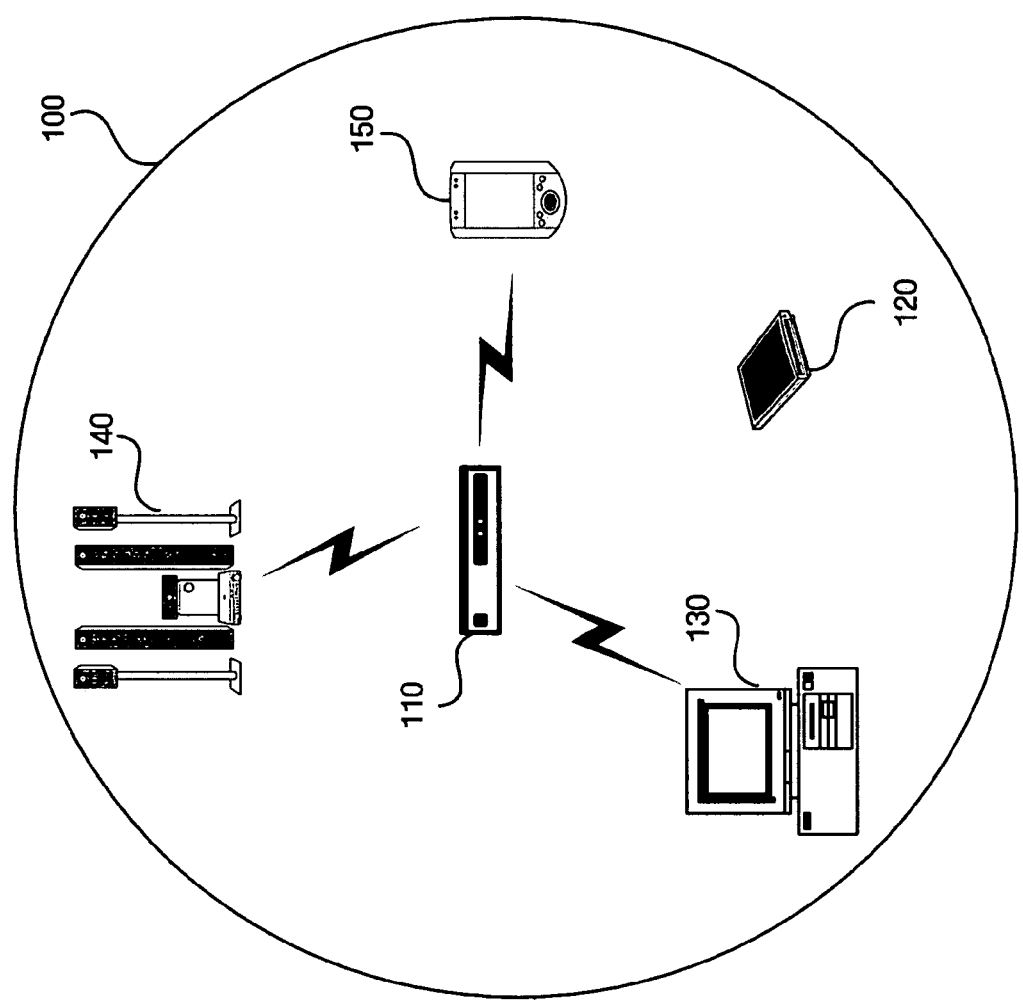

The external station 150 shares the same security key with the access point 110 and thus can associate in the home network 100 through the access point 110 as shown in FIG. 3B. When necessary, the limited range communication means may be used for communication between the access point 110 and the key generation apparatus 120.

However, the present invention is not limited to the case as described above, but communication means used for communication between the external station 150 and the key generation apparatus 120, e.g., a wireless LAN, may also be used for communication for the access point 110 and each of the stations 130 through 150.

The first key generation information, the second key generation information, and the third key generation information may include at least one parameter. For example, when the security key generation algorithm used for the access point 110 and the key generation apparatus 120 to generate the security key requires the initial key and four parameters (two MAC addresses and two random numbers) as described with reference to FIG. 1, the first key generation information may include the MAC address of the access point 110 and a first random number provided by the access point 110, the second key generation information may include the MAC address of the external station 150, and the third key generation information may include a second random number provided by the key generation apparatus 120.

The key generation apparatus 120 may generate the security key using the first key generation information, the second key generation information, and the initial key. In this case, the first key generation information may include the MAC address of the access point 110 and the first random number provided by the access point 110 and the second key generation information may include the MAC address of the external station 150 and the second random number provided by the external station 150. At this time, the key generation apparatus 120 does not generate the third key generation information.

Even after the external station 150 stops associating with the home network 100, the external station 150 does not know the initial key used in the home network 100. Thus, the external station 150 cannot generate the same security key as that generated by the access point 110 even by performing a security key generation process as shown in FIG. 1.

Although the home network has been described as an exemplary embodiment of the present invention, the present invention is not limited thereto and another form of a wireless network system including an access point, a station, and a key generation apparatus described in the present invention should be also construed as being included in the exemplary embodiment of the present invention.

When the stations 130 and 140 constituting the home network 100 associate in another home network in the exemplary embodiment shown in FIG. 2, the stations 130 and 140 can function in a similar manner to the case of the external station 150. Thus, a station 160 will be described below with reference to FIG. 4. The station 160 may be one of the stations 130 and 140 included in the home network 110 or the external station 150. For convenience of explanation, a case where the station 160 operates as one of the stations 130 and 140 included in the home network 100 will be referred to as a home mode and a case where the station 160 operates as the external station 150 will be referred to as a visit mode.

Figure 4:
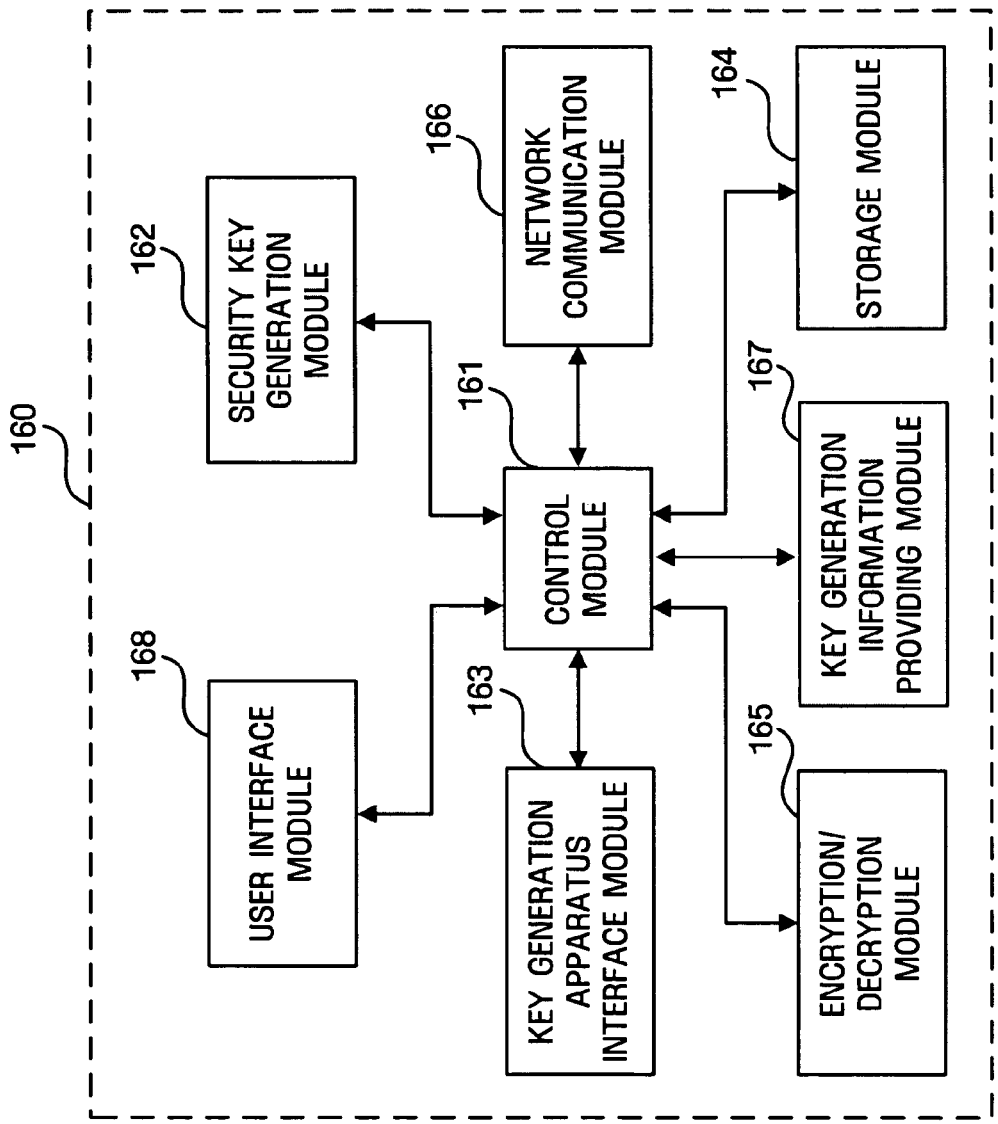
FIG. 4 is a block diagram of a station according to an exemplary embodiment of the present invention.

FIG. 4 is a block diagram of a station 160 according to an exemplary embodiment of the present invention.

The station 160 includes a control module 161, a security key generation module 162, a key generation apparatus interface module 163, a storage module 164, an encryption/decryption module 165, a network communication module 166, a key generation information providing module 167, and a user interface module 168.

The control module 161 controls an operation of each of the modules 162 through 168 of the station 160. The control module 161 computes an MIC using a security key for checking message integrity and compares an MIC transmitted from the access point 110.

The control module 161 can perform authentication and connection with the access point 110. For such authentication and connection, an open authentication procedure defined in the IEEE 802.11 standard may be used.

The control module 161 can determine whether the station 160 should operate in the home mode or the visit mode through authentication. When the control module 161 stores information (e.g., the MAC address of an access point or authentication information) for the access point that performs communication in the home mode via the network communication module 166 in the storage module 164 and performs authentication with a random access point, the determination may be performed by comparing information about the random access point with the information stored in the storage module 164.

According to another exemplary embodiment of the present invention, when receiving from the network manager a request for operation in the home mode or the visit mode through the user interface module 168, the control module 161 can control the modules of the station 160 to operate in the requested mode.

When operating in the home mode, the control module 161 sets the security key generated by the security key generation module 162 to maintain security in communication with the access point 110. However, when operating in the visit mode, the control module 161 sets the security key transmitted from the key generation apparatus 120 to maintain security in communication with the access point 110.

The security key generation module 162 generates a security key using the first key generation information provided by the access point 110, the second key generation information provided by the key generation information providing module 167, the initial key stored in the storage module 164. The security key generation by the security key generation module 162 may be performed when the station 160 operates in the home mode.

The key generation apparatus interface module 163 manages communication between the station 160 and the key generation apparatus 120. In other words, the key generation apparatus interface module 163 transmits the first key generation information and the second key generation information to the key generation apparatus 120 or receives the third key generation information or the security key from the key generation apparatus 120. Since data transmitted and received through the key generation apparatus interface module 163 is important for maintaining the security of the home network 100, it is necessary to prevent other external stations adjacent to the home network 100 from sensing the data. To this end, the key generation apparatus interface module 163 may use the limited range communication means stated above. In other words, it is preferable that the limited range communication means used by the key generation apparatus interface module 163 have a narrower communication range than communication means (e.g., a wireless LAN) used for communication between the access point 110 and the station 160 in the home network 100 or have significant restrictions on a communication direction. Thus, the communication used by the key generation apparatus interface module 163 has a narrower communication range than the communication used by the network communication module 166. The limited range communication means is implemented in either a non-contact type communication means such as IrDA, NFC or Bluetooth, or a contact-type communication means such as a USB or ISO-7816 standard.

However, the present invention is not limited to the above description, but the key generation apparatus interface module 163 may use the same communication means as the network communication module 166. In this case, the key generation apparatus interface module 163 may be implemented as a function block incorporated into the network communication module 166.

The storage module 164 stores the first key generation information received from the access point 110, the second key generation information provided by the key generation information providing module 167, and the third key generation information and security key transmitted from the key generation apparatus 120.

The encryption/decryption module 165 encrypts data to be transmitted by the network communication module 166 to the access point 110 using the security key stored in the storage module 164 and decrypts the encrypted data received by the network communication module 166 from the access point 110.

The security key used by the encryption/decryption module 165 is set by the control module 161. In other words, the encryption/decryption module 165 uses the security key generated by the security key generation module 162 in the home mode and uses the security key received from the key generation apparatus 120 in the visit mode.

The network communication module 166 manages communication between the station 160 and the access point 110. In other words, the network communication module 166 receives the first key generation information from the access point 110 and transmits the second key generation information and the third key generation information to the access point 110. The network communication module 166 transmits data encrypted by the encryption/decryption module 165 to the access point 110 and receives data transmitted from the access point 110. A wireless LAN may be used as the communication for the network communication module 166. Preferably, but not necessarily, the network communication module 166 may perform communication according to a wireless LAN protocol defined in the IEEE 802.11 standard.

The key generation information providing module 167 provides the second key generation information required to generate the security key. The second key generation information may include the MAC address of the station 160 or a predetermined random number. However, the present invention is not limited to such a configuration of the second key generation information, and the second key generation information may include other parameters according to an algorithm used to generate the security key.

Control information of the network manager is input to the user interface module 168. For example, the network manager may issue a command for the station 160 to be converted into the home mode or the visit mode through the user interface module 168.

Figure 5:
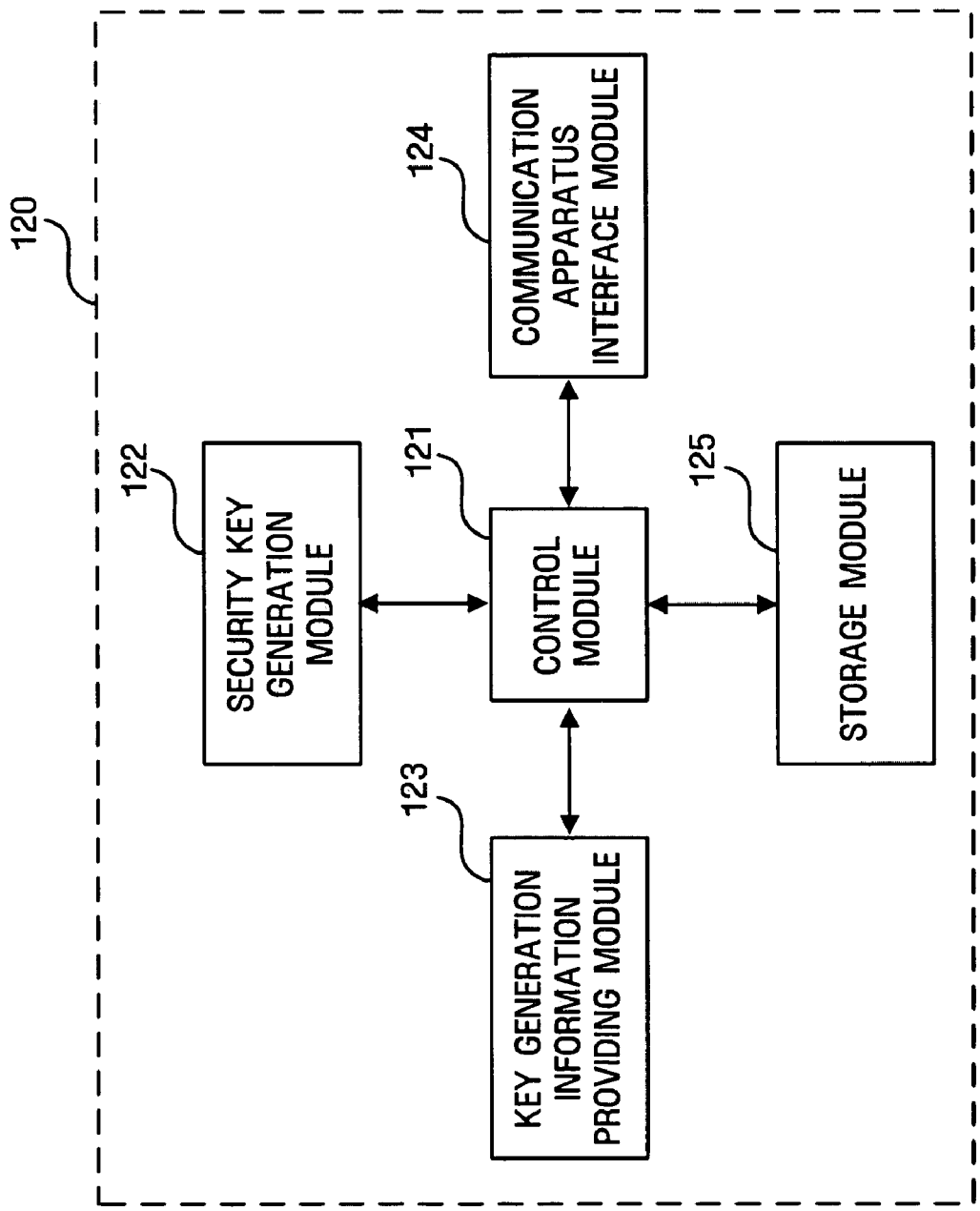
FIG. 5 is a block diagram of a key generation apparatus according to an exemplary embodiment of the present invention.

FIG. 5 is a block diagram of a key generation apparatus according to an exemplary embodiment of the present invention.

The key generation apparatus 120 includes a control module 121, a security key generation module 122, a key generation information providing module 123, a communication apparatus interface module 124, and a storage module 125.

The control module 121 controls an operation of each of the modules 122 through 125 of the key generation apparatus 120. In particular, the control module 121 transmits the third key generation information provided by the key generation information providing module 123 or the security key generated by the security key generation module 122 to the station 160 through the communication apparatus interface module 124. The control module 121 restricts the station 160 from accessing the initial key stored in the storage module 125, thereby preventing the initial key from being revealed outside the home network 100.

The control module 121 can perform a predetermined authentication process with the station 160 and can strengthen security in communication with the station 160 through the authentication process.

When an access of the station 160 is forcibly terminated, the control module 121 may send identification information of the external station 150 as well as a disassociation request, to the access point 110 through the communication apparatus interface module 124.

Upon the access point 110 confirming the disassociation of the station 160 from the home network 100, the control module 121 may deactivate the identification information of the station 160 stored in the storage module 125.

The security key generation module 122 generates a security key using the first key generation information and the second key generation information transmitted from the station 160, the third key generation information provided by the key generation information providing module 123, and the initial key stored in the storage module 125. The security key generation module 122 may generate a security key using the first key generation information and the second key generation information transmitted from the station 160 and the initial key stored in the storage module 125. A security key generation algorithm for the security key generation is the same as a security key generation algorithm used by the access point 110. To prevent an arbitrary station from accessing to the security key without permission, operations of the security key generation module 122 associated with the security key generation may be performed in a physically/logically protected area.

The key generation information providing module 123 provides the third key generation information required for security key generation.

The communication apparatus interface module 124 manages communication between the station 160 and the access point 110. More specifically, the communication apparatus interface module 124 receives the first key generation information and the second key generation information from the station 160 and transmits the third key generation information provided by the key generation information providing module 123 and the security key generated by the security key generation module 122 to the station 160. The communication apparatus interface module 124 transmits the request to disassociate the station 160 from the home network 100 and the identification information of the station 160 to the access point 110. At this time, since data transmitted and received through the communication apparatus interface module 124 is important for maintaining the security of the home network 100, it is necessary to prevent other external stations adjacent to the home network 110 from sensing the data. To this end, the communication apparatus interface module 124 may use the limited range communication means stated above. In other words, it is preferable that the limited range communication means used by the communication apparatus interface module 124 has a narrower communication range than communication means (e.g., a wireless LAN) used for communication between the access point 110 and the station 160 in the home network 100 or has significant restrictions on a communication direction. The communication means used by the communication apparatus interface module 124 may be the same as communication means used for communication between the access point 110 and the station 160 in the home network 100, e.g., a wireless LAN. Limited range communication means is implemented in either a non-contact type communication means such as IrDA, NFC or Bluetooth, or a contact-type communication means such as a USB or ISO-7816 standard.

However, the present invention is not limited to the above description, and the storage module 125 may store the first key generation information and the second key generation information transmitted from the station 160.

The storage module 125 stores the initial key used in the home network 100. It is preferable that the initial key stored in the storage module 125 is protected from being accessed by the station 160. To this end, the storage module 125 may store the initial key in a storage area that is physically or logically separated from an area in which data received from the station 160 is stored.

The key generation apparatus 120 further includes a network communication module (not shown), an encryption/decryption module (not shown), and a user interface module (not shown) and thus may function as a station of the home network 100. The network communication module, the encryption/decryption module, and the user interface module that can be included in the key generation apparatus 120 may be understood as being the same as the network communication module 166, the encryption/decryption module 165, and the user interface module 168 of the station 160 shown in FIG. 4. If the communication apparatus interface module 124 uses the same communication means as that used for communication between the access point 110 and the station 160, e.g., a wireless LAN, the network communication module and the communication apparatus interface module 124 of the key generation apparatus 120 may be implemented as one incorporated function block.

Figure 6:
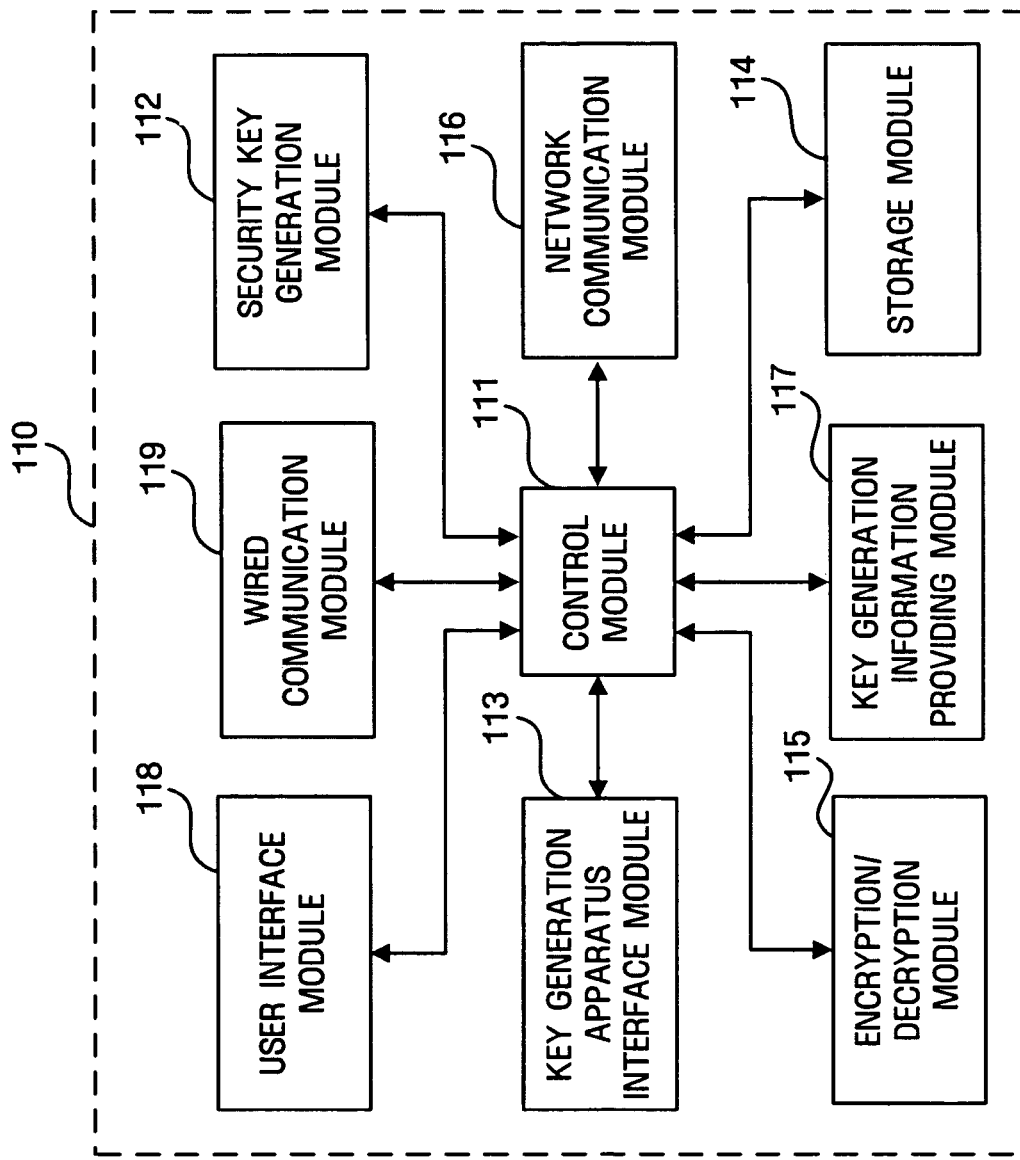
FIG. 6 is a block diagram of an access point according to an exemplary embodiment of the present invention.

FIG. 6 is a block diagram of an access point according to an exemplary embodiment of the present invention.

The access point 110 includes a control module 111, a security key generation module 112, a key generation apparatus interface module 113, a storage module 114, an encryption/decryption module 115, a network communication module 116, a key generation information providing module 117, a user interface module 118, and a wired communication module 119.

The control module 111 controls an operation of each of the modules 112 through 118 of the access point 110. To check message integrity, the control module 111 may compute an MIC using the security key and compare the computed MIC with an MIC transmitted from the station 160.

The control module 111 can perform authentication and connection with the station 160 via the network communication module 116. For such authentication and connection, an open authentication procedure defined in the IEEE 802.11 standard may be used.

Upon receipt of the request to disassociate the station 160 in the home network 100 from the key generation apparatus 120 through the key generation apparatus interface module 113, the control module 111 may forcedly disassociate the station 160 in the home network 100. For example, upon receipt of the request to disassociate the station 160 and identification information (e.g., the MAC address of the station 160) for identifying the station 160, the control module 111 disassociates the station 160 in the home network 100 using the identification information. At this time, the control module 111 may deactivate the security key used in communication with the station 160 in the storage module 114.

After disassociation of the station 160, the control module 111 may transmit information indicating that the station 160 has been disassociated from the home network 100 to the key generation apparatus 120 through the key generation apparatus interface module 113.

The security key generation module 112 may generate a security key using the first key generation information, the second key generation information, and the initial key stored in the storage module 114. A security key generation algorithm used by the security key generation module 112 is the same as that used by the key generation apparatus 120.

The security key generation apparatus interface module 113 manages communication between the access point 110 and the key generation apparatus 120. The key generation apparatus interface module 113 may use the limited range communication means stated above. In other words, it is preferable that the limited range communication means used by the key generation apparatus interface module 113 have a narrower communication range than communication means (e.g., a wireless LAN) used for communication between the access point 110 and the station 160 in the home network 100 or have significant restrictions on a communication direction. The key generation apparatus interface module 113 may use the same communication means as that of the network communication module 116. The limited range communication means is implemented in either a non-contact type communication means such as IrDA, NFC or Bluetooth, or a contact-type communication means such as a USB or ISO-7816 standard. However, the present invention is not limited to the above description, and the key generation apparatus interface module 163 may use the same communication means as that of the network communication module 166. In this case, the key generation apparatus interface module 113 may be implemented as a function block integrated with the network communication module 116.

The storage module 114 stores the second key generation information and the third key generation information received from the station 160, the first key generation information provided by the key generation information providing module 117, the security key generated by the security key generation module 112, and the initial key. The initial key stored in the storage module 114 is the same as that stored by the key generation apparatus 120. It is preferable that the initial key be stored in an area physically or logically protected from being accessed by other apparatuses.

The encryption/decryption module 115 encrypts data to be transmitted via the network communication module 116 using the security key stored in the storage module 114 and decrypts the encrypted data received via the network communication module 116.

The network communication module 116 manages communication with the station 160. In other words, the network communication module 116 transmits data encrypted by the encryption/decryption module 115 to the station 160 and receives data transmitted from the station 160. The network communication module 116 transmits the first key generation information to the station 160 and receives the second key generation information and the third key generation information from the station 160.

A wireless LAN may be used as the communication used by the network communication module 166. It is preferable that the network communication module 166 perform communication according to wireless LAN protocol defined in the IEEE 802.11 standard.

The key generation information providing module 117 provides the first key generation information required for the generation of the security key.

Control information of the network manager for controlling the access point 110 is input to the user interface module 118.

The wired communication module 119 connects the access point 110 to a wired network. The access point 110 may be connected to another access point or an external wired network via the wired communication module 119.

To share the same initial key in the access point 110 to the stations 130 and 140 and the key generation apparatus 120 of the home network 100, an initial key providing apparatus (not shown) may be used.

The initial key providing apparatus may transmit the initial key to the stations 130 and 140 and the key generation apparatus 120 via the limited range communication means. To this end, the initial key providing apparatus may store the same initial key as used in the home network 100.

The initial key providing apparatus may perform predetermined authentication with the access point 110 and receive the initial key from the access point 110.

To prevent the external station 150 from obtaining the initial key through the initial key providing apparatus without permission, the initial key providing apparatus may perform predetermined authentication in which it is checked whether a corresponding station is one of the stations 130 and 140 of the home network 100 before providing the initial key to the corresponding station. The initial key providing apparatus restricts initial key transmission according to a result of the authentication, thereby preventing the initial key from being revealed to the external station 150.

Figure 7:
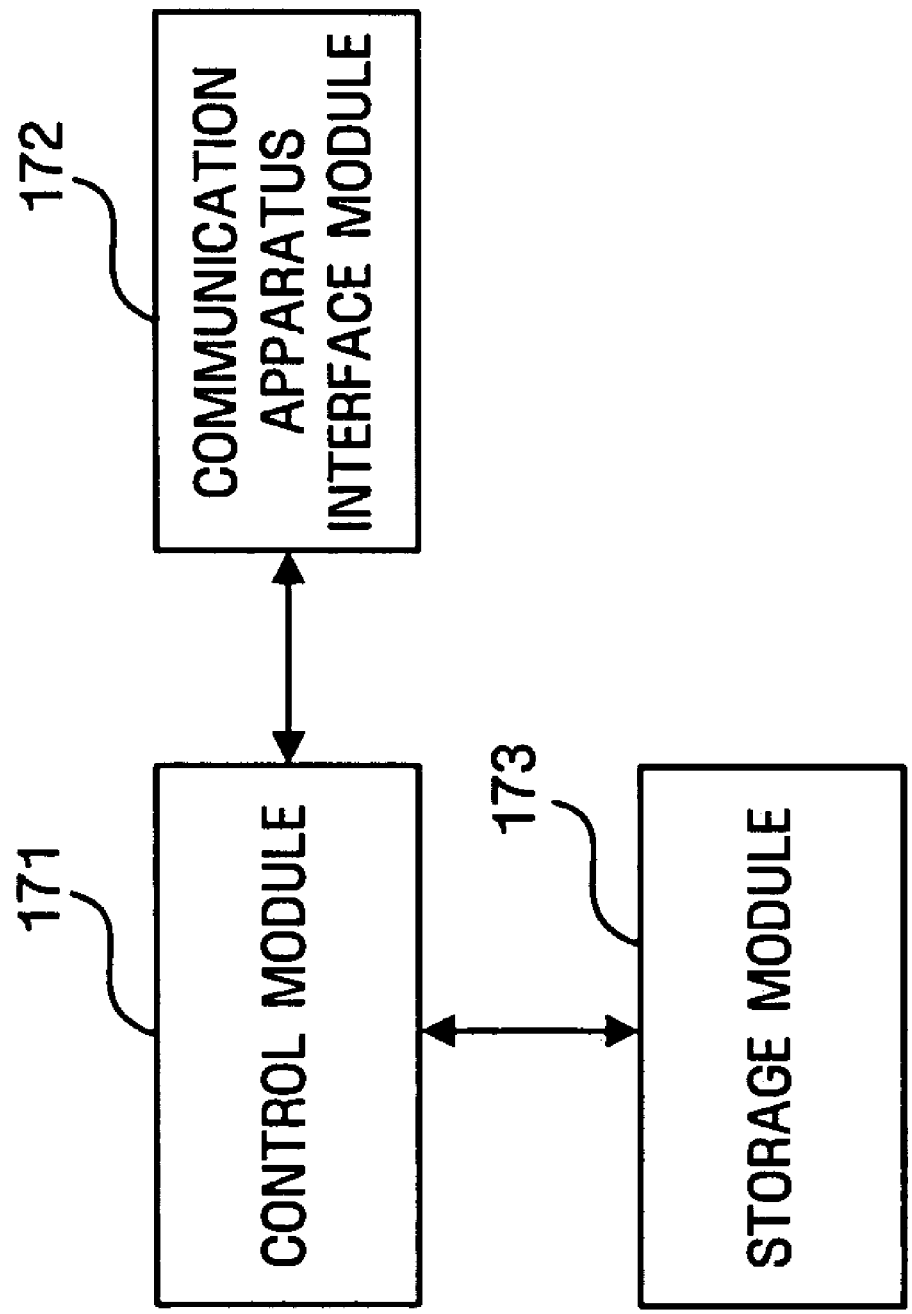
FIG. 7 is a block diagram of an initial key providing apparatus according to an exemplary embodiment of the present invention.

FIG. 7 is a block diagram of an initial key providing apparatus according to an exemplary embodiment of the present invention.

The initial key providing apparatus includes a control module 171, a communication apparatus interface module 172, and a storage module 173. The role of the initial key providing apparatus is to transmit an initial key used in a home network to stations that are members of the home network when the stations initially join the home network.

To this end, the initial key providing apparatus receives the initial key from the access point 110 through the communication apparatus interface module 172 and stores the received initial key in the storage module 173. Thereafter, the initial key stored in the storage module 173 is transmitted to the stations of the home network through the communication apparatus interface module 172. At this time, the control module 171 may perform predetermined authentication with a station to which the initial key is to be transmitted.

Such blocks of the initial key providing apparatus may function in a similar manner to the case of blocks of the key generation apparatus 120 shown in FIG. 5. In other words, the control module 171, the communication apparatus interface module 172, and the storage module 173 of the initial key providing apparatus may function in a similar manner to the case of the control module 121, the communication apparatus interface module 124, and the storage module 125 of the key generation apparatus 120.

Thus, the key generation apparatus 120 may also play a role of the initial key providing apparatus. For example, a user may request the key generation apparatus 120 to operate as the initial key providing apparatus through a user interface module (not shown) of the key generation apparatus 120, and the control module 121 may control the key generation apparatus 120 to function as the initial key providing apparatus at the user's request.

Figure 8:
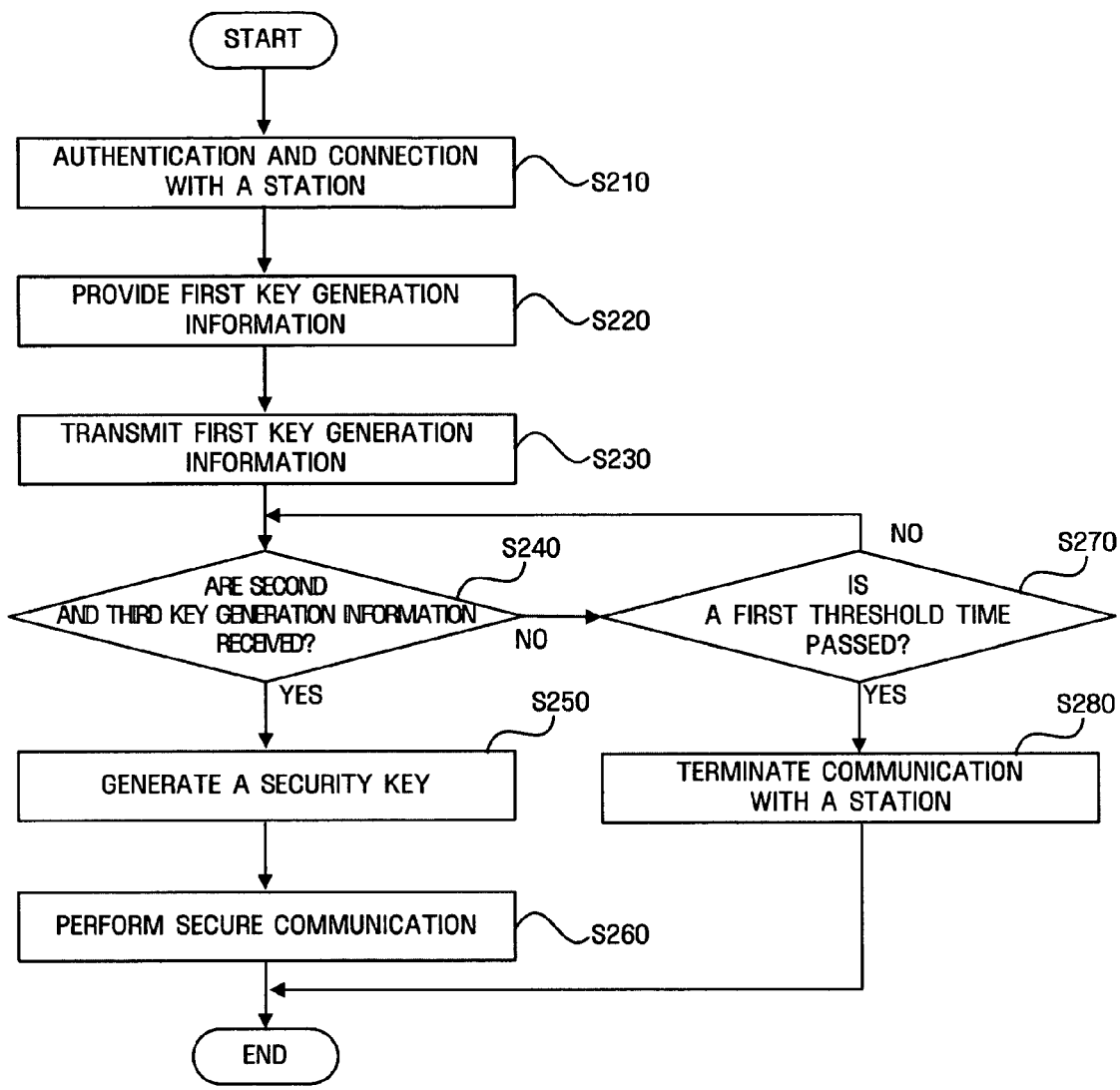
FIG. 8 is a flowchart illustrating, from a viewpoint of an access point, a method of managing communication security according to an exemplary embodiment of the present invention.

FIG. 8 is a flowchart illustrating, from a viewpoint of an access point, a method of managing communication security according to an exemplary embodiment of the present invention.

When the station 160 operates in the home mode, a security key setting process may be performed in the same manner as in the conventional process. The present exemplary embodiment and following exemplary embodiments of the present invention involve a case where the station 160 operates in the visit mode.

In operation S210, the control module 111 of the initial access point 110 is subjected to authentication and connection with the station 160 via the network communication module 116. For such authentication and connection, an open authentication procedure defined in the IEEE 802.11 standard may be used.

Upon completion of the authentication and connection, the key generation information providing module 117 of the access point 110 provides the first key generation information in operation S220. The first key generation information may include the first random number and the MAC address of the access point 110.

In operation S230, the control module 111 transmits the first key generation information provided by the key generation information providing module 117 to the station 160 via the network communication module 116.

Upon receipt of the second key generation information provided by the station 160 and the third key generation information provided by the key generation apparatus 120 via the network communication module 116 in operation S240, the security key generation module 112 generates a security key using the first key generation information, the second key generation information, the third key generation information, and the initial key stored in the storage module 114 in operation S250. Here, the second key generation information may include the MAC address of the station 160 and the third generation information may include a second random number.

The access point 110 may perform secure communication with the station 160 using the security key in operation S260. In other words, data transmitted to the station 160 is transmitted after being encrypted by the encryption/decryption module 115 using the security key and encrypted data received from the station 160 is decrypted by the encryption/decryption module 115 using the security key.

If the second key generation information and the third key generation information are not received from the station 160 after the first key generation information is transmitted in operation S230, the control module 111 determines whether a first threshold time has passed from the point of the transmission of the first key generation information in operation S270.

If the second key generation information and the third key generation information have not been received even after the first threshold time has elapsed, the control module 111 terminates communication with the station 160 in operation S280.

Figure 9:
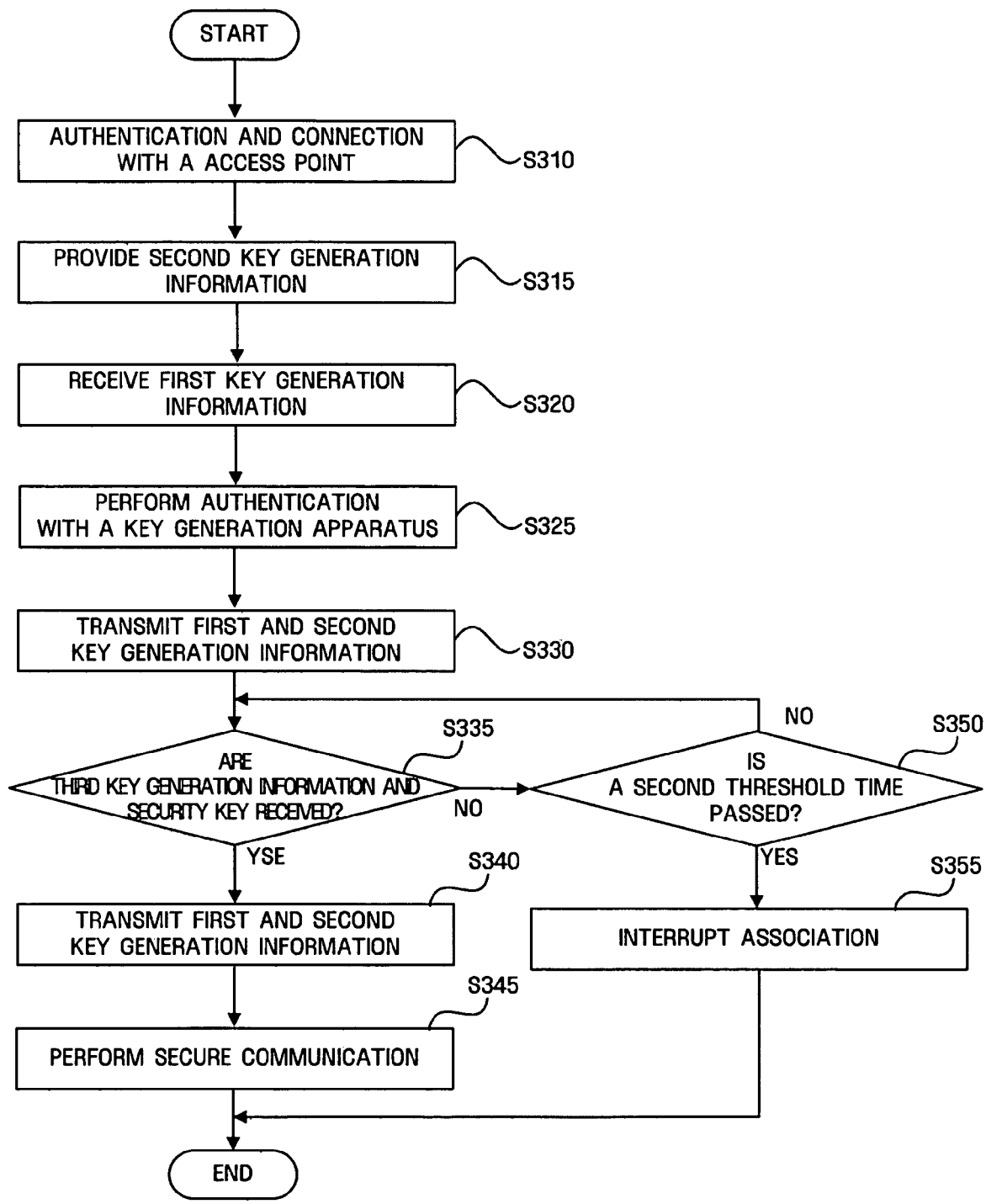
FIG. 9 is a flowchart illustrating, from a viewpoint of a station, a method for managing communication security in a wireless network according to an exemplary embodiment of the present invention.

FIG. 9 is a flowchart illustrating, from a viewpoint of a station, a method for managing communication security in a wireless network according to an exemplary embodiment of the present invention.

The control module 161 of the station 160 operating in the visit mode performs authentication and connection with the access point 110 in operation S310. For such authentication and connection, an open authentication procedure defined in the IEEE 802.11 standard may be used.

Upon completion of the authentication and connection, the key generation information providing module 167 provides the second key generation information in operation S315. The second key generation information may include an MAC address of the station 120.

Upon receipt of the first key generation information from the access point 110 via the network communication module 166 in operation S320, the control module 161 performs authentication with the key generation apparatus 120 through the key generation apparatus interface module 163 in operation S325. If the key generation apparatus 120 is not included in a communication available range using the key generation apparatus interface module 163, the control module 161 may interrupt the association of the station 160 in the home network 100. The first key generation information received from the access point 110 may include a first random number and an MAC address of the access point 110.

Upon completion of the authentication with the key generation apparatus 120, the control module 161 transmits the first key generation information and the second key generation information to the key generation apparatus 120 through the key generation apparatus interface module 163 in operation S330.

Once the key generation apparatus interface module 163 receives the third key generation information and the security key from the key generation apparatus 120 in operation S335, the control module 161 stores the received security key in the storage module 164 and transmits the second key generation information and the third key generation information to the access point 110 via the network communication module 166 in operation S340. The third key generation information received from the key generation apparatus 120 may include a second random number.

The station 160 may perform secure communication with the access point 110 using the security key received from the key generation apparatus 120 in operation S345. In other words, data transmitted to the access point 110 is transmitted after being encrypted by the encryption/decryption module 165 using the security key received from the key generation apparatus 120 and encrypted data received from the access point 110 is decrypted by the encryption/decryption module 165 using the security key.

If the third key generation information and the security key are not received from the key generation apparatus 120 after the first key generation information and the second key generation information are transmitted to the key generation apparatus 120 in operation S330, the control module 161 determines whether a second threshold time has passed from a point of the transmission of the first key generation information and the second key generation information in operation S350.

If the third key generation information and the security key have not been received after the second threshold time has passed, the control module 161 may interrupt association of the station 160 in the home network 100 in operation S355.

Figure 10:
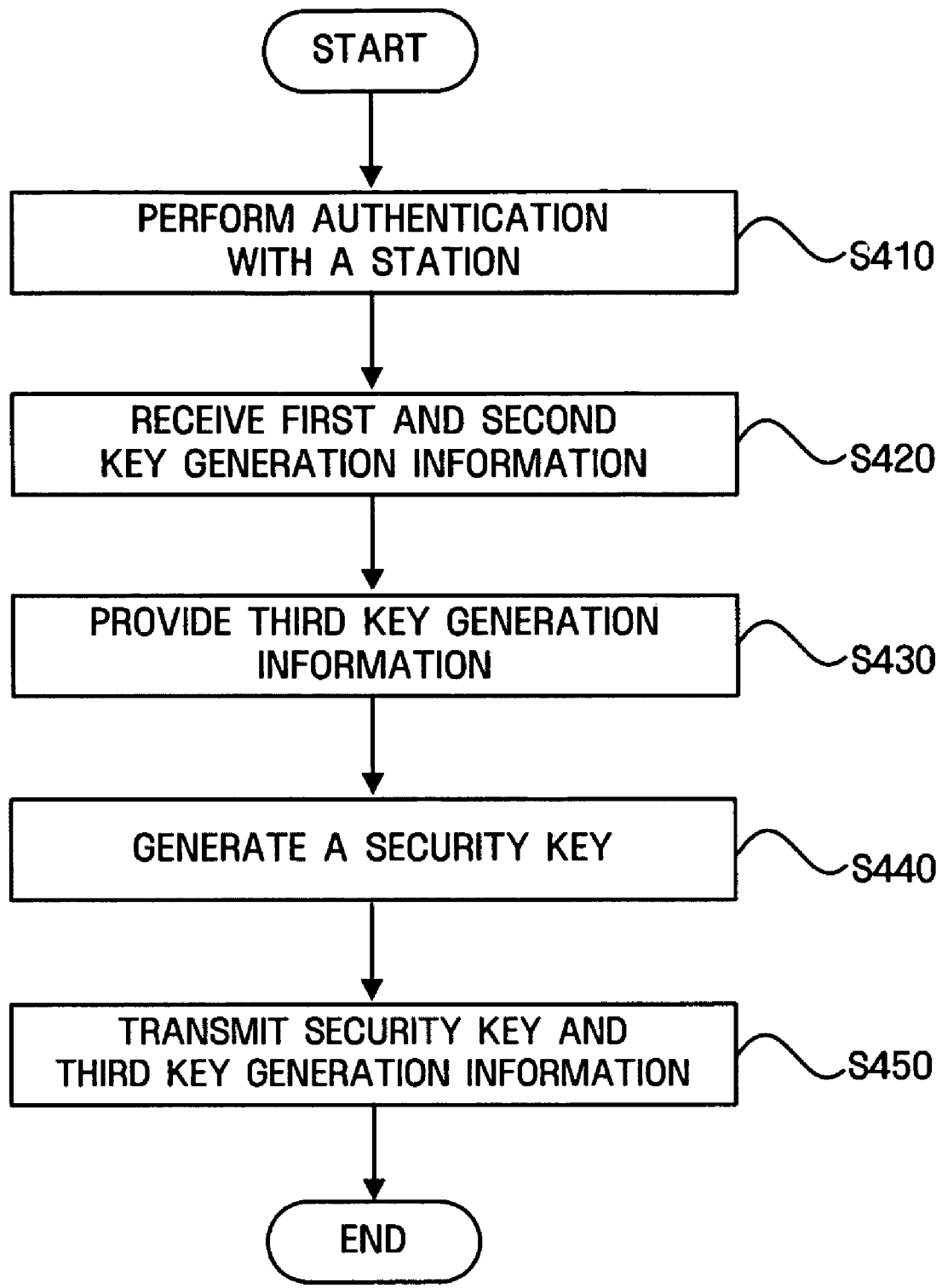
FIG. 10 is a flowchart illustrating, from a viewpoint of a key generation apparatus, a method for managing communication security in a wireless network according to an exemplary embodiment of the present invention.

FIG. 10 is a flowchart illustrating, from a viewpoint of a key generation apparatus, a method for managing communication security in a wireless network according to an exemplary embodiment of the present invention.

First, the control module 121 performs an authentication process with respect to the station 160 in operation S410. Upon receipt of the first key generation information and the second key generation information from the station 160 through the communication apparatus interface module 124 in operation S420, the key generation information providing module 123 provides the third key generation information in operation S430. Here, the first key generation information may include a first random number and an MAC address of the access point 110, the second key generation information may include an MAC address of the station 160, and the third key generation information may include a second random number.

The security key generation module 122 generates a security key using the first key generation information and the second key generation information received from the station 160, the third key generation information provided by the key generation information providing module 123, and the initial key stored in the storage module 125 in operation S440.

Upon generation of the security key, the control module 121 transmits the third key generation information and the security key to the station 160 through the communication apparatus interface module 124 in operation S450.

The operations of the access point 110, the station 160, and the key generation apparatus 120 have been described with reference to FIGS. 8 through 10. To facilitate a better understanding of a security key generation process according to the present invention, interaction among the access point 110, the station 160, and the key generation apparatus 120 will now be described with reference to FIG. 11.

Figure 11:
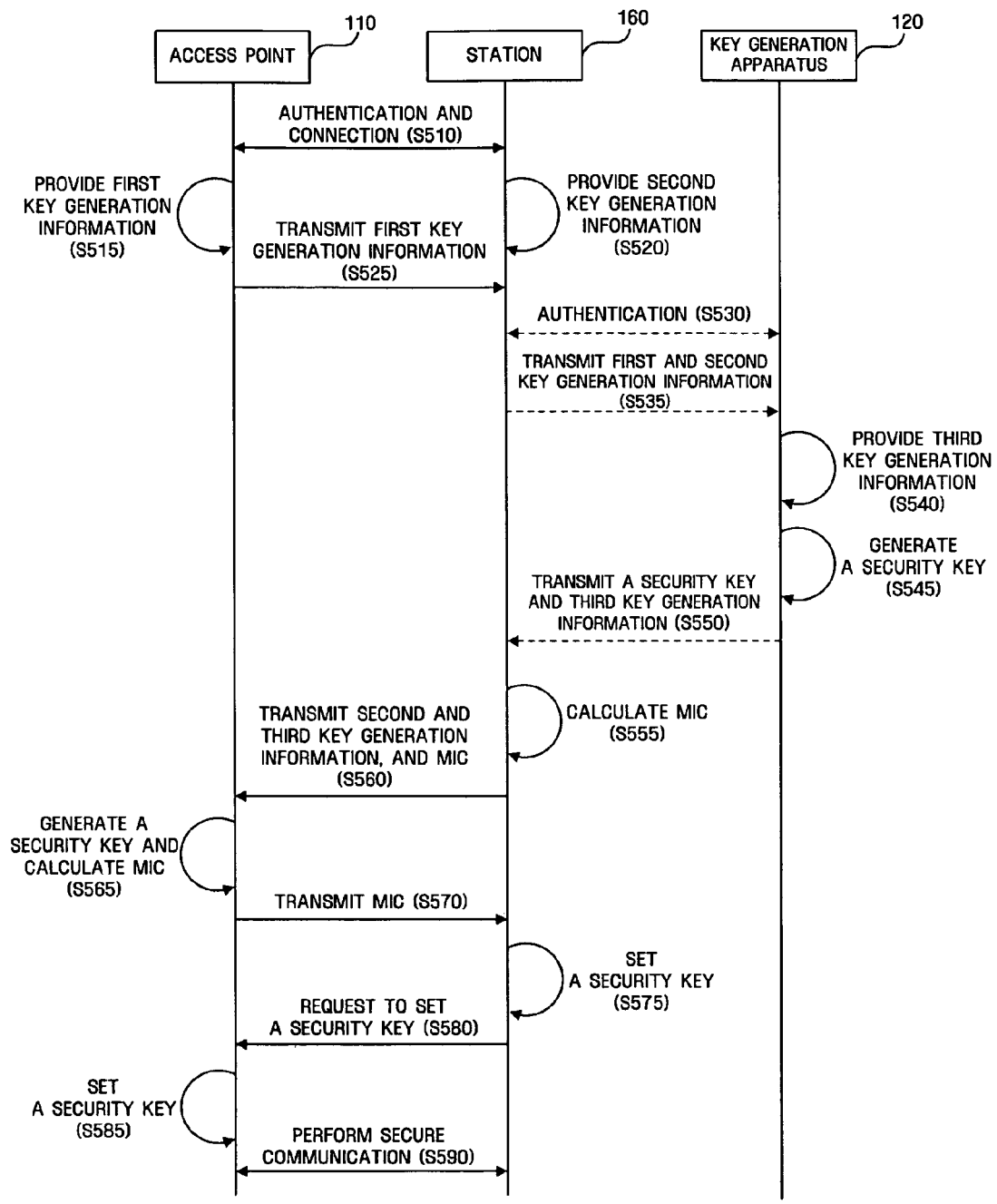
FIG. 11 is a flowchart illustrating a method of maintaining communication security in a wireless network according to an exemplary embodiment of the present invention.

FIG. 11 is a flowchart illustrating a method of maintaining communication security in a wireless network according to an exemplary embodiment of the present invention.

In the exemplary embodiment of the present invention, solid line arrows indicate operations performed by communication means (e.g., a wireless LAN) of the home network and dotted line arrows indicate operations performed by limited range communication means. However, such indication is only taken as an example, and an operation indicated by a dotted line arrow may be performed by communication means (e.g., a wireless LAN) of the home network 100.

First, the station 160 is subject to authentication and connection with the access point 110 in operation S510. For such authentication and connection, an open authentication procedure defined in the IEEE 802.11 standard may be used.

Upon completion of the authentication and connection, the access point 110 provides the first key generation information in operation S515. At this time, the first key generation information may include a first random number and an MAC address of the access point 110.

The station 160 provides the second key generation information in operation S520. The second key generation information may include an MAC address of the station 160.

The control module 111 of the access point 110 transmits the first key generation information to the station 160 via the network communication module 116 in operation S525.

Once, the network communication module 166 of the station 160 receives the first key generation information from the access point 110, the control module 161 performs authentication with the key generation apparatus 120 through the key generation apparatus interface module 163 in operation S530. The control module 161 of the station 160 transmits the first key generation information received from the access point 110 and the second key generation information to the key generation apparatus 120 through the key generation apparatus interface module 163 in operation S535.

Once the communication apparatus interface module 124 of the key generation apparatus 120 receives the first key generation information and the second key generation information from the station 160, the key generation information providing module 123 provides the third key generation information in operation S540. The third key generation information may include the second random number.

The security key generation module 122 generates the first key generation information, the second key generation information, the third key generation information, and the initial key using the security key in operation S545.

Upon the generation of the security key, the control module 121 transmits the third key generation information and the security key to the station 160 through the communication apparatus interface module 124 in operation S550.

Once the key generation apparatus interface module 163 of the station 160 receives the third key generation information and the security key from the key generation apparatus 120, the control module 161 may compute an MIC using the security key received from the key generation apparatus 120 in operation S555.

The control module 161 transmits the second key generation information, the third key generation information, and the MIC to the access point 110 via the network communication module 166 in operation S560.

Once the network communication module 116 of the access point 110 receives the second key generation information, the third key generation information, and the MIC from the station 160, the security key generation module 112 generates a security key using the second key generation information and the third key generation information, the first key generation information generated in operation S515, and the initial key and the control module 111 computes an MIC using the security key generated by the security key generation module 112 in operation S565. At this time, the control module 111 may compare the MIC received from the station 160 and the its computed MIC. If the two MICs are not the same, the control module 111 may interrupt communication with the station 160.

However, if the MIC received from the station 160 and the MIC computed by the control module 111 are the same, the control module 111 transmits its computed MIC to the station 160 via the network communication module 116 in operation S570.

Once the network communication module 166 of the station 160 receives an MIC from the access point 110, the control module 161 compares the received MIC and its computed MIC. If the two MICs are the same, the control module 161 sets the security key received from the station 160 in operation S550 to maintain security in communication with the access point 110 in operation S575. At this time, if the MIC received from the access point 110 and the MIC computed by the control module 161 are not the same, the control module 161 may interrupt communication with the access point 110.

After setting the security key, the control module 161 of the station 160 requests the access point 110 to set the security key via the network communication module 166 in operation S580. Once the network communication module 116 of the access point 110 receives a request to set the security key from the station 160, the control module 111 sets the security generated in operation S565 to maintain security in communication with the station 160 in operation S585.

Thus, the access point 110 and the station 160 can set the same security key without the initial key used by the home network being revealed to the station 160.

The access point 110 and the station 160 setting the same security key can perform secure communication using the security key in operation S590.

Operations S525, S560, S570, and S580 shown in FIG. 11 may correspond to first message sending (S125), second message sending (S135), third message sending (S145), and fourth message sending (S155), respectively.

According to another exemplary embodiment of the present invention, the key generation apparatus 120 may generate a security key using the first key generation information and the second key generation information received from the station 160 and the initial key. In other words, in this case, the key generation apparatus 120 does not provide the third key generation information, which will now be described with reference to FIG. 12.

Figure 12:
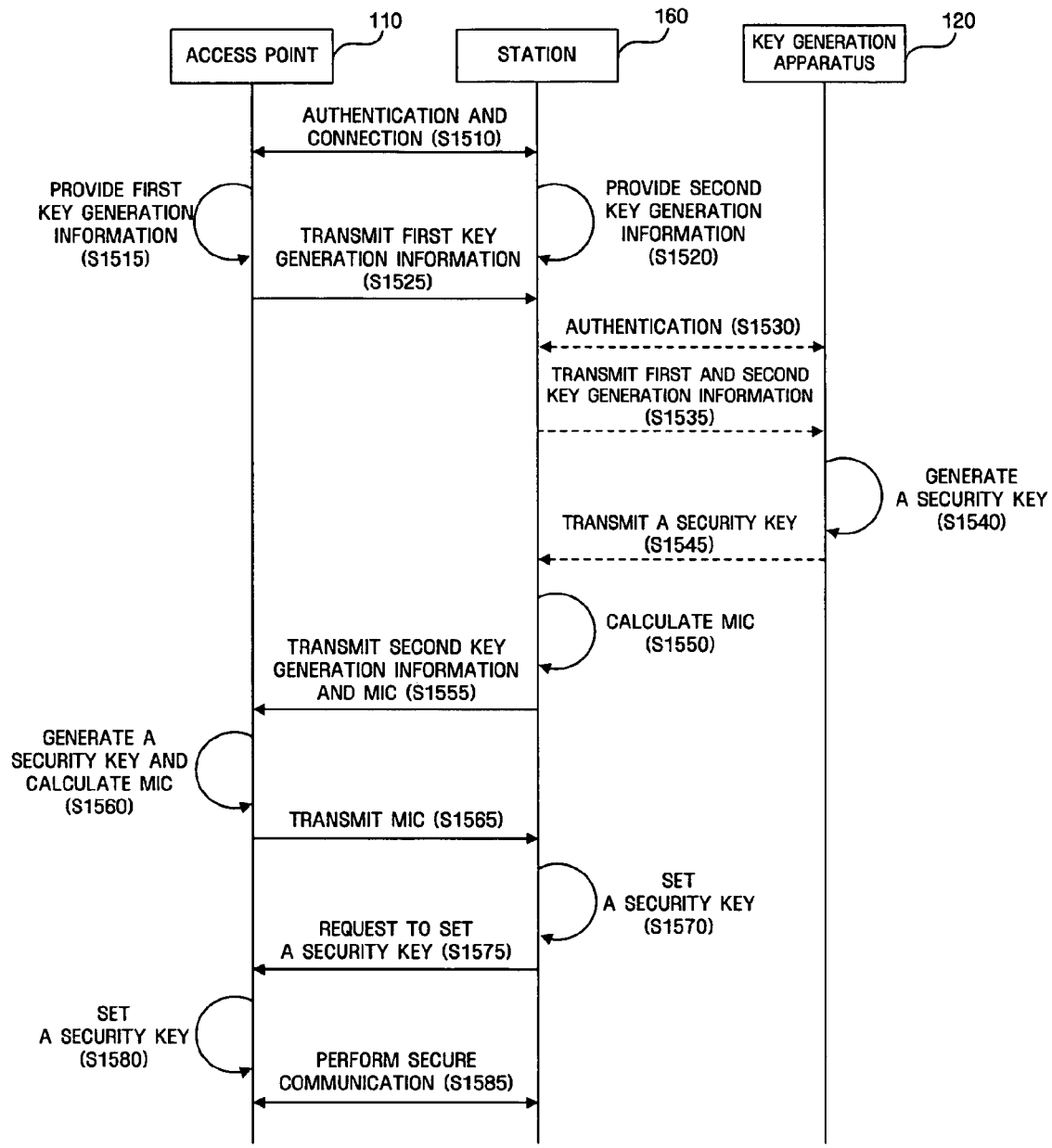
FIG. 12 is a flowchart illustrating a method of maintaining communication security in a wireless network according to an exemplary embodiment of the present invention.

FIG. 12 is a flowchart illustrating a method of maintaining communication security in a wireless network according to an exemplary embodiment of the present invention.

Referring to FIG. 12, solid line arrows indicate operations performed by communication means (e.g., a wireless LAN) in the home network 100, and dotted line arrows indicate operations performed by limited range communication means, which is, however, illustration only, and the operations indicated by the dotted line arrows may be performed by communication means in the home network 100, e.g., a wireless LAN.

In operation S1510, a first station 160 and an access point 110 are subjected to authentication and connection. For such authentication and connection, an open authentication procedure defined in the IEEE 802.11 standard may be used.

Upon completion of the authentication and connection, the access point 110 provides first key generation information in operation S1515. The first key generation information may comprise a first random number and the MAC address of the access point 110.

In operation S1520, the station 160 provides second key generation information. The second key generation information may comprise a second random number and the MAC address of the station 160.

Thereafter, the control module 111 of the access point 110 transmits the first key generation information to the station 160 via the network communication module 116 in operation S1525.

Once network communication module 166 of the station 160 receives the first key generation information from the access point 110, the control module 161 performs an authentication process with respect to the key generation apparatus 120 through the key generation apparatus interface module 163 in operation S1530. In operation S1535, the control module 161 of the station 160 transmits the first key generation information received from the access point 110 and the second key generation information, which is provided by itself, to the key generation apparatus 120 through the key generation apparatus interface module 163.

In operation S1540, if the communication apparatus interface module 124 of the key generation apparatus 120 receives the first key generation information and the second key generation information from the station 160, the security key generation module 122 generates a security key using the first key generation information, second key generation information, third key generation information, and the initial key.

Once the security key is generated, the control module 121 transmits the security key to the station 160 via the communication apparatus interface module 124 in operation S1545.

If the key generation apparatus interface module 163 of the station 160 receives the security key from the key generation apparatus 120, the control module 161 computes an MIC using the security key received from the key generation apparatus 120 in operation S1550.

In operation S1555, the control module 161 transmits the second key generation information and MIC to the access point 110 via the network communication module 166.

In operation S1560, if the network communication module 116 of the access point 110 receives the second key generation information and MIC from the station 160, the security key generation module 112 generates a security key using the second key generation information, the first key generation information generated in operation S1515, and the initial key, the control module 111 computes an MIC using the security key generated by the security key generation module 112. Here, the control module 111 may compare the computed MIC with the MIC received from the station 160. If the computed MIC and the MIC received from the station 160 are not the same, the control module 111 may terminate communication with the station 160.

However, if the computed MIC and the MIC received from the station 160 are the same, the control module 111 transmits the computed MIC to the station 160 via the network communication module 116 in operation S1565.

If the network communication module 166 of the station 160 receives the MIC from the access point 110, the control module 161 compares the computed MIC with the MIC received from the access point 110, and, if the computed MIC and the MIC received from the access point 110 are the same, the security key received from the station 160 in operation S1545 is set in order to maintain security in communication with the access point 110 in operation S1570. However, if the MIC received from the access point 110 and the MIC computed by the control module 161 are not the same, the control module 161 may terminate the communication with the access point 110.

After setting the security key, the control module 161 of the station 160 issues a request for setting a security key to the access point 110 via the network communication module 166 in operation S1575. In operation S1580, if the network communication module 116 of the access point 110 receives the request from the station 160, the control module 111 sets the security key generated in operation S1560 as a security to be used for communication with the station 160.

Accordingly, the same security key can be set in the access point 110 and the station 160 without necessity of exposing the initial key used in the home network 100 to the station 160.

In operation S1585, the access point 110 and the station 160 having the same security key set therein can communicate with each other in a secure manner using the security key.

In the case of performing a communication security management process shown in FIG. 12, several operations performed by the access point 110, the station 160 and the key generation apparatus 120 shown in FIGS. 8 through 10 may be modified appropriately to match with the corresponding operations shown in FIG. 12.

The operation S240 shown in FIG. 8 may be replaced by an operation of determining whether the second key generation information has been received from the station 160. The operation S250 shown in FIG. 8 may be replaced by an operation of generating a security key using the first key generation information, the second key generation information and the initial key. Here, the second key generation information may comprise the MAC address of the station 160 and the second random number.

In addition, the second key generation information provided in operation S315 shown in FIG. 9 may comprise the second random number and the MAC address of the station 160. The operation S335 may be replaced by an operation of determining whether the security key has been received. The operation S340 may be replaced by an operation of transmitting the second key generation information to the access point 110.

Meanwhile, the second key generation information received in operation S420 shown in FIG. 10 may comprise the second random number and the MAC address of the station 160, and the operation S430 may not be performed. In this case, the operation S440 may be replaced by an operation of using the security key generation module 122 of the key generation apparatus 120 generating a security key using the first key generation information and second key generation information received from the station 160, and the initial key stored in the storage module 125. In addition, the operation S450 may be replaced by an operation of transmitting the security key to the station 160.

An exemplary process of disassociation of the station 160 from the home network 100 will now be described with reference to FIG. 13.

Figure 13:
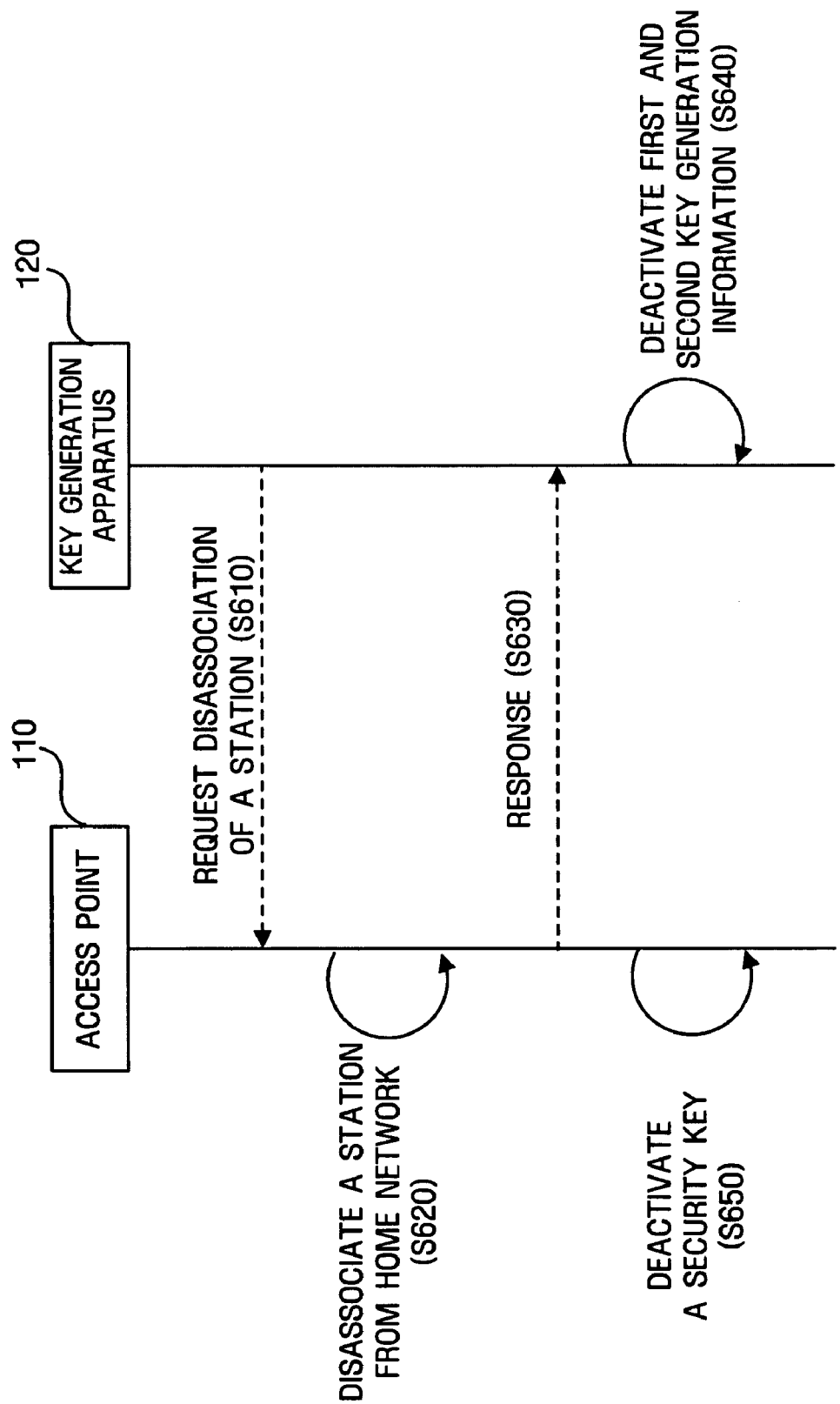
FIG. 13 is a flowchart illustrating a process of disassociation of a station from a home network according to an exemplary embodiment of the present invention.

FIG. 13 is a flowchart illustrating a process of disassociating a station in a home network according to an exemplary embodiment of the present invention;

In the exemplary embodiment, dotted line arrows indicate operations performed by limited range communication means, which is, however, illustration only and the operations indicated by the dotted line arrows may be performed by communication means in the home network 100, e.g., a wireless LAN.

In order to disassociate the station 160 in the home network 100, the control module 121 of the key generation apparatus 120 sends identification information of the station 160 with a disassociation request to the access point 110 via the communication apparatus interface module 124 in operation S610. The key generation apparatus 120 receives the identification information of the station 160 from the network manager, such as user of home network 100, via a user interface module (not shown) of the key generation apparatus 120 or from the station 160 via the communication apparatus interface module 124.

Once the disassociation request has been received from the key generation apparatus 120 the control module 111 of the access point 110 is able to forcibly disassociate the station 160 with the received identification information in the home network 100 in operation S620. For example, if the received identification information is the MAC address of the station 160, the control module 111 can cancel communication between the station 160 and the home network 100 using the corresponding MAC address.

If the station 160 is disassociated in the home network 100, the control module 111 may transmit a response to the disassociation request to the key generation apparatus 120 via the key generation apparatus interface module 113 in operation S630.

The control module 121 of the key generation apparatus 120 having received the response deactivates the first key generation information and second key generation information that have been received from the station 160 in operation S640.

Meanwhile, the control module 111 of the access point 110, which has disassociated the station 160 in the home network 100, may deactivate the security key used for communication with the station 160 in operation S650.

Since the station 160 does not possess the initial key used by the access point 110, a security key that is the same as the security key generated by the access point 110 cannot be generated even if the process shown in FIG. 1 is performed in cooperation with the access point 110. Meanwhile, if the key generation apparatus 120 further comprises a network communication module, as described above in FIG. 5, operations S610 and S630 may be performed by the network communication module.

The disassociation process shown in FIG. 13 may be employed when the network manager forcibly disassociates the station 160 from the home network 100. Thus, if communication between the station 160 and the access point 110 is ceased due to a deviation of the station 160 from a range in which the communication between the station 160 and the access point 110 is enabled or due to power interruption, the access point 110 determines that the communication between the station 160 and the home network 100 has been cancelled and then deactivates the security key used for the communication with the station 160.

2. Using Key Transmitter

First key generation information and second key generation information, which will be mentioned below with a description of a case of using a key transmitter, are different from the first key generation information and the second key generation information which have been described above as being used together with the key generation apparatus 120.

Figure 14:
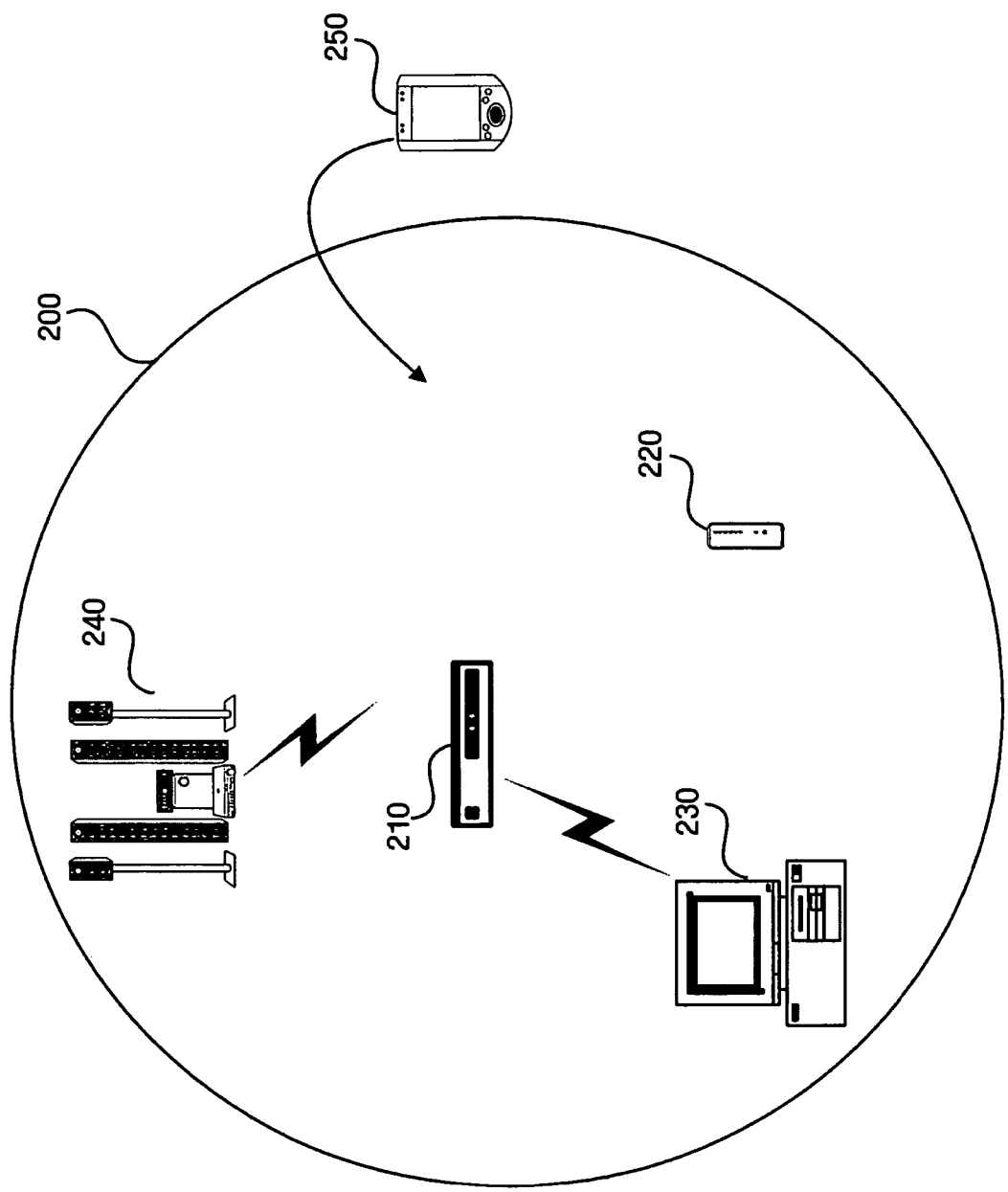
FIG. 14 illustrates a home network according to another exemplary embodiment of the present invention.

FIG. 14 illustrates a home network according to an exemplary embodiment of the present invention.

Referring to FIG. 14, the home network 200 includes an access point 210, a key transmitter 220, and stations 230 and 240.

Each of the stations 230 and 240 can obtain home network setting information regarding the home network 200 and can associate in the home network 200, which is a network provided by the access point 210, by executing an automatic execution file stored in the key transmitter 220. An example of this type of home network system is a home network based on Microsoft's Windows Connect Now (WCN) technology.

The stations 230 and 240 can maintain communication security using the WPA-PSK mode. To achieve this, the same initial key is pre-stored in the access point 210 and the stations 230 and 240. The initial key may be input to the access point 210 and the stations 230 and 240 by a network manager, and the access point 210 and the stations 230 and 240 may each provide a user interface which receives the initial key provided by the network manager.

The key transmitter 220 relays key generation information provided by an external station 250 to the access point 210 and relays a security key provided by the access point 210 to the external station 250, which will be described in more detail with reference to FIGS. 15A through 15D.

FIG. 15A through 15D illustrate a process of allowing an external station to associate in a home network according to another exemplary embodiment of the present invention.

Figure 15A:
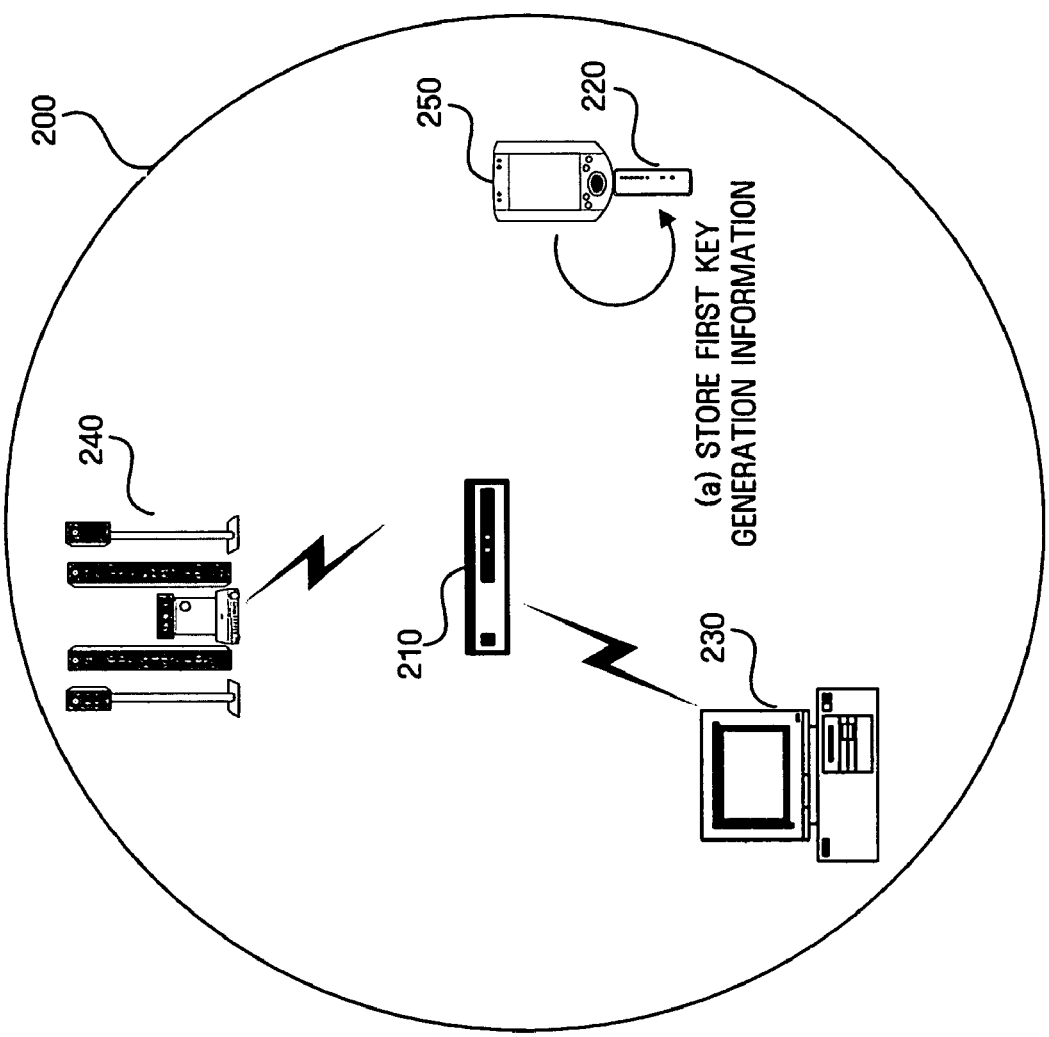

For example, if the external station 250 is allowed to temporarily associate in the home network 200 (for example, if a visitor who carries the external station 250 with him or her is allowed to access the home network 200), the network manager connects the key transmitter 220 to the external station 250 as illustrated in FIG. 15A. Then, the external station 250 provides the key transmitter 220 with first key generation information and stores the first key generation information in the key transmitter 220 (operation a).

Figure 15B:
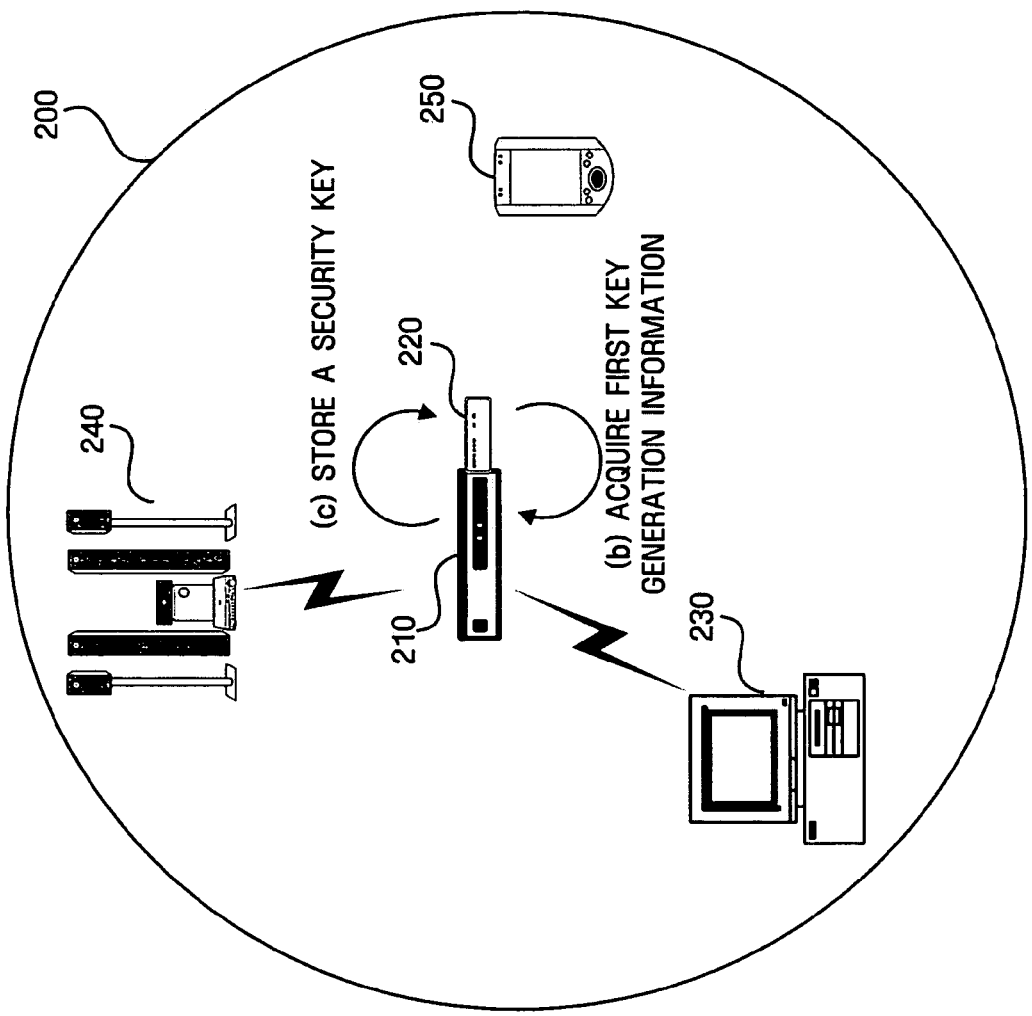

Thereafter, the network manager connects the key transmitter 220 to the access point 210 as illustrated in FIG. 15B. Then, the access point 210 acquires the first key generation information provided by the key transmitter 220 from the key transmitter 220 (operation b).

The access point 210 generates a security key using the first key generation information, second key generation information provided by the access point 210, and an initial key and stores the security key in the key transmitter 220 (operation c).

Figure 15C:
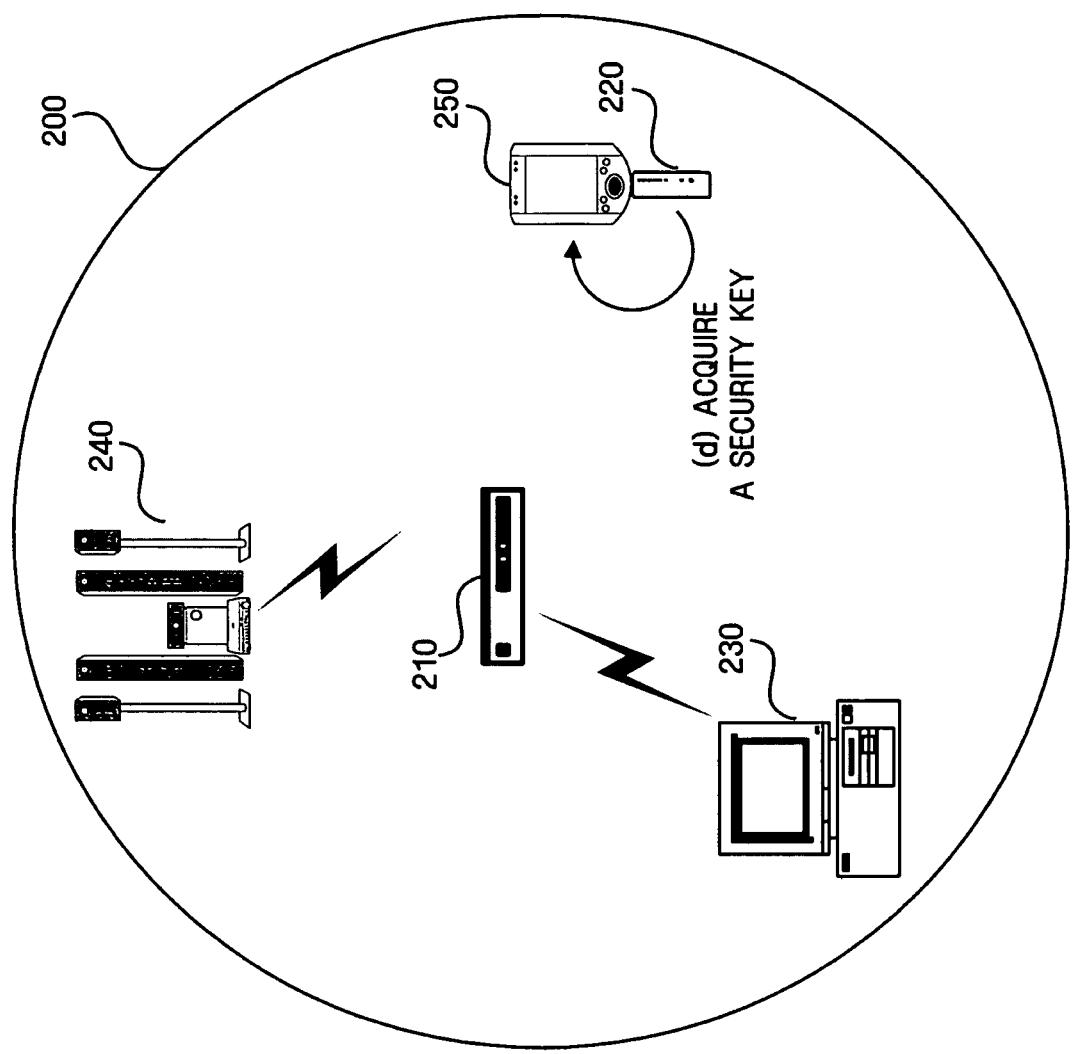

Thereafter, the network manager connects the key transmitter 220 again to the external station 250, as illustrated in FIG. 15C. Then, the external station 250 can acquire the security key provided by the access point 210 from the key transmitter 220.

Accordingly, the external station 250 can share the security key with the access point 210 and thus can associate in the home network through the access point 210 as illustrated in FIG. 15D.

In the present invention, when the key transmitter 220 is connected with the access point 210 or the external station 250, the key transmitter 220 may be electrically connected with the access point 210 or the external station 250 via a wired medium. However, an "electrical connection" is just an example, and the connection may indicate a state in which the key transmitter 220 can communicate with the access point 210 or the external station 250 via a wireless medium without contact.

Each of the first key generation information and the second key generation information may include at least one parameter. For example, if a security key generation algorithm used by the access point 210 to generate the security key requires an initial key and a total of 4 parameters, including two MAC addresses and two random numbers, as described above with reference to FIG. 1, the first key generation information may comprise an MAC address of the external station 250 and a first random number created by the external station 250, and the second key generation information may comprise an MAC address of the access point 210 and a second random number created by the access point 210.

In the above-described method, the initial key used in the home network 200 is not revealed to the external station 250. Thus, once the session of the external station 250 is completed, the external station 250 cannot generate the same security key as the security key generated by the access point 210 even by performing the security key generation method illustrated in FIG. 1.

While the home network system has been described so far with reference to a specific exemplary embodiment of the present invention, the invention is not restricted thereto. In other words, the present invention can be applied to a variety of wireless network systems comprising an access point, stations, and a key transmitter.

Meanwhile, referring to FIG. 14, the stations 230 and 240 in the home network 200 may associate in another home network in the same manner as the external station 250 associates in the home network 200. Hereinafter, the invention will be described with a station identified by reference numeral 260. Accordingly, the station 260 may be the station 230, 240, which is an internal station operating in a home network where it currently resides. This operation mode will now be referred to as a home mode. Alternatively, the station 260, like the external station 250, may be an external station operating in a home network outside the home network where it currently resides. This operation mode will now be referred to as a visit mode. In the home mode, the station 260 may operate in a conventional manner. For example, in the home mode, the station 260 may operate using Microsoft's WCN technology. Thus, only the operation of the station 260 in the visit mode will now be described in detail.

Figure 16:
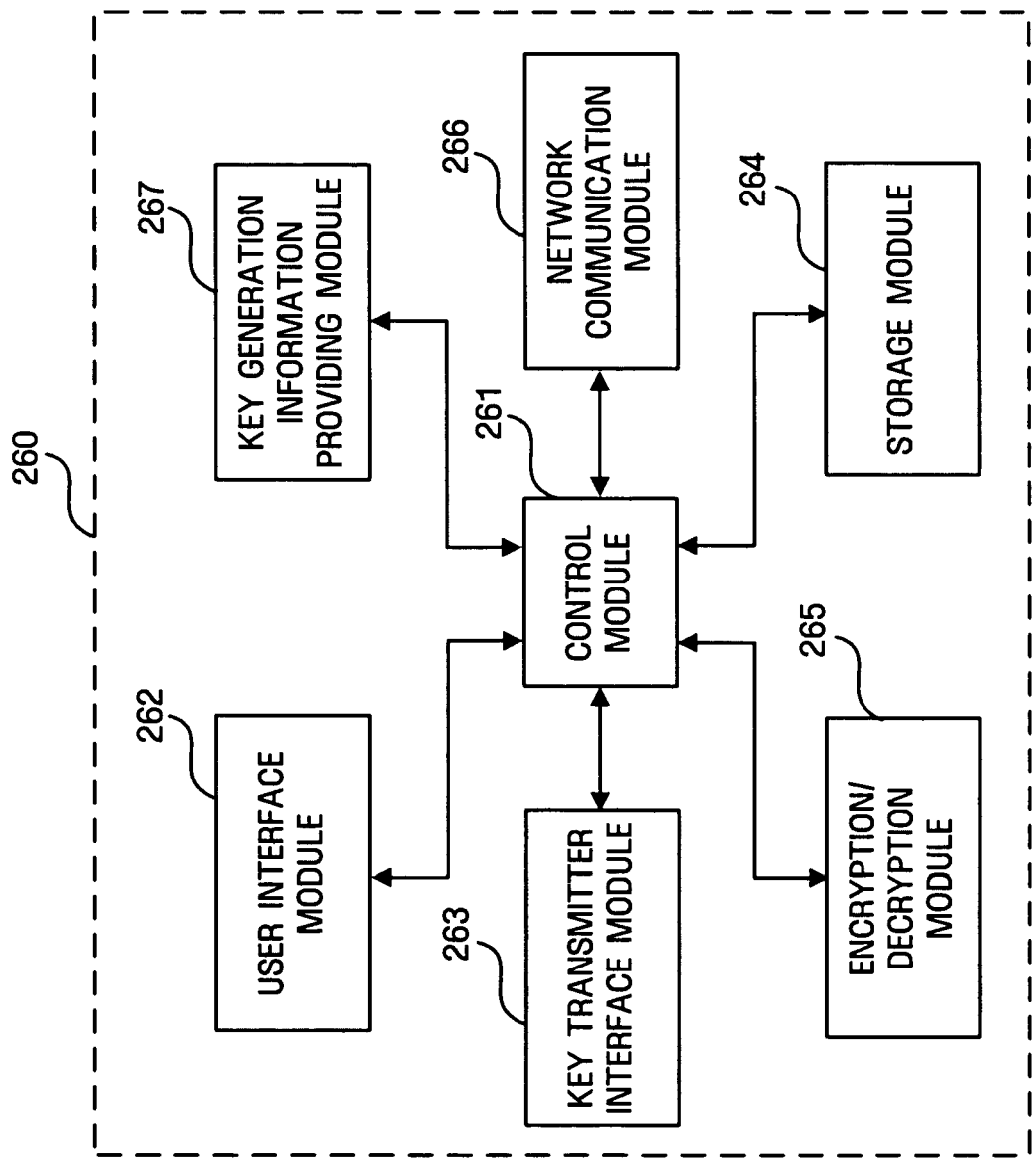
FIG. 16 is a block diagram of a station according to another exemplary embodiment of the present invention.

FIG. 16 is a block diagram of a station according to another exemplary embodiment of the present invention.

Referring to FIG. 16, the station 260 includes a control module 261, a user interface module 262, a key transmitter interface module 263, a storage module 264, an encryption/decryption module 265, a network communication module 266, and a key generation information providing module 267.

The control module 261 controls the operations of the other modules in the station 260. In addition, in order to check the integrity of a message transmitted by the access point 210, the control module 261 may compute an MIC using a security key and compare the computation result with an MIC transmitted by the access point 210.

The control module 261 may perform procedures of authentication and connection with the access point 210. For such authentication and connection, an open authentication procedure defined in the IEEE 802.11 standard may be used.

If the key transmitter interface module 263 automatically detects that the station 260 is connected to the key transmitter 220, the control module 261 determines whether the station 260 should operate in the home mode or in the visit mode with reference to information stored in the key transmitter 220. For example, if the station 260 attempts to associate in the home network 200 using Microsoft's WCN technology and the key transmitter 220 is connected to the key transmitter interface module 263, the control module 261 determines whether a predetermined wireless LAN setting file exists in the key transmitter 220. If the wireless LAN setting file exists in the key transmitter 220, the control module 261 may determine that the station 260 should operate in the visit mode.

On the other hand, if the wireless LAN setting file exists in the key transmitter 220, the control module 261 may determine that the station 260 should operate in the home mode. For example, if the station 260 uses Microsoft's WCN technology, the control module 261 may read a wireless LAN setting file having an XML format from the key transmitter 220 by executing an automatic execution file stored in the key transmitter 220 and may thus enable the station 260 to associate in the home network 200.

Alternatively, the control module 261 may determine that the key transmitter 220 is connected to the key transmitter interface module 263 when receiving a predetermined control command from a network manager and may perform its operations in response to the control command.

The key transmitter interface module 263 enables the station 260 to communicate with the key transmitter 220. The key transmitter interface module 263 may automatically detects whether the key transmitter 220 is connected to the key transmitter interface module 263. If the key transmitter 220 is a USB storage apparatus, the key transmitter interface module 263 may include a USB port.

The storage module 264 stores a security key acquired from the key transmitter 220. The security key may be stored in a region of the storage module 264 that is logically or physically protected from other apparatus' attempts to accessing to the storage module 264.

The encryption/decryption module 265 encrypts data to be transmitted via the network communication module 266 or decrypts encrypted data received via the network communication module 266 using the security key stored in the storage module 264. The security key used by the encryption/decryption module 265 to encrypt or decrypt data is the key the station 260 has acquired from the key transmitter 220 while operating in the visit mode. If the station 260 operates in the home mode, the encryption/decryption module 264 may encrypt or decrypt data using an encryption key, instead of using the security key.

The network communication module 266 enables the station 260 to communicate with the access point 210. The network communication module 266 may use a wireless LAN to enable the station 260 to communicate with the access point 210. Preferably, but not necessarily, the network communication module 266 may enable the station 260 to communicate with the access point 210 according to a wireless LAN protocol defined in the IEEE 802.11 standard.

The key generation information providing module 267 provides the first key generation information, which is required for generating a security key. For example, the first key generation information may comprise an MAC address of the station 260 and a first random number. However, the first key generation information may comprise parameters other than those set forth herein according to an algorithm used by the access point 210 to generate a security key.

The user interface module 262 receives control information from the network manager. For example, the network manager may indicate whether the key transmitter 220 is connected to the station 260 by the user interface module 262.

Alternatively, the station 260 may include a security key generation module 162 which has been described above with reference to FIG. 4.

Figure 17:
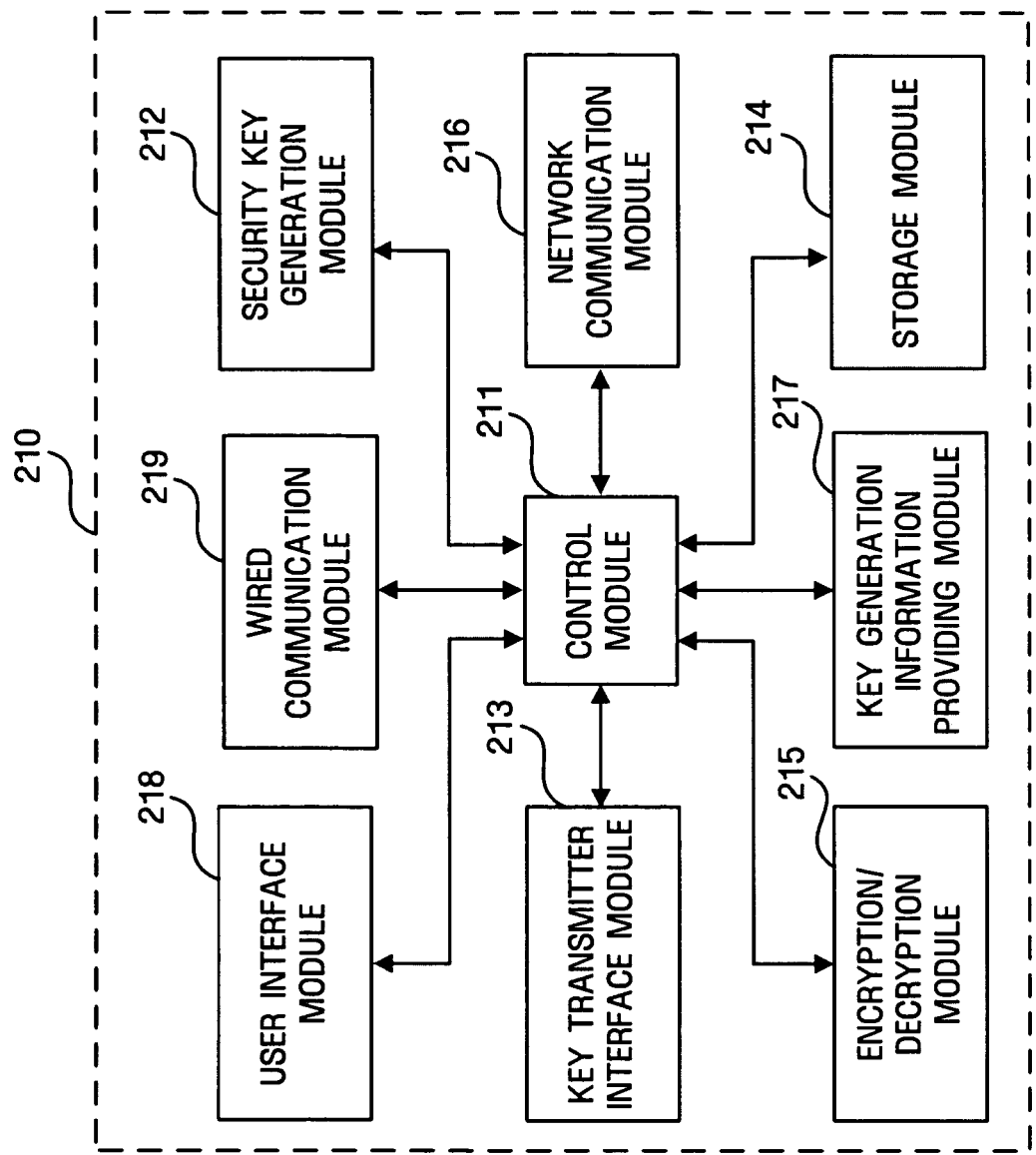
FIG. 17 is a block diagram of an access point according to another exemplary embodiment of the present invention.

FIG. 17 is a block diagram of an access point according to another exemplary embodiment of the present invention.

Referring to FIG. 17, the access point 210 includes a control module 211, a security key generation module 212, a key transmitter interface module 213, a storage module 214, an encryption/decryption module 215, a network communication module 216, a key generation information providing module 217, a user interface module 218, and a wired communication module 219.

The control module 211 controls the operations of the other modules in the access point 210. In addition, the control module 211 may compute an MIC using a security key to check the integrity of a message and compare the computation result with an MIC transmitted by the station 260.

The control module 211 may perform procedures of authentication and connection with the access point 210. For such authentication and connection, an open authentication procedure defined in the IEEE 802.11 standard may be used.

When the key transmitter interface module 213 is connected to the key transmitter 220, the control module 211 acquires first key generation information stored in the key transmitter 220 and provides the first key generation information to the security key generation module 212.

The security key generation module 212 generates a security key using the first key generation information provided by the control module 211, second key generation information provided by the key generation information providing module 217, and an initial key stored in the storage module 214.

The key transmitter interface module 213 enables the access point 210 to communicate with the key transmitter 220. The key transmitter interface module 213 can automatically detect whether the key transmitter 220 is connected to the key transmitter interface module 213. If the key transmitter 220 is a USB storage apparatus, the key transmitter interface module 213 may include a USB port.

The storage module 214 stores the first key generation information acquired from the key transmitter 220, the second key generation information provided by the key generation information providing module 217, the security key generated by the security key generation module 212, and the initial key. Here, the initial key and the security key may be stored in a region of the storage module 214 that is logically or physically protected from other apparatus' attempts to accessing to the storage module 214.

The encryption/decryption module 215 encrypts data to be transmitted via the network communication module 216 or decrypts data received via the network communication module 216 using the security key stored in the storage module 214.

The network communication module 216 enables the access point 210 to communicate with the station 260. In other words, the network communication module 216 transmits data encrypted by the encryption/decryption module 215 to the station 260 and receives data transmitted by the station 260. The network communication module 216 may use a wireless network to transmit/receive data to/from the station 260. Preferably, but not necessarily, the network communication module 216 may enable the access point 210 to communicate with the station 260 according to a wireless LAN protocol defined in the IEEE 802.11 standard.

The key generation information providing module 217 provides the second key generation information, which is required for generating a security key. For example, the second key generation information may comprise an MAC address of the access point 210 and a second random number. However, the second key generation information may comprise parameters other than those set forth herein according to an algorithm used by the security key generation module 212 to generate a security key.

The user interface module 218 receives control information, which is used for controlling the access point 210, from the network manager. For example, the network manager may indicate whether the key transmitter 220 is connected to the access point 210 by the user interface module 218.

The wired communication module 219 connects the access point 210 to a wired network. Accordingly, the access point 210 can be connected to another access point or an external wired network via the wired communication module 219.

Figure 18:
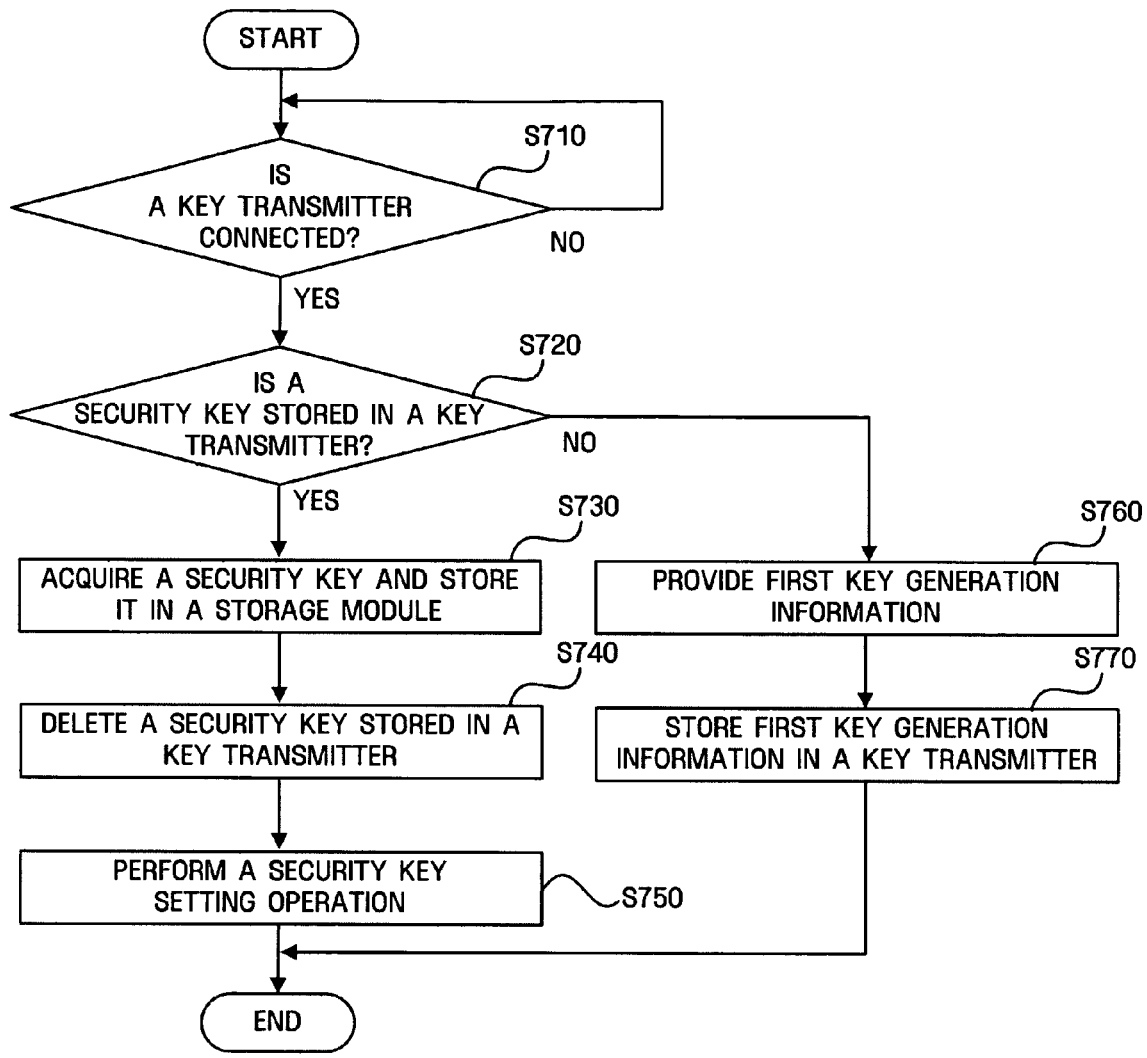
FIG. 18 is a flowchart illustrating, from a viewpoint of a station, a method for managing communication security in a wireless network according to another exemplary embodiment of the present invention.

FIG. 18 is a flowchart illustrating, from a viewpoint of a station, a method for managing communication security in a wireless network according to another exemplary embodiment of the present invention.

In the exemplary embodiment, the present invention is described referring particularly to the station 260, assuming that the station 260 operates in the visit mode.

Referring to FIG. 18, in operation S710, the control module 261 determines whether the key transmitter interface module 263 has been connected to the key transmitter 220. The key transmitter interface module 263 may be able to automatically detect whether connecting with the key transmitter 220 has been executed. Alternatively, the control module 261 may determine whether the key transmitter interface module 263 has been connected to the key transmitter 220 when receiving a predetermined control command from the network manager through the user interface module 262.

In operation S720, if the key transmitter interface module 263 is determined to be connected to the key transmitter 220, the control module 261 determines whether a security key is stored in the key transmitter 220.

In operation S760, if it is determined in operation S730 that no security key is stored in the key transmitter 220, the key generation information providing module 267 provides first key generation information. In operation S770, the control module 261 stores the first key generation information in the key transmitter 220 via the key transmitter interface module 263. The first key generation information may comprise a first random number and an MAC address of the station 260.

On the other hand, in operation S730, if it is determined in operation S720 that a security key is stored in the key transmitter 220, the control module 261 acquires the security key from the key transmitter 220 and stores the security key in the storage module 264. In operation S740, the control module 261 may delete the security key stored in the key transmitter 220.

Thereafter, the control module 261 performs a security key setting operation on the security key stored in the storage module 264 using, for example, a four-way handshake method, which will later be described in greater detail with reference to FIG. 20.

Figure 19:
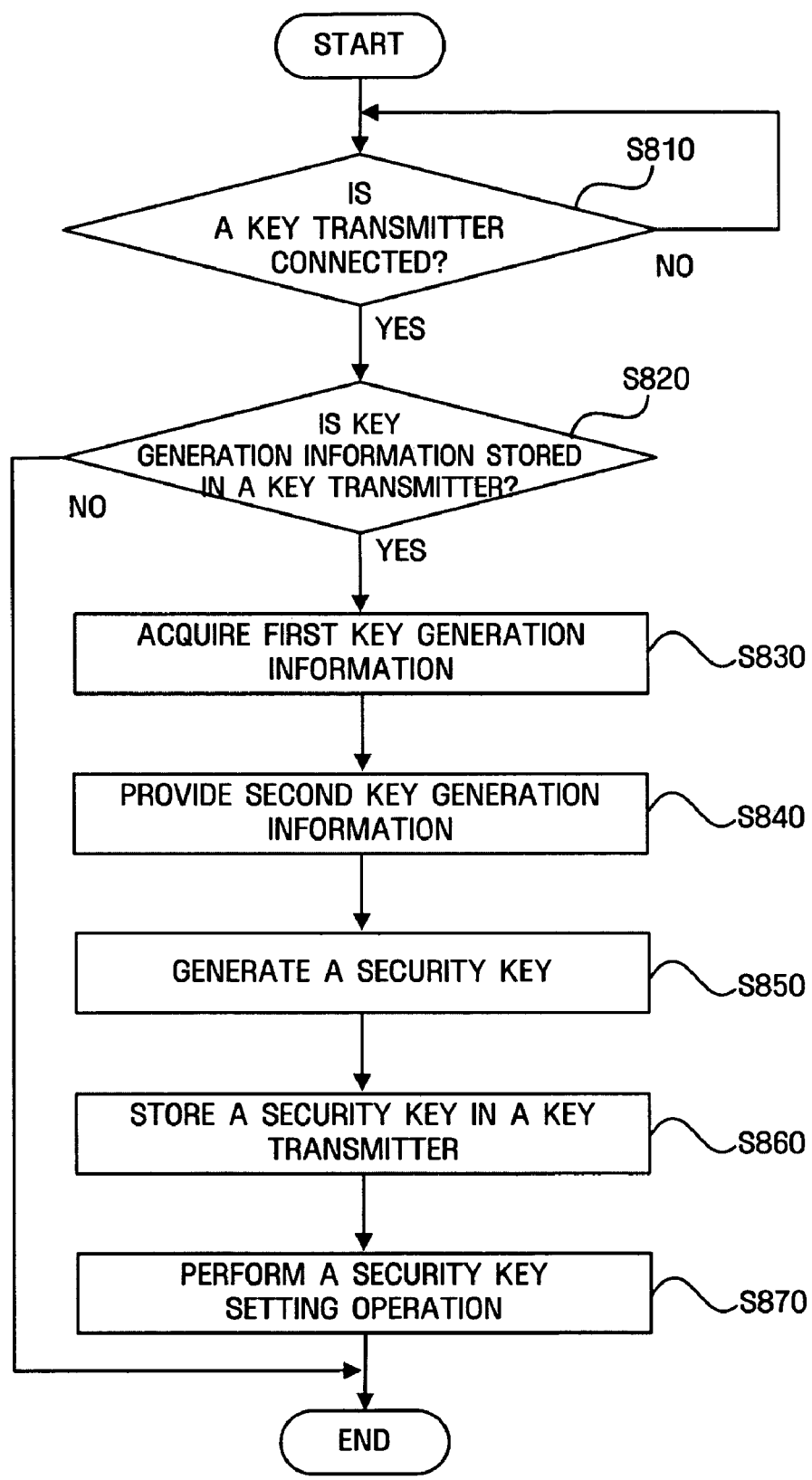
FIG. 19 is a flowchart illustrating, from a viewpoint of an access point, a method of managing communication security according to another exemplary embodiment of the present invention.

FIG. 19 is a flowchart illustrating, from a viewpoint of an access point, a method of managing communication security according to another exemplary embodiment of the present invention.

In the exemplary embodiment, the present invention is described referring particularly to the access point 210.

Referring to FIG. 19, in operation S810, the control module 211 determines whether the key transmitter interface module 213 is connected to the key transmitter 220.

The key transmitter interface module 213 may be able to automatically detect whether connecting with the key transmitter 220 has been executed. Alternatively, the control module 211 may determine whether the key transmitter interface module 213 has been connected to the key transmitter 220 when a predetermined control command from the network manager through the user interface module 218.

In operation S820, if the key transmitter 220 is determined to be connected to the key transmitter interface module 213, the control module 211 determines whether first key generation information is stored in the key transmitter 220.

In operation S830, if it is determined in operation S820 that first key generation information is stored in the key transmitter 220, the control module 211 acquires the first key generation information from the key transmitter 220. Thereafter, the control module 211 provides the first key generation information to the security key generation module 212 and may delete the first key generation information stored in the key transmitter 220.

In operation S840, the key generation information providing module 217 provides second key generation information to the security key generation module 212. The second key generation information may comprise an MAC address of the access point 210 and a second random number.

In operation S850, the security key generation module 212 generates a security key using the first key generation information, the second key generation information, and an initial key stored in the storage module 214.

In operation S860, the control module 211 stores the security key in the key transmitter 220 via the key transmitter interface module 213.

Thereafter, the control module 211 may perform a security key setting operation on the security key using, for example, the four-way handshake method, which will be described later in detail with reference to FIG. 20.

The operations of the access point 210 and the station 260 have been described with reference to FIGS. 18 and 19, respectively. For a better understanding of the setting of a security key according to an exemplary embodiment of the present invention, the interactions among the access point 210, the station 260, and the key transmitter 220 will now be described in further detail with reference to FIG. 20.

Figure 20:
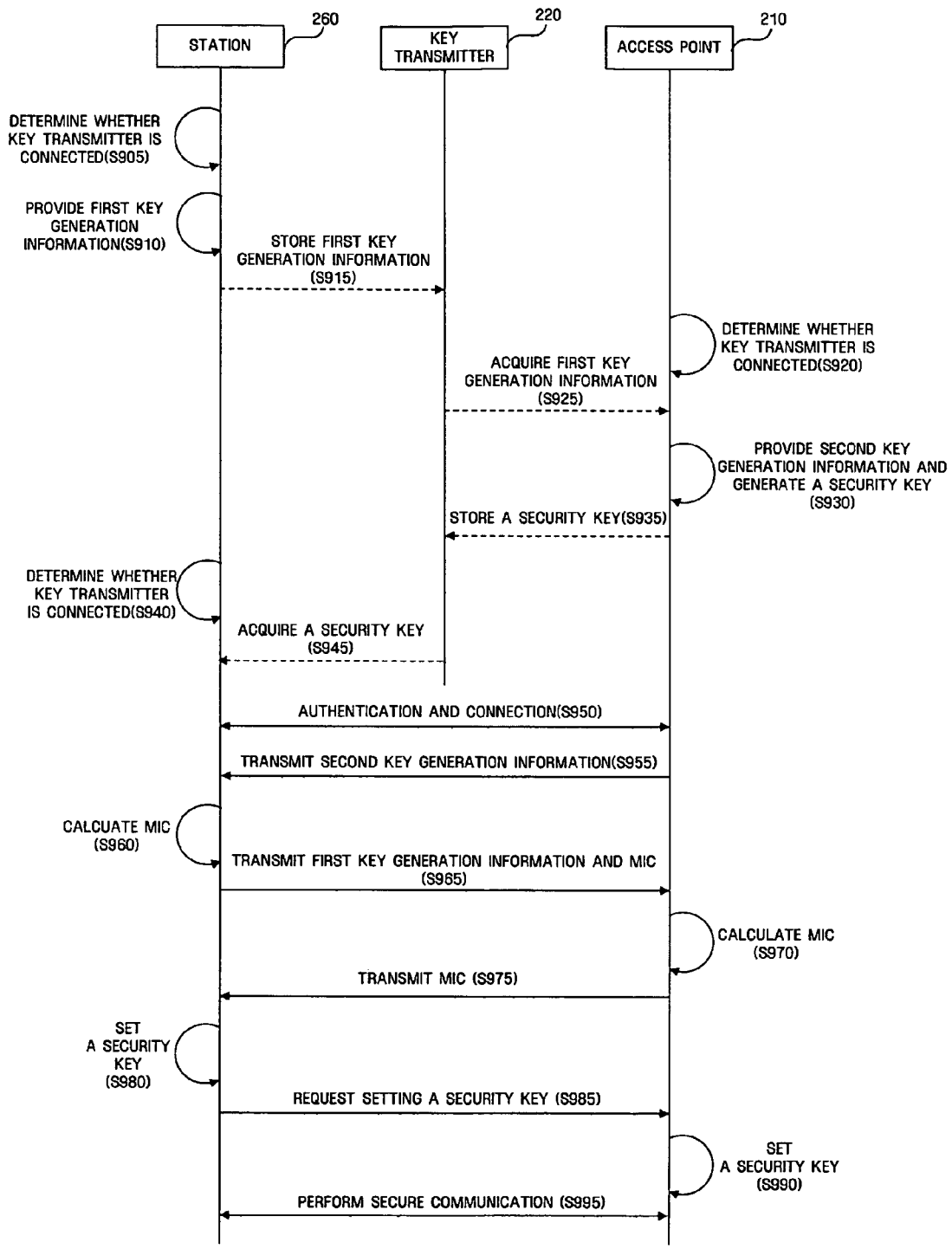
FIG. 20 is a flowchart illustrating a method of maintaining communication security in a wireless network according to another exemplary embodiment of the present invention.

FIG. 20 is a flowchart illustrating a method of maintaining communication security in a wireless network according to another exemplary embodiment of the present invention.

Referring to FIG. 20, solid line arrows indicate operations performed by communication means (e.g., a wireless LAN) in the home network 200, and dotted line arrows indicate transmission/reception of data to/from the key transmitter 220.

In operation S905, a network manager connects the key transmitter 220 to the key transmitter interface module 263 of the station 260, and the control module 261 of the station determines whether the key transmitter 220 is connected to the key transmitter interface module 263. In operation S910, if it is determined in operation S905 that the key transmitter 220 is connected to the key transmitter interface module 263, the key generation information providing module 267 provides first key generation information to the control module 261. The first key generation information may comprise a first random number and an MAC address of the station 260.

In operation S915, the control module 261 of the station 260 stores the first key generation information in the key transmitter 220 via the key transmitter interface module 263. Then, the station 260 may notify the network manager using a display module (not shown) or a speaker (not shown) that the first key generation information is stored in the key transmitter 220.

Once the first key generation information is stored in the key transmitter 220, the network manager may disconnect the key transmitter 220 from the key transmitter interface module 263 of the station 260 and may connect the key transmitter 220 to the key transmitter interface module 213 of the access point 210. In other words, the network manager may unplug the key transmitter 220 from the station 260 and then plug the key transmitter 220 to the access point 210.

In operation S920, the control module 211 of the access point 210 determines whether the key transmitter 220 is connected to the key transmitter interface module 213. In operation S925, if it is determined in operation S920 that the key transmitter 220 is connected to the key transmitter interface module 213, the control module 211 acquires the first key generation information from the key transmitter 220.

In operation S930, the key generation information providing module 217 provides second key generation information to the security key generation module 212, and the security key generation module 212 generates a security key using the first key generation information, the second key generation information, and an initial key. The second key generation information may comprise a second random number and an MAC address of the access point 210.

In operation S935, the control module 211 stores the security key in the key transmitter 220 via the key transmitter interface module 213. Then, the access point 210 may notify the network manager using a display module (not shown) or a speaker (not shown) that the security key is stored in the key transmitter 220.

Once the security key is stored in the key transmitter 220, the network manager may disconnect the key transmitter 220 from the key transmitter interface module 213 of the access point 210 and may connect the key transmitter 220 to the key transmitter interface module 263 of the station 260. In other words, the network manager may unplug the key transmitter 220 from the access point 210 and then plug the key transmitter 220 to the station 260.

In operation S940, the control module 261 of the station 260 determines whether the key transmitter 220 is connected to the key transmitter interface module 263 of the station 260. In operation S945, if it is determined in operation S940 that the key transmitter 220 is connected to the key transmitter interface module 263, the control module 261 acquires the security key from the key transmitter 220. Thereafter, the control module 261 stores the security key in the storage module 264 and may delete the security key stored in the key transmitter 220.

In operation S950, if the station 260 acquires the security key, the access point 210 and the station 260 are subjected to authentication and connection. For such authentication and connection, an open authentication procedure defined in the IEEE 802.11 standard may be used.

Thereafter, in operation S955, the network communication module 216 of the access point 210 transmits the second key generation information to the station 260.

In operation S960, if the network communication module 266 of the station 260 receives the second key generation information from the access point 210, the control module 261 computes an MIC using the security key.

In operation S965, the network communication module 266 transmits the first key generation information and the MIC to the access point 210.

In operation S970, the network communication module 216 of the access point 210 receives the first key generation information and the MIC from the station 260, and the control module 211 computes an MIC using the security key generated in operation S935. Then, the control module 211 may compare the computed MIC with an MIC received from the station 260. If the computed MIC does not match the received MIC, the control module 211 may terminate communication between the access point 210 and the station 260

In operation S975, if the computed MIC matches the received MIC, the control module 211 transmits the computed MIC to the station 260 via the network communication module 216.

In operation S980, the network communication module 266 of the station 260 receives the MIC transmitted by the control module 211 of the access point 210, and the control module 261 of the station 260 compares the MIC computed in operation S960 with the MIC transmitted by the control module 211 of the access point 210 and sets the security key acquired from the key transmitter 220 as a security key to be used for communication with the access point 210 if the MIC computed in operation S960 matches the MIC transmitted by the control module 211 of the access point 210.

In operation S985, the control module 261 of the station 260 issues a request for setting a security key to the access point 210 via the network communication module 266.

In operation S990, the network communication module 216 of the access point 210 receives the request issued by the control module 261 of the station 260 and sets the security key generated in operation S935 as a security to be used for communication with the station 260.

Accordingly, the same security key can be set in the access point 210 and the station 260 without necessity of exposing the initial key used in the home network 200 to the station 260.

In operation S995, the access point 210 and the station 260 transmit/receive data to/from each other using the security key set therein so that they can communicate with each other in a secure manner.

Operations S955, S965, S975, and S985 shown in FIG. 20 correspond to operations S125, S135, S145, and S155 shown in FIG. 1, respectively.

3. Using Direct Communication Between Access Point and Station

First key generation information and second key generation information, which will be mentioned below with a description of a case of using direct communication between an access point and a station, are different from the first key generation information and the second key generation information which have been described above.

FIG. 21 is a schematic diagram illustrating a home network 300 according to still another exemplary embodiment of the present invention.

Referring to FIG. 21, the home network 300 includes an access point 310 and stations 330 and 340.

The access point 310 and the stations 330 and 340 can communicate with one another while maintaining communication security in the WPA-PSK mode. To achieve this, the same initial key is stored in advance in the access point 310 and the stations 330 and 340. The initial key may be input to the access point 310 and the stations 330 and 340 by a network manager, and the access point 310 and the stations 330 and 340 may each provide a user interface which receives the initial key provided by the network manager. Alternatively, the initial key may be input to the access point 310 and the stations 330 and 340 via an initial key provider described above with reference to FIG. 7.

Meanwhile, if an external station 350 is allowed to temporarily associate in the home network 300, that is, if the external station 350 possessed by a visitor is allowed to access to the home network 300, the access point 310 may relay a security key to the external station 350 by the same limited range communication means as described above.

Preferably, but not necessarily, the limited range communication means is implemented in either a non-contact type communication means such as IrDA, NFC or Bluetooth, or a contact-type communication means such as a USB or ISO-7816 standard.

The network manager allows the external station 350 to have close access to the access point 310 so that the external station 350 and the access point 310 get close to each other enough to enable communication between the external station 350 and the access point 310, which will be described in more detail with reference to FIGS. 22A and 22B.

Figure 22A:
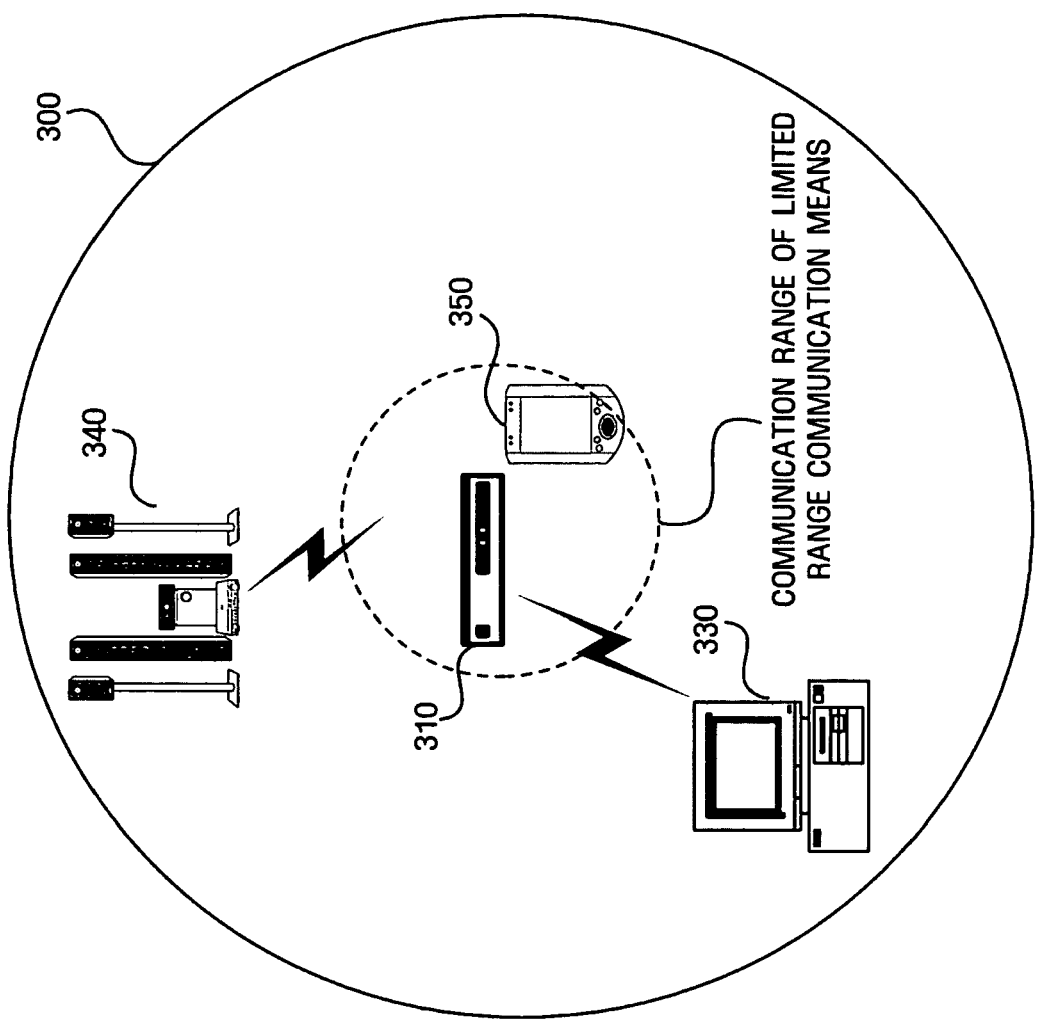
FIGS. 22A and 22B illustrate a process of allowing an external station to associate in a home network according to still another exemplary embodiment of the present invention.
Figure 22B:
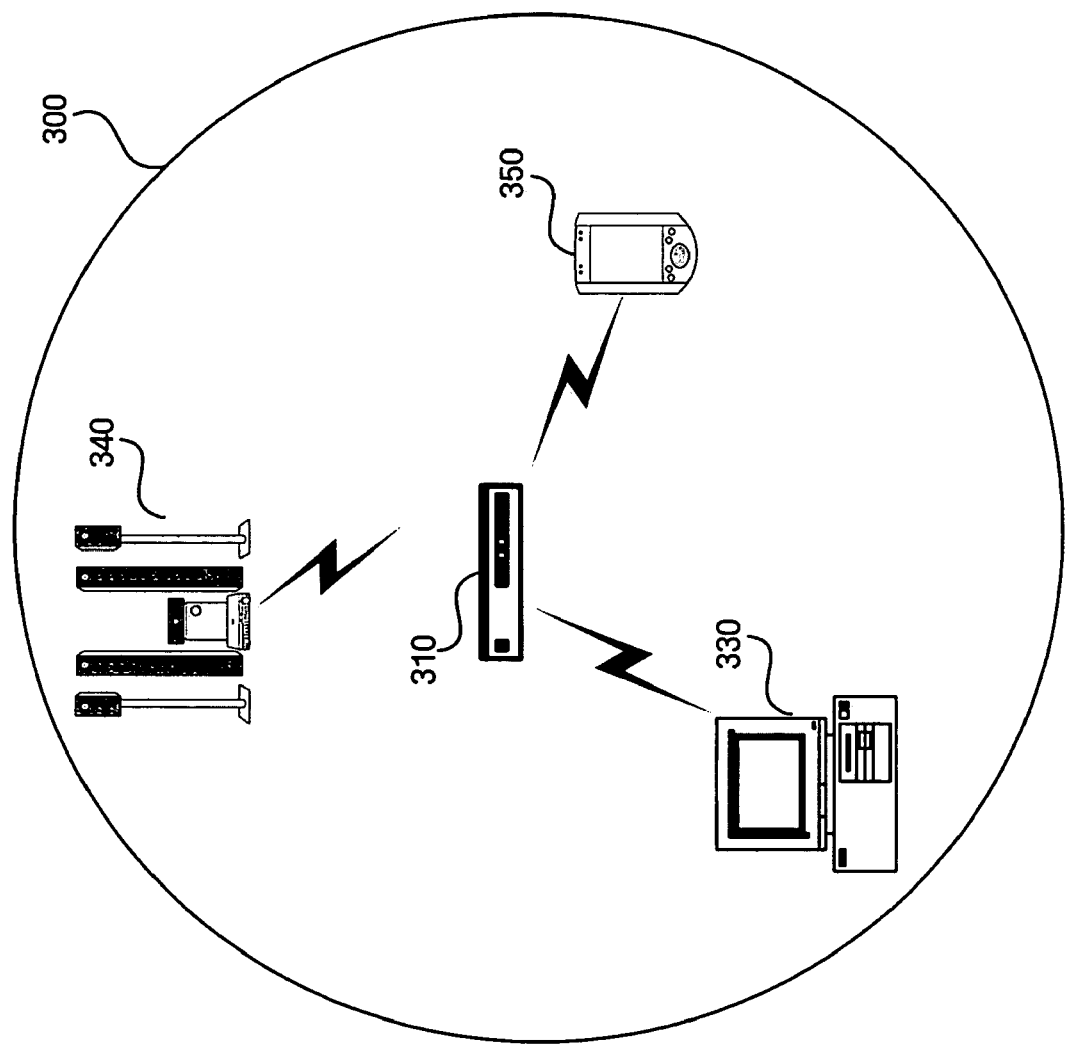

FIGS. 22A and 22B illustrate a process of allowing an external station to associate in a home network according to still another exemplary embodiment of the present invention.

Specifically, the external station 350 is allowed to temporarily associate in the home network 300, the network manager allows the external station 350 to have close access to the access point 310, so the external station 350 can communicate with the access point 310 by limited range communication means, as illustrated in FIG. 22A. The external station 350 can transmit first key generation information to the access point 310 using the limited range communication means. In addition, the access point 310 can generate a security key using the first key generation information transmitted by the external station 350, second key generation information generated by the access point 310, and an initial key and can transmit the security key to the external station 350.

The external station 350 receives the security key transmitted by the access point 310 and can thus associate in the home network 300 via the access point 310 using the security key, as illustrated in FIG. 22B.

Each of the first key generation information and the second key generation information may comprise one or more parameters. For example, if the access point 310 and the external station 350 perform a four-way handshake operation to set a security key therein, the first key generation information may comprise an MAC address of the external station 350 and a first random number, and the second key generation information may comprise an MAC address of the access point 310 and a second random number.

While the home network system has been described so far with reference to a specific exemplary embodiment of the present invention, the invention is not restricted thereto. In other words, the present invention can be applied to a variety of wireless network systems comprising an access point, stations, and a key transmitter.

Referring back to FIG. 21, the stations 330 and 340 in the home network 300 may associate in another home network in the same manner as the external station 350 associates in the home network 300.

Figure 23:
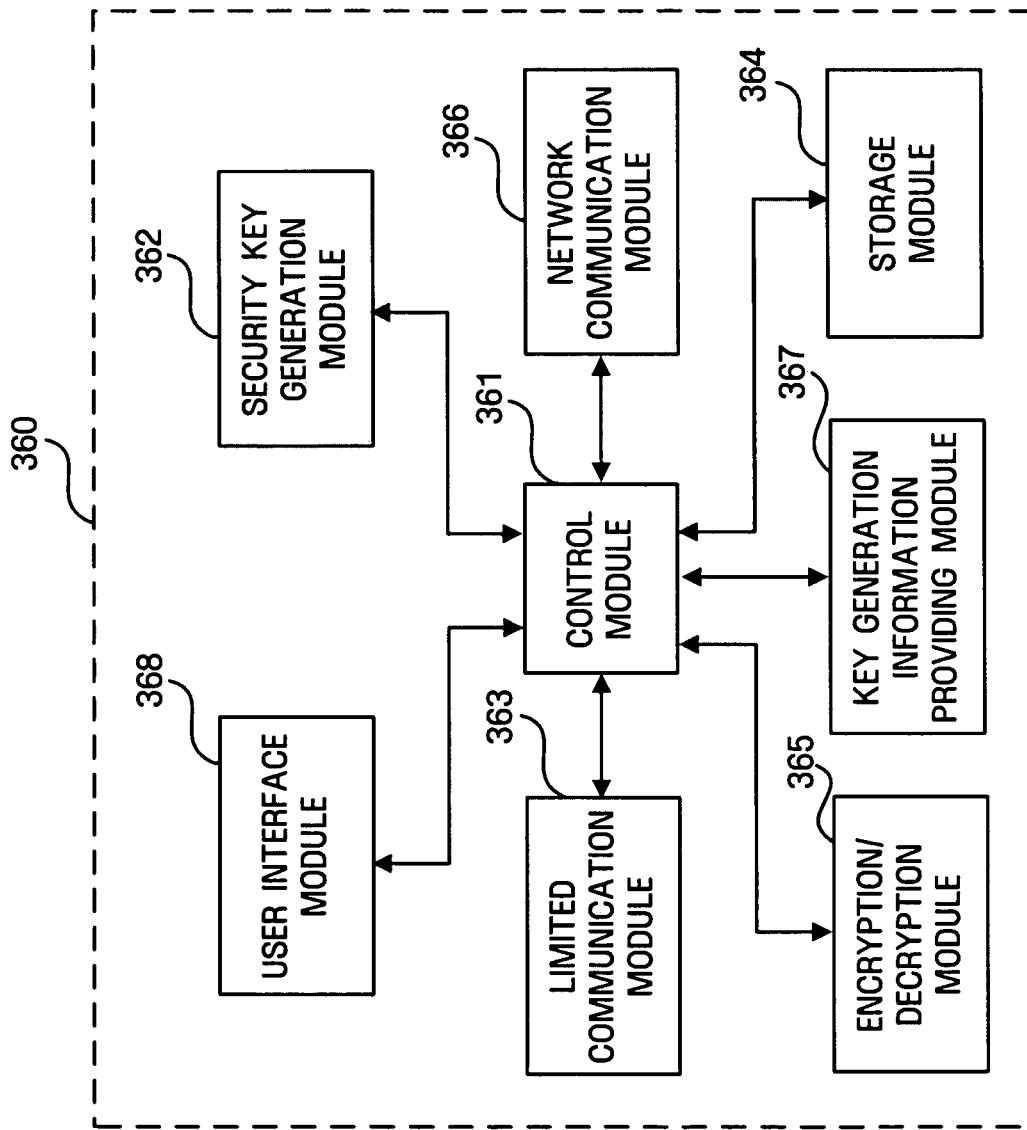
FIG. 23 is a block diagram of a station according to still another exemplary embodiment of the present invention.

FIG. 23 is a block diagram of a station 360 according to still another exemplary embodiment of the present invention.

Referring to FIG. 23, the station 360, like the stations 330 and 340, may be an internal station attempting to associate in a home network where it currently resides. This operation mode will now be referred to as a home mode. Alternatively, the station 360, like the external station 350, may be an external station operating in a home network outside the home network where it currently resides. This operation mode will now be referred to as a visit mode.

FIG. 23 is a block diagram of a station according to an exemplary embodiment of the present invention.

Referring to FIG. 23, the station 360 includes a control module 361, a security key generation module 362, a limited communication module 363, a storage module 364, an encryption/decryption module 365, a network communication module 366, a key generation information providing module 367, and a user interface module 368.

The control module 361 controls the operations of the other modules in the station 360. In addition, in order to check the integrity of a message transmitted by the access point 310, the control module 361 computes an MIC using a security key and compares the computed MIC with an MIC transmitted by the access point 310.

The control module 361 may authenticate the access point 310 and connect the station 360 to the access point 310. For such authentication and connection, an open authentication procedure defined in the IEEE 802.11 standard may be used.

The control module 361 determines whether the station 360 should operate in the home mode or in the visit mode. For example, the control module 361 may determine whether the station 360 should operate in the home mode or in the visit mode according to a request issued by the network manager by the user interface module 368.

If the station 360 is determined to operate in the home mode, the control module 361 may transfer the second key generation information transmitted by the access point 310 and the first key generation information generated by the key generation information providing module 367 to the security key generation module 362 and may control the security key generation module 362 to generate a security key.

However, if the station 360 is determined operate in the visit mode, the control module 361 may transmit the first key generation information to the access point 310 via the limited communication module 363. In this case, the control module 361 may perform a security key setting operation using a security key transmitted by the access point 310 via the limited communication module 363.

The security key generation module 362 generates a security key using the second key generation information provided by the access point 310, the first key generation information provided by the key generation information providing module 367, and an initial key stored in the storage module 364. The generation of a security key by the security key generation module 362 may be carried out when the station 360 operates in the home mode.

When the station 360 operates in the visit mode, the limited communication module 363 transmits the first key generation information to the access point 310 and receives a security key from the access point 310. The first key generation information and the security key transmitted via the limited communication module 363 are important for maintaining the security of the home network 300 and thus do not need to be protected from stations outside the home network 300. To achieve this, the limited communication module 363 uses limited range communication means. The limited range communication means may provide a narrower communication range or may be more restrictive in view of communication direction than communication means (e.g., a wireless LAN) used to enable the access point 310 and the station 360 to communicate with each other. Therefore, the communication means used by the limited communication module 363 has a communication range that is narrower than that for the communication means used by the network communication module 366. The limited range communication means is implemented in either a non-contact type communication means such as IrDA, NFC or Bluetooth, or a contact-type communication means such as a USB or ISO-7816 standard.

The storage module 364 stores the second key generation information and the security key provided by the access point 310 and the first key generation information provided by the key generation information providing module 367.

When the station 360 operates in the home mode, the storage module 364 stores an initial key, which is used by the security key generation module 362 to generate a security key.

The encryption/decryption module 365 encrypts data to be transmitted via the network communication module 366 or decrypts data received via the network communication module 366 using the security key stored in the storage module 364. The security key used by the encryption/decryption module 365 may be the security key generated by the security key generation module 362 if the station 360 operates in the home mode and may be the security key provided by the access point 310 via the limited communication module 363 if the station 360 operates in the visit mode.

The network communication module 366 enables the station 360 to communicate with the access point 310. In other words, the network communication module 366 transmits data encrypted by the encryption/decryption module 365 to the access point 310 and receives data transmitted by the access point. The communication means used by the network communication module 366 may be a wireless LAN. Preferably, but not necessarily, the network communication module 366 may enable the station 360 to communicate with the access point 310 according to a wireless LAN protocol defined in the IEEE 802.11 standard.

The key generation information providing module 367 provides the first key generation information, which is used for generating a security key, to the security key generation module 362. The first key generation information may comprise a first random number and an MAC address of the station 360. However, the invention is not limited to the referenced case and the first key generation information may comprise parameters other than those set forth herein according to an algorithm used to generate a security key.

The user interface module 368 receives control information from the network manager. For example, the network manager may issue a command to switch the operation mode of the station 360 to the home mode or the visit mode by the user interface module 368.

Figure 24:
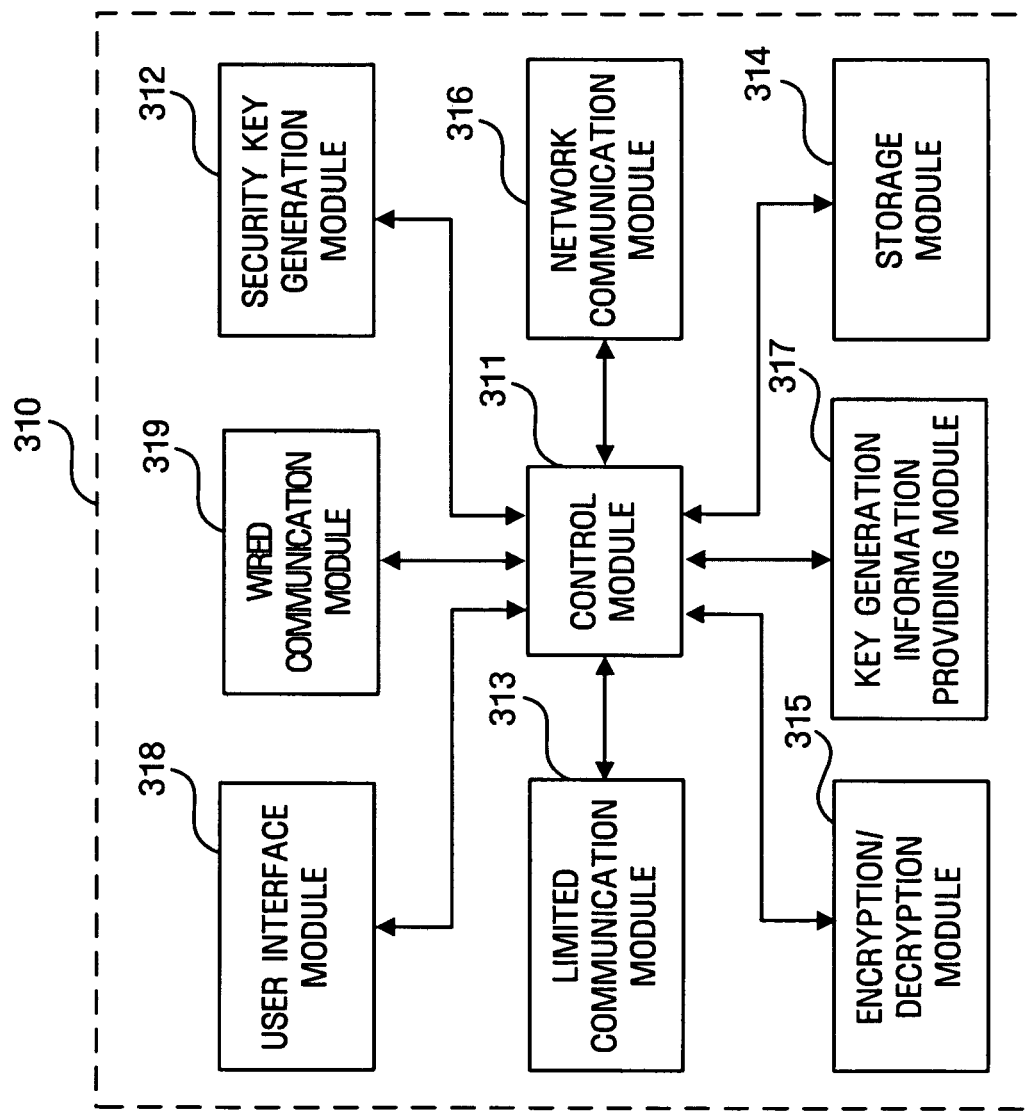
FIG. 24 is a block diagram of an access point according to still another exemplary embodiment of the present invention.

FIG. 24 is a block diagram of an access point 310 according to still another exemplary embodiment of the present invention.

Referring to FIG. 24, the access point 310 includes a control module 311, a security key generation module 312, a limited communication module 313, a storage module 314, an encryption/decryption module 315, a network communication module 316, a key generation information providing module 317, a user interface module 318, and a wired communication module 319.

The control module 311 controls the operations of the other modules in the access point 310. In addition, in order to check the integrity of a message transmitted by the station 360, the control module 311 may compute an MIC using a security key and then compare the computed MIC with an MIC transmitted by the station 360.

The control module 311 may authenticate the station 360 and connect the access point 310 to the station 360 using the network communication module 316. For such authentication and connection, an open authentication procedure defined in the IEEE 802.11 standard may be used.

The security key generation module 312 generates a security key using first key generation transmitted by the station 360, second key generation information provided by the key generation information providing module 317, and an initial key stored in the storage module 314.

The limited communication module 313 receives the first key generation information from the station 260 and transmits the security key to the station 360. The first key generation information and the security key transmitted via the limited communication module 313 are important for maintaining the security of the home network 300 and thus do not need to be protected from other stations. To achieve this, the limited communication module 313 may be realized as limited range communication means that provides a narrower communication range and is more restrictive in view of communication direction than communication means (e.g., a wireless LAN) used to enable the access point 310 and the station 360 to communicate with each other. Therefore, the communication means used by the limited communication module 313 has a communication range that is narrower than that for the communication means used by the network communication module 316. The limited range communication means is implemented in either a non-contact type communication means such as IrDA, NFC or Bluetooth, or a contact-type communication means such as a USB or ISO-7816 standard.

The storage module 314 stores the first key generation information transmitted by the station 360, the second key generation information provided by the key generation information providing module 317, the security key generated by the security key generation module 312, and the initial key. Here, the initial key and the security key may be stored in a region of the storage module 314, the region being logically or physically protected from other apparatus' attempts to accessing to the storage module 314.

The encryption/decryption module 315 encrypts data to be transmitted via the network communication module 316 or decrypts data received via the network communication module 316 using the security key stored in the storage module 314.

The network communication module 316 enables the access point 310 to communicate with the station 360. In other words, the network communication module 316 transmits data encrypted by the encryption/decryption module 315 to the station 360 and receives data transmitted by the station 360. The communication means used by the network communication module 366 may be a wireless LAN. Preferably, but not necessarily, the network communication module 316 may enable the access point 310 to communicate with the station 360 according to a wireless LAN protocol defined in the IEEE 802.11 standard.

The key generation information providing module 317 provides the second key generation information to the security key generation module 312. For example, if the key generation information providing module 317 generates a security key using a four-way handshake method, the second key generation information may comprise a second random number and an MAC address of the access point 310. However, the second key generation information may comprise parameters other than those set forth herein according to an algorithm used by the security key generation module 312 to generate a security key.

The user interface module 318 receives control information required for controlling the access point 310 from the network manager.

The wired communication module 319 connects the access point 310 to a wired network. Accordingly, the access point 310 can connect the access point 310 to another access point or an external wired network via the wired communication module 319.

Figure 25:
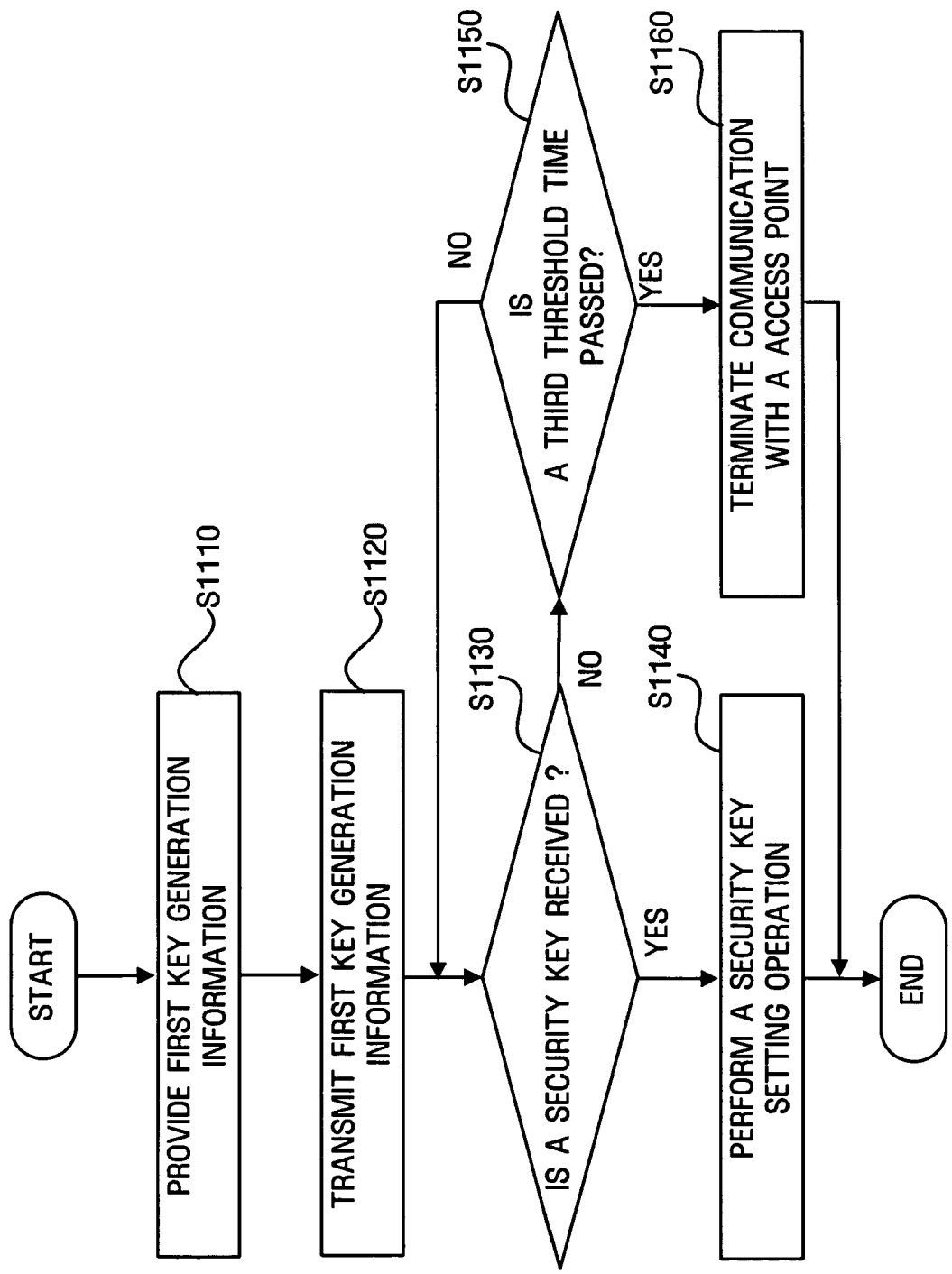
FIG. 25 is a flowchart illustrating a method of managing communication security in a wireless network according to still another exemplary embodiment of the present invention.

FIG. 25 is a flowchart illustrating a method of managing communication security in a wireless network according to an exemplary embodiment of the present invention.

In the home mode, a station 360 operates in the conventional manner. However, in the following description, it is assumed that the station 360 operates in the visit mode, and a security key is generated in the same manner as the conventional manner.

Referring to FIG. 25, in operation S1110, the key generation information providing module 367 of the station 360 provides first key generation information. In operation S1120, the limited communication module 363 transmits the first key generation information to the access point 310. Here, the first key generation information may comprise an MAC address of the station 360 and a first random number.

In operation S1130, the limited communication module 363 receives a security key from the access point 310. In operation S1140, the control module 361 sets the received security key as a security key to be used for communication with the access point 310. The setting of the received security key may be carried out using a four-way handshake method, which will be described later in detail with reference to FIG. 27.

In operation S1150, if no security key is received from the access point 310 in operation S1130, the control module 361 determines whether a third critical time has passed since the transmission of the first key generation information to the access point 310.

In operation S1160, if no security key has been received within the third critical time after the transmission of the first key generation information to the access point 310, the control module 361 may terminate the entire operation performed by the station 360 to associate in the home network 300.

Figure 26:
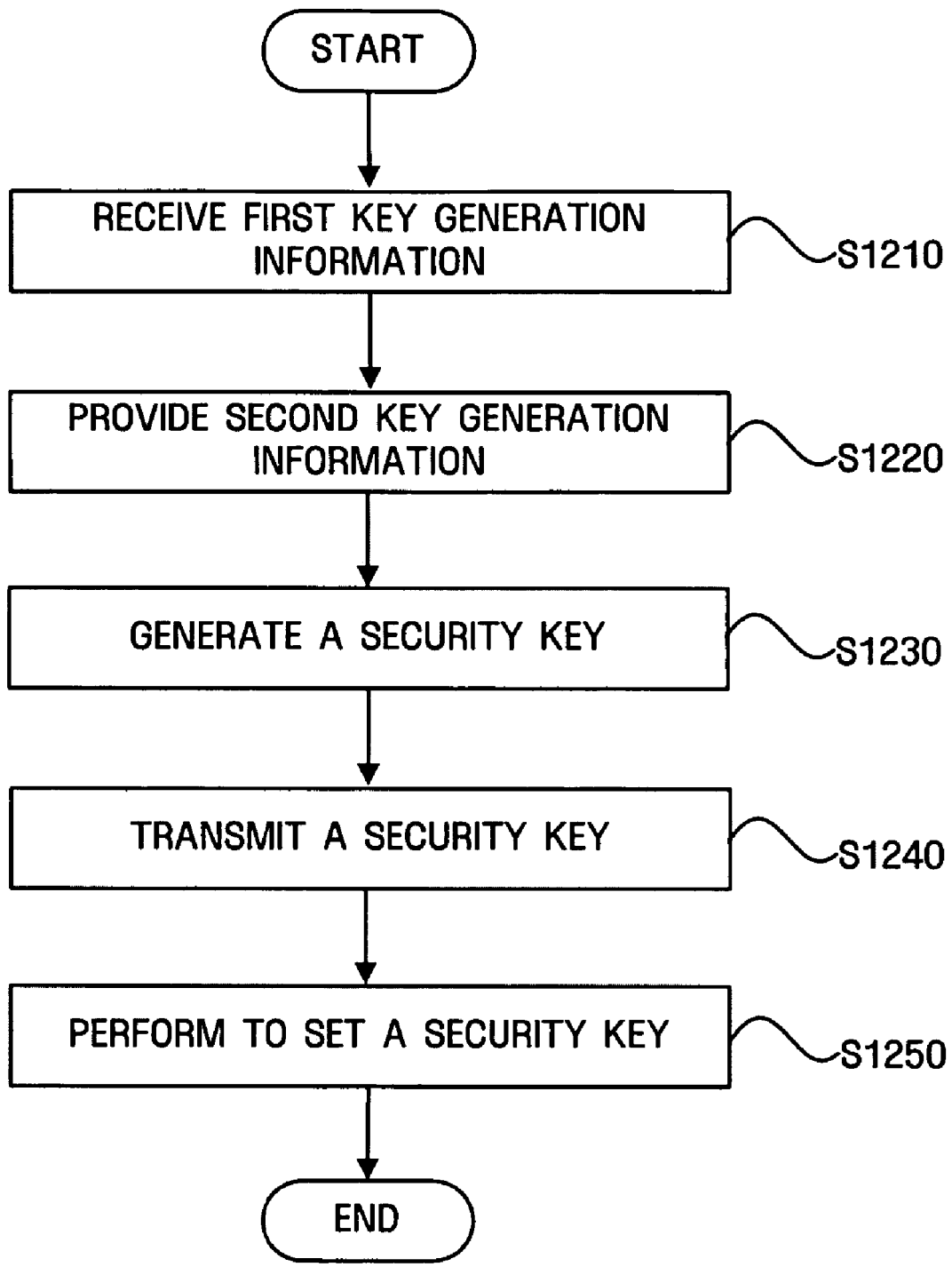
FIG. 26 is a flowchart illustrating a method of managing communication security in a wireless network according to still another exemplary embodiment of the present invention.

FIG. 26 is a flowchart illustrating a method of managing communication security in a wireless network according to an exemplary embodiment of the present invention.

Referring to FIG. 26, in operation S1210, the limited communication module receives first key generation information from the station 360. In operation S1220, the key generation information providing module 317 provides second key generation information. Here, the second key generation information may comprise an MAC address of the access point 310 and a second random number.

In operation S1230, the security key generation module 312 generates a security key using the first key generation information, the second key generation information, and an initial key stored in the storage module 314.

In operation S1240, the limited communication module 313 transmits the security key to the station 360. In operation S1250, the control module 311 sets the security key as a security key to be used for communication with the station 360. The setting of the security key may be carried out using a four-way handshake method, which will be described later in detail with reference to FIG. 27.

The operations of the access point 310 and the station 360 have been described in detail with reference to FIGS. 25 and 26, respectively. For a better understanding of the setting of a security key according to an exemplary embodiment of the present invention, the interactions between the access point 310 and 360 will now be described in detail with reference to FIGS. 27 and 28.

Figure 27:
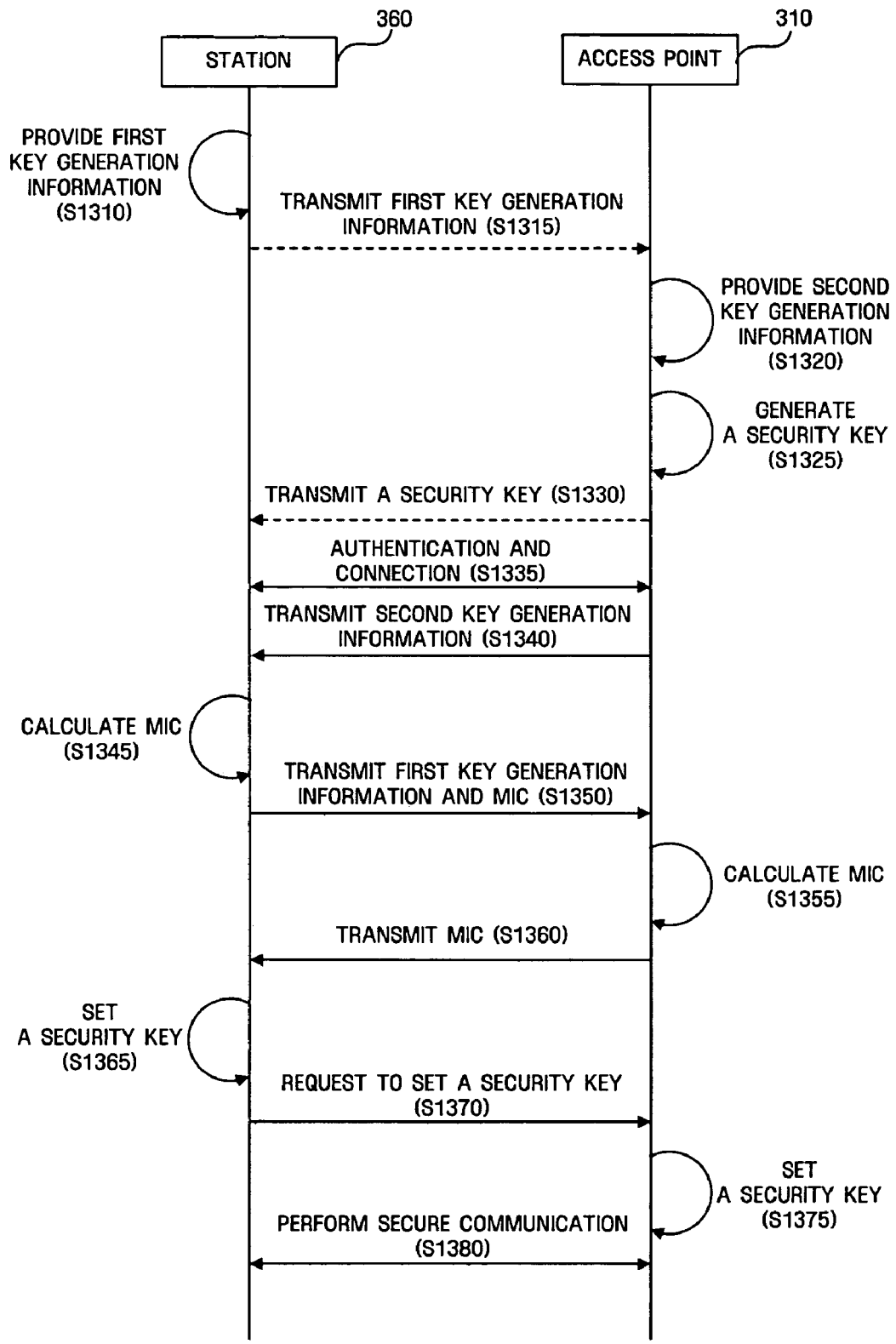
FIG. 27 is a flowchart illustrating a method of maintaining communication security in a wireless network according to still another exemplary embodiment of the present invention.

FIG. 27 is a flowchart illustrating a method of maintaining communication security in a wireless network according to still another exemplary embodiment of the present invention.

Referring to FIG. 27, solid line arrows indicate operations performed by communication means (e.g., a wireless LAN) in the home network 300, and dotted line arrows indicate operations performed by the limited range communication means.

In operation S1310, if the network manager allows the station 360 to have close access to the access point 310 so that the station 360 and the access point 310 get closer to each other enough to enable communication therebetween while making the station 360 operate in the visit mode, the key generation information providing module 367 of the station 360 provides first key generation information. Here, the first key generation information may comprise an MAC address of the station 360 and a first random number.

In operation S1315, the limited communication module 363 of the station 360 transmits the first key generation information to the access point 310.

In operation S1320, the limited communication module 313 of the access point 310 receives the first key generation information transmitted by the station 360, and the key generation information providing module 317 provides second key generation information. Here, the second key generation information may comprise an MAC address of the access point 310 and a second random number.

In operation S1325, the security key generation module 312 generates a security key using the first key generation information, the second key generation information, and an initial key stored in the storage module 314. In operation S1330, the limited communication module 313 transmits the security key to the station 360.

In operation S1335, the limited communication module 363 of the station 360 receives the security key transmitted by the access point 310, and the station 360 and the access point 310 authenticate each other and connect themselves to each other. In operation S1340, the network communication module 316 of the access point 310 transmits the second key generation information to the station 360. For such authentication and connection, an open authentication procedure defined in the IEEE 802.11 standard may be used.

In operation S1345, the network communication module 366 of the station 360 receives the second key generation information from the access point 310, and the control module 361 computes an MIC using the security key received from the access point 310.

In operation S1350, the network communication module 366 of the station 360 transmits the first key generation information provided by the key generation information providing module 367 and the MIC computed by the control module 361 to the access point 310.

In operation S1355, the network communication module 316 of the access point 310 receives the first key generation information and the MIC transmitted by the station 360, and the control module 311 computes an MIC using the security key generated in operation S1325. If the MIC transmitted by the station 360 does not match the MIC computed by the control module 311, the control module 311 may terminate communication between the access point 310 and the station 360.

However, in operation S1360, if the MIC transmitted by the station 360 matches the MIC computed by the control module 311, the control module 311 transmits the computed MIC to the station 360.

In operation S1365, the network communication module 366 of the station 360 receives the MIC transmitted by the access point 310, and the control module 361 compares the MIC received from the access point 310 with the MIC computed by the control module 361 and sets the security key received from the access point 310 in operation S1330 as a security key to be used for communication with the access point 310, if the MIC received from the access point 310 matches the MIC computed by the control module 361. However, if the MIC received from the access point 310 does not match the MIC computed by the control module 361, the control module 361 may terminate communication between the station 360 and the access point 310.

In operation S1370, the control module 361 of the station 360 issues a request for setting a security key to the access point 310 via the network communication module 366.

In operation S1375, the network communication module 316 of the access point 310 receives the request issued by the station 360, and the control module 311 sets the security key generated in operation S1325 as the security key to be used for communication with the station 360.

Accordingly, the same security key can be set in the access point 310 and the station 360 without necessity of exposing the initial key used in the home network 300 to the station 360.

In operation S1380, the access point 310 and the station 360 transmit/receive the data to/from each other using the security key set therein. Therefore, the access point 310 and the station 360 can communicate with each other in a secure manner.

Operations S1340, S1350, S1360, and S1370 may correspond to operations S125, S135, S145, and S155 shown in FIG. 1, respectively.

In the present exemplary embodiment, the transmission of the first key generation information and the security key between the station 360 and the access point 310 are carried out before operation S1335. However, the transmission of the first key generation information and the security key between the station 360 and the access point 310 may be carried out after operation S1335, which will now be described in detail with reference to FIG. 28.

Figure 28:
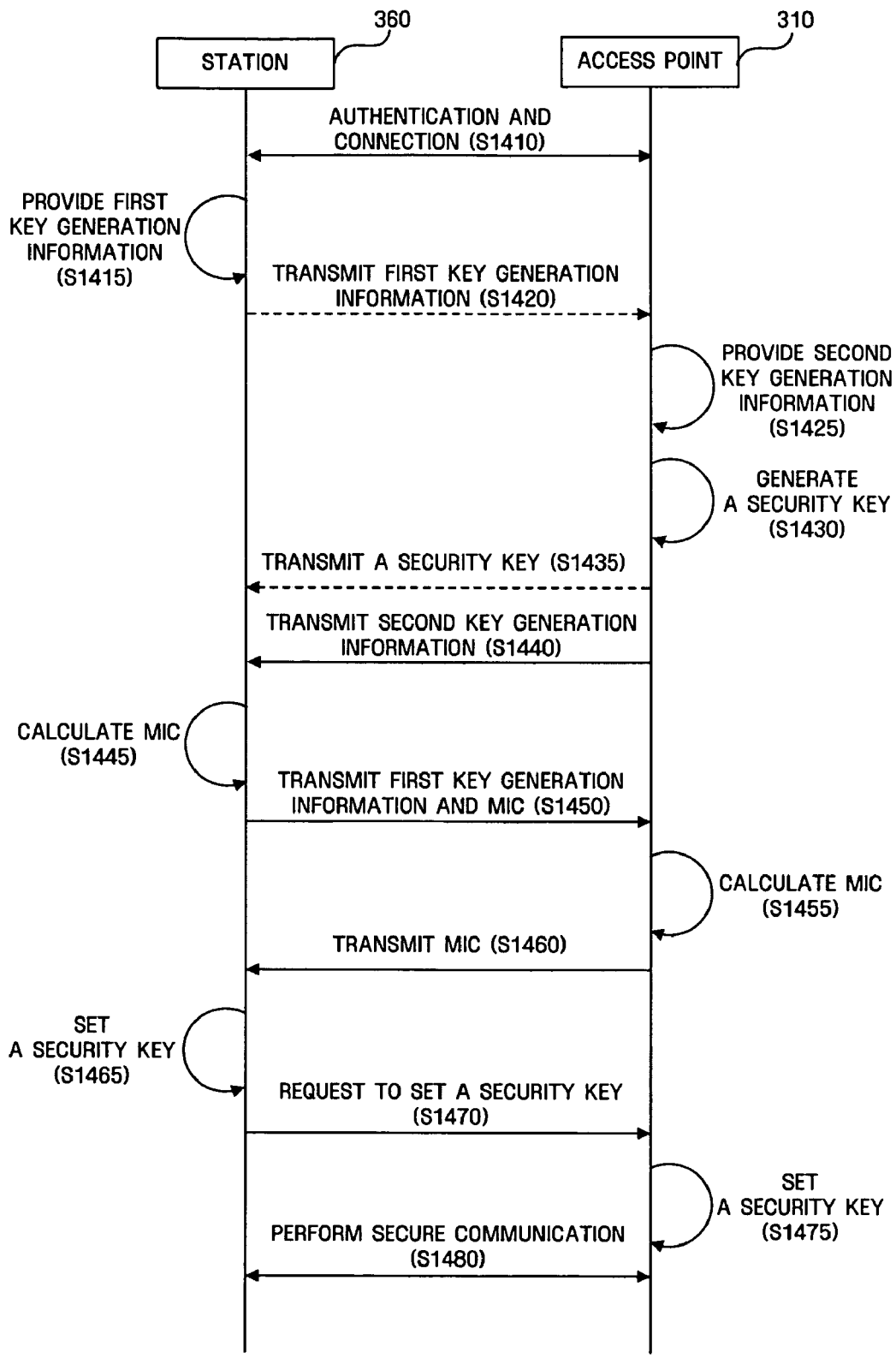
FIG. 28 is a flowchart illustrating a method of maintaining communication security in a wireless network according to another exemplary embodiment of the present invention.

FIG. 28 is a flowchart illustrating a method of maintaining communication security in a wireless network according to another exemplary embodiment of the present invention.

Referring to FIG. 28, solid line arrows indicate operations performed by communication means (e.g., a wireless LAN) in the home network 300, and dotted line arrows indicate operations performed by the limited range communication means.

In operation S1410, the station 360 and the access point 310 authenticate each other and perform networking with each other. Then, operations S1415, S1420, S1425, S1430, and S1435 shown in FIG. 28 correspond to operations S1310, S1315, S1320, S1325, and S1330 shown in FIG. 27, respectively.

Likewise, operations S1440, S1445, S1450, S1455, S1460, S1465, S1470, S1475, and S1480 correspond to operations S1340, S1345, S1350, S1355, S1360, S1365, S1370, S1375, and S1380 shown in FIG. 27, respectively.

A method and apparatus of managing communication security in a wireless network according to the present invention may provide the following advantages.

First, it is possible to strengthen communication security in a wireless network by preventing an initial key used in the wireless network from being revealed to an external station which attempts to temporarily access the wireless network.

Second, it is possible to reduce necessity of resetting an initial key used in the wireless network after an external station temporarily associates in the wireless network, thereby facilitating maintenance and management of the wireless network.

In concluding the detailed description, those skilled in the art will appreciate that many variations and modifications can be made to the exemplary embodiments without substantially departing from the principles of the present invention. Therefore, the disclosed exemplary embodiments of the invention are used in a generic and descriptive sense only and not for purposes of limitation.

What is claimed is:

1. A method of managing communication security in a wireless network comprising an access point and at least one station operating in a home mode, which is performed by a key generation apparatus, the method comprising:
   receiving from a station that intends to associate in the wireless network in a visit mode, first key generation information provided by the access point and second key generation information provided by the station;
   generating a security key using the first key generation information, the second key generation information, and an initial key stored in the key generation apparatus; and
   sending the security key to the station,
   wherein the key generation apparatus is a separate entity from the access point, and the station in a visit mode does not know the initial key used in the wireless network,
   the initial key is shared by the access point and the at least one station operating in a home mode in the wireless network.

2. The method of claim 1, wherein the first key generation information comprises a first random number provided by the access point and a medium access control (MAC) address of the access point, and the second key generation information comprises a second random number provided by the station and an MAC address of the station.

3. A method of managing communication security in a wireless network comprising an access point and at least one station operating in a home mode, which is performed by a station that intends to associate in the wireless network in a visit mode, the method comprising:
   receiving first key generation information from the access point included in the wireless network;
   providing second key generation information;
   transmitting the first key generation information and the second key generation information to a key generation apparatus;
   receiving from the key generation apparatus, third key generation information provided by the key generation apparatus and a security key which is generated by the key generation apparatus using the first key generation information, the second key generation information, the third key generation information, and an initial key stored in the key generation apparatus;
   transmitting the second key generation information and the third key generation information to the access point; and
   performing communication with the access point using the security key,
   wherein the key generation apparatus is a separate entity from the access point, and the station in a visit mode does not know the initial key used in the wireless network,
   the initial key is shared by the access point and the at least one station operating in a home mode in the wireless network.

4. The method of claim 3, wherein the first key generation information comprises a first random number provided by the access point and a medium access control (MAC) address of the access point, the second key generation information comprises an MAC address of the station, and the third key generation information comprises a second random number.

5. The method of claim 3, wherein the first key generation information and the second key generation information transmitted to the key generation apparatus and the security key received from the key generation apparatus are transmitted/ received using the same communication means as a communication means used for communication between the access point and the station.

6. The method of claim 3, wherein the first key generation information and the second key generation information transmitted to the key generation apparatus and the security key received from the key generation apparatus are transmitted and received using a first communication means having a narrower communication range than a second communication means used for communication between the access point and the station.

7. The method of claim 6, wherein the first communication means is a non-contact type communication means utilizing Infrared Data Association, near field communication or Bluetooth, or a contact-type communication means utilizing a Universal Serial Bus or International Organization for Standardization-7816 standard.

8. A method of managing communication security in a wireless network comprising an access point and at least one station operating in a home mode, which is performed by a station that intends to associate in the wireless network in a visit mode, the method comprising:
 receiving the first key generation information from the access point included in the wireless network;
 providing second key generation information;
 transmitting the first key generation information and the second key generation information to a key generation apparatus;
 receiving from the key generation apparatus a security key, which is generated by the key generation apparatus using the first key generation information, the second key generation information, and an initial key stored in the key generation apparatus;
 transmitting the second key generation information to the access point; and
 performing communication with the access point using the security key,
 wherein the key generation apparatus is a separate entity from the station, and the station in a visit mode does not know the initial key used in the wireless network,
 the initial key is shared by the access point and the at least one station operating in a home mode in the wireless network.

9. The method of claim 8, wherein the first key generation information comprises a first random number provided by the access point and a medium access control (MAC) address of the access point, and the second key generation information comprises a second random number provided by the station and an MAC address of the station.

10. A method of managing communication security in a wireless network comprising an access point and at least one station operating in a home mode, which is performed by the access point included in the wireless network, the method comprising:
 providing first key generation information;
 transmitting the first key generation information to a station that intends to associate in the wireless network in a visit mode;
 receiving from the station, second key generation information provided by the station and third key generation information provided by a key generation apparatus, which generates a security key to be used by the station in a wireless network;
 generating a security key using the first key generation information, the second key generation information, the third key generation information, and an initial key that the access point stores; and
 performing communication with the station using the generated security key,
 wherein the key generation apparatus is a separate entity from the station, and the station in a visit mode does not know the initial key used in the wireless network,
 the initial key is shared by the access point and the at least one station operating in a home mode in the wireless network.

11. The method of claim 10, wherein the first key generation information comprises a first random number provided by the access point and a medium access control (MAC) address of the access point, the second key generation information comprises an MAC address of the station, and the third key generation information comprises a second random number provided by the key generation apparatus.

12. The method of claim 10, further comprising:
 receiving from the key generation apparatus a request to disassociate the station and identification information for identifying the station;
 disassociating the station designated by the identification information and deactivating the security key; and
 transmitting a result of the disassociation of the station to the key generation apparatus.

13. The method of claim 12, wherein a first communication means used for communication between the access point and the key generation apparatus has a narrower communication range than a second communication means used for communication between the access point and the station.

14. The method of claim 13, wherein the first communication means is a non-contact type communication means utilizing Infrared Data Association, (near field communication or Bluetooth, or a contact-type communication means utilizing a Universal Serial Bus or International Organization for Standardization-7816 standard.

15. A key generation apparatus comprising:
 a communication apparatus interface module which receives from a station that intends to associate in a visit mode in a wireless network including an access point and at least one station operating in a home mode, first key generation information provided by the access point and second key generation information provided by the station;
 a key generation information providing module which provides third key generation information;
 a storage module which stores an initial key;
 a security key generation module which generates a security key using the first key generation information and the second key generation information, which are received through the communication apparatus interface module, the third key generation information provided by the key generation information providing module, and the initial key stored in the storage module; and
 a control module which sends the third key generation information provided by the key generation information providing module and the security key generated by the security key generation module to the station through the communication apparatus interface module,
 wherein at least one of the modules is a hardware component and the key generation apparatus is a separate entity from the access point, and the station in a visit mode does not know the initial key used in the wireless network,
 the initial key is shared by the access point and the at least one station operating in a home mode in the wireless network.

16. The key generation apparatus of claim 15, wherein the first key generation information comprises a first random number provided by the access point and a medium access control (MAC) address of the access point, the second key generation information comprises an MAC address of the station, and the third key generation information comprises a second random number.

17. The key generation apparatus of claim 15, wherein the initial key is stored in a storage area of the storage module, the storage area being physically or logically protected from being accessed by the station.

18. The key generation apparatus of claim 15, wherein communication means used by the communication apparatus interface module is the same as communication means used for communication between the access point and the station.

19. The key generation apparatus of claim 15, wherein communication means used by the communication apparatus interface module is a first communication means having a narrower communication range than a second communication means used for communication between the access point and the station.

20. The key generation apparatus of claim 19, wherein the first communication means is a non-contact type communication means utilizing Infrared Data Association, near field communication or Bluetooth, or a contact-type communicating means utilizing a Universal Serial Bus or International Organization for Standardization-7816 standard.

21. The key generation apparatus of claim 15, wherein to disassociate the station from the wireless network, the control module transmits identification information of the station to the access point through the communication apparatus interface module, and when the communication apparatus interface module receives information indicating that the station has been disassociated from the wireless network from the access point receiving the identification information, the control module deactivates the first key generation information and the second key generation information which have been received from the station.

22. A key generation apparatus comprising:
a communication apparatus interface module which receives from a station that intends to associate in a visit mode in a wireless network including an access point and at least one station operating in a home mode, first key generation information provided by the access point and the second key generation information provided by the station;
a storage module which stores an initial key;
a security key generation module which generates a security tag using the first key generation information and the second key generation information, which are received through the communication apparatus interface module, and the initial key stored in the storage module; and
a control module which sends the security key generated by the security key generation module to the station through the communication apparatus interface module,
wherein at least one of the modules is a hardware component and the key generation apparatus is a separate entity from the access point, and the station in a visit mode does not know the initial key used in the wireless network,
the initial key is shared by the access point and the at least one station operating in a home mode in the wireless network.

23. The key generation apparatus of claim 22, wherein the first key generation information comprises a first random number provided by the access point and a medium access control (MAC) address of the access point, and the second key generation information comprises a second random number provided by the station and an MAC address of the station.

24. A station that intends to associate in a visit mode in a wireless network comprising an access point and at least one station operating in a home mode, the station comprising:
a network communication module which receives first key generation information from the access point included in the wireless network;
a key generation information providing module which provides second key generation information;
a key generation apparatus interface module which transmits the first key generation information and the second key generation information to a key generation apparatus and receives from the key generation apparatus, third key generation information provided by the key generation apparatus and a security key generated by the key generation apparatus using the first key generation information, the second key generation information, the third key generation information, and an initial key stored in the key generation apparatus; and
a control module which transmits the second key generation information and the third key generation information to the access point via the network communication module when receiving the security key and the third key generation information through the key generation apparatus interface module and sets the security key for communication between the access point and the station,
wherein at least one of the modules is a hardware component and the key generation apparatus is a separate entity from the access point, and the station in a visit mode does not know the initial key used in the wireless network,
the initial key is shared by the access point and the at least one station operating in a home mode in the wireless network.

25. The station of claim 24, wherein the first key generation information comprises a first random number provided by the access point and a medium access control (MAC) address of the access point, the second key generation information comprises an MAC address of the station, and the third key generation information comprises a second random number.

26. The station of claim 24, wherein communication means used by the key generation apparatus interface module is the same as communication means used by the network communication module.

27. The station of claim 24, wherein communication means used by the key generation apparatus interface module is a first communication means having a narrower communication range than a second communication means used by the network communication module.

28. The station of claim 27, wherein the first communication means is a non-contact type communicating means utilizing Infrared Data Association, near field communication or Bluetooth, or a contact-type communicating means utilizing a Universal Serial Bus or International Organization for Standardization-7816 standard.

29. A station that intends to associate in a visit mode in a wireless network comprising an access point and at least one station operating in a home mode, the station comprising:
a network communication module which receives first key generation information from the access point included in the wireless network;
a key generation information providing module which provides second key generation information;
a key generation apparatus module which transmits the first key generation information and the second key generation information to a key generation apparatus and receives from the key generation apparatus a security key generated by the key generation apparatus using the first key generation information, the second key generation information, and an initial key stored in the key generation apparatus; and a control module which transmits the second key generation information to the access point via the network communication module when receiving the security key through the key generation apparatus interface module and sets the security key for communication between the access point and the station, wherein at least one of the modules is a hardware component and the key generation apparatus is a separate entity from the station, and the station in a visit mode does not know the initial key used in the wireless network, the initial key is shared by the access point and the at least one station operating in a home mode in the wireless network.

30. The station of claim 29, wherein the first key generation information comprises a first random number provided by the access point and a medium access control (MAC) address of the access point, and the second key generation information comprises a second random number provided by the station and an MAC address of the station.

31. An access point for managing communication security in a wireless network to communicate with a station that intends to associate in a visit mode in the wireless network comprising at least one station operating in a home mode, the access point comprising:

a key generation information providing module which provides first key generation information;

a network communication module which transmits the first key generation information provided by the key generation providing module to the station and receives from the station second key generation information provided by the station and third key generation information provided by a key generation apparatus, which generates a security key to be used by the station in the wireless network;

a storage module which stores an initial key;

a security key generation module which generates a security key using the first key generation information, the second key generation information, the third key generation information, and the initial key stored in the storage module; and an encryption and decryption module which encrypts data, which will be transmitted to the station via the network communication module, using the security key generated by the security key generation module and decrypts encrypted data received from the station via the network communication module using the security key, wherein at least one of the modules is a hardware component and the key generation apparatus is a separate entity from the station, and the station in a visit mode does not know the initial key used in the wireless network, the initial key is shared by the access point and the at least one station operating in a home mode in the wireless network.

32. The access point of claim 31, wherein the first key generation information comprises a first random number and a medium access control (MAC) address of the access point, the second key generation information comprises an MAC address of the station, and the third key generation information comprises a second random number provided by the key generation apparatus.

33. The access point of claim 31, further comprising:

a key generation apparatus interface module which performs communication with the key generation apparatus; and a control module which disassociates the station from the wireless network, deactivates the security key, and transmits a result of disassociation of the station to the key generation apparatus, when identification information for identifying the station and a request to disassociate the station from the wireless network are received from the key generation apparatus through the key generation apparatus interface module.

34. The access point of claim 33, wherein communication means used by the key generation apparatus interface module is a first communication means having a narrower communication range than a second communication means used by the network communication module.

35. The access point of claim 34, wherein the first communication means is a non-contact type communication means utilizing Infrared Data Association, near field communication or Bluetooth, or a contact-type communicating means utilizing a Universal Serial Bus or International Organization for Standardization-7816 standard.

36. An initial key providing apparatus comprising:

a communication apparatus interface module which performs communication with an access point and a station that intends to associate in a visit mode in a wireless network comprising at least one station operating in a home mode;

a control module which performs authentication with the access point and receives an initial key from the access point through the communication apparatus interface module and performs authentication with the station and transmits the initial key to the station in a visit mode through the communication apparatus interface module; and a storage module which stores the received initial key, wherein at least one of the modules is a hardware component, and the station in a visit mode does not know the initial key used in the wireless network before the initial key is transmitted to the station, the initial key is shared by the access point and the at least one station operating in a home mode in the wireless network.

37. The initial key providing apparatus of claim 36, wherein communication means used by the communication apparatus interface module is a first communication means having a narrower communication range than a second communication means for communication between the access point and the station.

38. The initial key providing apparatus of claim 37, wherein the first communication means is a non-contact type communication means utilizing Infrared Data Association, near field communication or Bluetooth, or a contact-type communication means utilizing a Universal Serial Bus or International Organization for Standardization-7816 standard.

39. The initial key providing apparatus of claim 36, wherein the initial key is stored in a storage area of the storage module, the storage area being physically or logically protected from being accessed by the station.

40. A method of managing communication security in a wireless network comprising an access point and at least one station operating in a home mode, which is performed by a station that intends to associate in a visit mode in the wireless network, the method comprising:

providing first key generation information;

storing the first key generation information in a key transmitter connected to the station;

acquiring from the key transmitter a security key, which is generated by the access point included in the wireless network using the first key generation information, second key generation information provided by the access point, and an initial key, when the key transmitter is newly connected to the station; and setting the security key acquired from the key transmitter as a security key used for communication with the access point, wherein the station in a visit mode does not know the initial key used in the wireless network, the initial key is shared by the access point and the at least one station operating in a home mode in the wireless network.

41. The method of claim 40, wherein the key transmitter is a portable storage apparatus including flash memory.

42. The method of claim 41, wherein the portable storage apparatus is a universal serial bus (USB) storage.

43. The method of claim 40, wherein the initial key is stored in a storage area that is physically or logically protected from being accessed by the station.

44. The method of claim 40, wherein the first key generation information comprises a first random number and a medium access control (MAC) address of the station, and the second key generation information comprises a second random number and an MAC address of the access point.

45. The method of claim 40, wherein the setting of the security key comprises checking message integrity using the security key acquired from the key transmitter.

46. A method of managing communication security in a wireless network comprising at least one station operating in a home mode, which is performed by an access point included in the wireless network, the method comprising:

acquiring first key generation information provided by a station that intends to associate in a visit mode in the wireless network from a key transmitter connected to the access point;

providing second key generation information;

generating a security key using the first key generation information, the second key generation information, and an initial key;

storing the security key in the key transmitter; and setting the security key as a security key used for communication with the station, wherein the station in a visit mode does not know the initial key used in the wireless network, the initial key is shared by the access point and the at least one station operating in a home mode in the wireless network.

47. The method of claim 46, wherein the key transmitter is a portable storage apparatus including flash memory.

48. The method of claim 47, wherein the portable storage apparatus is a universal serial bus (USB) storage.

49. The method of claim 46, wherein the first key generation information comprises a first random number and a medium access control (MAC) address of the station, and the second key generation information comprises a second random number and an MAC address of the access point.

50. A station that intends to associate in a visit mode in a wireless network comprising an access point and at least one station operating in a home mode, the station comprising:

a key transmitter interface module which is connectable to a key transmitter;

a key generation information providing module which provides first key generation information; and a control module which stores the first key generation information in the key transmitter through the key transmitter interface module, acquires a security key from the key transmitter when the key transmitter is newly connected through the key transmitter interface module, and sets the acquired security key as a security key used for communication with the access point included in the wireless network, the security key being generated based on an initial key, wherein at least one of the modules is a hardware component, and the station in a visit mode does not know the initial key used in the wireless network, the initial key is shared by the access point and the at least one station operating in a home mode in the wireless network.

51. The station of claim 50, wherein the key transmitter is a portable storage apparatus including flash memory.

52. The station of claim 51, wherein the portable storage apparatus is a universal serial bus (USB) storage.

53. The station of claim 50, wherein the security key is generated by the access point using the first key generation information, a second key generation information provided by the access point and the initial key.

54. The station of claim 53, wherein the first key generation information comprises a first random number and a medium access control (MAC) address of the station, and the second key generation information comprises a second random number and an MAC address of the access point.

55. The station of claim 50, wherein the setting of the security key is performed according to result of checking message integrity using the security key acquired from the key transmitter.

56. An access point for managing communication security in a wireless network to communicate with a station that intends to associate in a visit mode in the wireless network comprising an access point and at least one station operating in a home mode, the access point comprising:

a key transmitter interface module which is connectable to a key transmitter;

a key generation information providing module which provides second key generation information;

a security key generation module which generates a security key using first key generation information, which is provided by the station and stored in the key transmitter, the second key generation information, and an initial key; and a control module which stores the generated security key in the key transmitter through the key transmitter interface module and sets the generated security key as a security key used for communication with the station, wherein at least one of the modules is a hardware component, and the station in a visit mode does not know the initial key used in the wireless network, the initial key is shared by the access point and the at least one station operating in a home mode in the wireless network.

57. The access point of claim 56, wherein the key transmitter is a portable storage apparatus including flash memory.

58. The access point of claim 57, wherein the portable storage apparatus is a universal serial bus (USB) storage.

59. The access point of claim 56, wherein the first key generation information comprises a first random number and a medium access control (MAC) address of the station, and the second key generation information comprises a second random number and an MAC address of the access point.

60. A method of managing communication security in a wireless network comprising an access point and at least one station operating in a home mode, which is performed by a station that intends to associate in a visit mode in the wireless network, the method comprising:

providing first key generation information;

transmitting the first key generation information to the access point included in the wireless network using limited range communication means included in the station;

receiving from the access point a security key, which is generated by the access point using the first key generation information, second key generation information provided by the access point, and an initial key using the limited range communication means; and setting the received security key to perform communication in accordance with the wireless network, wherein the station in a visit mode does not know the initial key used in the wireless network, the initial key is shared by the access point and the at least one station operating in a home mode in the wireless network.

61. The method of claim 60, wherein the first key generation information comprises a first random number and a medium access control (MAC) address of the station, and the second key generation information comprises a second random number and an MAC address of the access point.

62. The method of claim 60, wherein the limited range communication means is communication means having a narrower communication range than the communication means used for communication in accordance with the wireless network.

63. The method of claim 62, wherein the limited range communication means is a non-contact type communication means utilizing Infrared Data Association, near field communication or Bluetooth, or a contact-type communication means utilizing a Universal Serial Bus or International Organization for Standardization-7816 standard.

64. The method of claim 60, wherein the setting of the security key comprises checking message integrity using the security key acquired from the access point.

65. A method of managing communication security in a wireless network comprising at least one station operating in a home mode, which is performed by an access point included in the wireless network, the method comprising:

receiving first key generation information from a station that intends to associate in a visit mode in the wireless network using limited range communication means included in the access point;

providing second key generation information;

generating a security key using the first key generation information, the second key generation information, and an initial key;

transmitting the generated security key to the station using the limited range communication means; and setting the generated security key as a security key used to perform communication in accordance with the wireless network, wherein the station in a visit mode does not know the initial key used in the wireless network, the initial key is shared by the access point and the at least one station operating in a home mode in the wireless network.

66. The method of claim 65, wherein the first key generation information comprises a first random number and a medium access control (MAC) address of the station, and the second key generation information comprises a second random number and an MAC address of the access point.

67. The method of claim 65, wherein the limited range communication means is communication means having a narrower communication range than the communication means used for communication in accordance with the wireless network.

68. The method of claim 67, wherein the limited range communication means is a non-contact type communication means utilizing Infrared Data Association, near field communication or Bluetooth, or a contact-type communication means utilizing a Universal Serial Bus or International Organization for Standardization-7816 standard.

69. A station that intends to associate in a visit mode in a wireless network comprising an access point and at least one station operating in a home mode, the station comprising:

a key generation information providing module which provides first key generation information;

a limited range communication module which transmits the first key generation information to the access point included in the wireless network and receives from the access point a security key, which is generated by the access point using the first key generation information, second key generation information provided by the access point, and an initial key;

a network communication module which performs network communication in accordance with the wireless network; and a control module which sets the received security key for the network communication performed by the network communication module, wherein at least one of the modules is a hardware component, and the station in a visit mode does not know the initial key used in the wireless network, the initial key is shared by the access point and the at least one station operating in a home mode in the wireless network.

70. The station of claim 69, wherein the first key generation information comprises a first random number and a medium access control (MAC) address of the station, and the second key generation information comprises a second random number and an MAC address of the access point.

71. The station of claim 69, wherein a communication means used by the limited range communication module has a narrower communication range than a communication means used by the network communication module.

72. The station of claim 71, wherein the communication means used by the limited range communication module is a non-contact type communication means utilizing Infrared Data Association, near field communication or Bluetooth, or a contact-type communication means utilizing a Universal Serial Bus or International Organization for Standardization-7816 standard.

73. The station of claim 69, wherein the setting of the security key is performed according to message integrity check result using the acquired security key.

74. An access point included in a wireless network comprising at least one station operating in a home mode, the access point comprising:

a limited range communication module which receives first key generation information from a station that intends to associate in a visit mode in the wireless network;

a key generation information providing module which provides second key generation information;

a security key generation module which generates a security key using the first key generation information, the second key generation information, and an initial key;

a network communication module which performs network communication in accordance with the wireless network; and a control module which transmits the generated security key to the station using the limited range communication module and sets the generated security key to use for the network communication performed by the network communication module, wherein at least one of the modules is a hardware component, and the station in a visit mode does not know the initial key used in the wireless network, the initial key is shared by the access point and the at least one station operating in a home mode in the wireless network.

75. The access point of claim 74, wherein the first key generation information comprises a first random number and a medium access control (MAC) address of the station, and the second key generation information comprises a second random number and an MAC address of the access point.

76. The access point of claim 74, wherein a communication means used by the limited range communication module has a narrower communication range than a communication means used by the network communication module.

77. The access point of claim 76, wherein the communication means used by the limited range communication module is a non-contact type communication means utilizing Infrared Data Association, near field communication or Bluetooth, or a contact-type communication means utilizing a Universal Serial Bus or International Organization for Standardization-7816 standard.

78. A method of managing communication security in a wireless network including an access point and at least one station operating in a home mode, which is performed by a key generation apparatus, the method comprising:

receiving from a station that intends to associate in a visit mode in the wireless network, first key generation information provided by the access point and second key generation information provided by the station;

providing third key generation information;

generating a security key using the first key generation information, the second key generation information, the third key generation information, and an initial key stored in the key generation apparatus; and sending the third key generation information and the security key to the station, wherein the key generation apparatus is a separate entity from the access point, and the station in a visit mode does not know the initial key used in the wireless network, the initial key is shared by the access point and the at least one station operating in a home mode in the wireless network.

79. The method of claim 78, wherein the first key generation information comprises a first random number provided by the access point and a medium access control (MAC) address of the access point, the second key generation information comprises an MAC address of the station, and the third key generation information comprises a second random number.

80. The method of claim 78, wherein the initial key is stored in a storage area that is physically or logically protected from being accessed by the station.

81. The method of claim 78, wherein the first key generation information and the second key generation information received from the station and the third key generation information and the security key sent to the station are transmitted and received using the same communication means as a communication means used for communication between the access point and the station.

82. The method of claim 78, wherein the first key generation information and the second key generation information received from the station and the third key generation information and the security key sent to the station are transmitted using a first communication means having a narrower communication range than a second communication means used for communication between the access point and the station.

83. The method of claim 82, wherein the first communication means is a non-contact type communication means utilizing Infrared Data Association, near field communication or Bluetooth, or a contact-type communication means utilizing a Universal Serial Bus or International Organization for Standardization-7816 standard.

84. The method of claim 78, further comprising transmitting identification information of the station to the access point when disassociation of the station from the wireless network is requested by user; and deactivating the first key generation information and the second key generation information when information indicating that the station has been disassociated from the wireless network is received from the access point receiving the identification information.

* * * * *